United States Patent [19]
Limberg et al.

[11] Patent Number: 5,461,426
[45] Date of Patent: Oct. 24, 1995

[54] APPARATUS FOR PROCESSING MODIFIED NTSC TELEVISION SIGNALS, WITH DIGITAL SIGNALS BURIED THEREWITHIN

[75] Inventors: Allen L. Limberg, Ringoes; Chandrakant B. Patel, Hopewell; Tianmin Liu, Lawrenceville, all of N.J.

[73] Assignee: Samsung Electronics Co., Ltd., Kyungki, Rep. of Korea

[21] Appl. No.: 108,311

[22] Filed: Aug. 20, 1993

[51] Int. Cl.$^6$ ...................................................... H04N 7/08
[52] U.S. Cl. ............................................ 348/475; 348/473
[58] Field of Search ...................................... 348/473, 475, 348/724, 426, 423, 474, 432; H04N 7/08

[56] References Cited

U.S. PATENT DOCUMENTS

| | | | |
|---|---|---|---|
| 5,068,729 | 11/1991 | Katznelson et al. | 348/475 |
| 5,229,847 | 2/1993 | Gibson | 348/486 |
| 5,278,637 | 1/1994 | Naimpally | 348/475 |
| 5,357,284 | 10/1994 | Todd . | |
| 5,387,941 | 2/1995 | Montgomery et al. | 348/486 |

OTHER PUBLICATIONS

"Dual Single Sideband: a Crosstalk–Resistant Alternative to Quadrature Modulation with Applications in ACTV"; Hurst; IEEE 1988; pp. 140–147.
"NAB, EIA Announce Initiative on Television Data Broadcasting," *National Association of Broadcasters*, Las Vegas, Nev., Apr. 18, 1993.
"Transmitting Hidden Data in Video Signals," *Broadcast Engineering*, Charles Jungo, Feb. 1993.
"Now Data Can Hitchhike on TV Signals," *Business Week*, Dec. 7, 1992.
"New Transmission System Piggybacks Signals," *Interactive World*, Feb. 1993.
"WavePhore's System to Embed Digital Data in Analog Television Broadcasts," *Video Technology News*.
"WavePhore Develops High Speed Data Modem for Television," *TN TechCheck*, Feb. 22, 1993.
"Modem Piggybacks TV Signal," *EDP Weekly*, vol. 34, No. 13, Mar. 29, 1993.
"Technology Offers TV Broadcasters an Avenue Into Interactive Services," *Investors's Business Daily*, Brian Daegon, vol. 10, No. 6, Apr. 19, 1993.
"New System Delivers Interactive Video, Data Services Through Existing TV Signals," p. 3–4.

*Primary Examiner*—Victor R. Kostak
*Attorney, Agent, or Firm*—Sughrue, Mion, Zinn, Macpeak & Seas

[57] ABSTRACT

A relatively low power phase-shift-keyed (PSK) subcarrier encoding digital information is admixed with composite video signal. The PSK subcarrier is at an odd multiple of half the scan line frequency of the composite video signal, and the symbol rate is at a multiple of the scan line frequency. The PSK subcarrier modulates the amplitude of a suppressed carrier which is the same frequency as the video carrier for the composite video signal and preferably is in quadrature phasing therewith. To reduce evidence of the PSK subcarrier in television picture generated from that composite video signal, the PSK subcarrier is interrupted after each of periods of one frame duration and repeated in anti-phase during the next period of one frame duration. This also provides a basis for separating the PSK subcarrier from static luminance signal components by bandpass frame-comb filtering. Preferably, in the scan lines of consecutive pairs of scan lines, the PSK subcarrier is repeated with phase reversal of the subcarrier between scan lines, and the chroma subcarrier is repeated. This provides a basis for separating PSK subcarrier from chroma subcarrier by lowpass line-comb filtering.

84 Claims, 12 Drawing Sheets

APPARATUS FOR PROCESSING MODIFIED NTSC TELEVISION SIGNALS, WITH DIGITAL SIGNALS BURIED THEREWITHIN

The invention relates to transmitters for burying digital signals in analog television signals and receivers for recovering digital signals buried in analog television signals.

BACKGROUND OF THE INVENTION

Relatively low-power (e.g., 10 dB above noise floor) signals encoding digital information can be admixed together with composite video signals without being readily evident in television pictures generated from those composite video signals if suitable restrictions on the digital signal format are observed, the inventors point out. Preferably, the digital signals are used to modulate a subcarrier of a suppressed carrier of the same frequency as the video carrier. Then, long runs of ZEROs or ONEs do not have an appreciable effect on the low-frequency content of the frames, so as to affect in any way synchronization and automatic gain control operation in a television receiver already in the field. In order not to interfere with the recovery of sound in the television receiver, the subcarrier and its sideband structure should not have appreciable energy in the vicinity of the frequency-modulated audio carrier. Most of the energy in the luminance component of a composite video signal is on average in a frequency band below about 2 MHz, which fact is taken advantage of in VHS video tape cassette recording, for example.

It is advantageous to use a suppressed, vestigial-sideband, amplitude-modulated (VSB AM) carrier of the same frequency as the VSB AM picture carrier, but in quadrature phasing therewith, on which to transmit the subcarrier modulated with digital data. This procedure permits the synchronous detection of that quadrature carrier to recover the composite video signal without substantial energy in the baseband extending up to the 0.75 MHz frequency, at which frequency the VSB AM video carrier begins the transition from being a double-sideband amplitude-modulated (DSB AM) carrier to being a single-sideband amplitude-modulated (SSB AM) carrier, and at lessened energy up to the 1.25 MHz frequency at which roll-off of the vestigial sideband is complete. This procedure also lessens the visibility of the sideband of the subcarrier modulated with digital data to the extent it occupies the band where the VSB AM carriers are DSB AM in character.

The subcarrier for the digital signals should be chosen so that it and its sideband structure are discriminated against by the conventional chroma bandpass filter. If one attempts to solve this problem in terms of a single-dimension frequency spectrum, rather than in terms of a plural-dimension frequency spectrum using comb-filtering, there are severe constraints on the spectrum available for the transmission of data. The lower-frequency sideband of the I-channel chrominance extends down at least 1.3 MHz in frequency from the 3.58 MHz subcarrier, reaching down to the frequencies where there is significant energy in the luminance signal; and the upper-frequency sidebands of the I-channel and Q-channel chrominance extend up 0.5 MHz in frequency from the 3.58 MHz subcarrier. The problem is more tractable when treated in terms of a two-dimensional frequency spectrum using line comb filtering.

Line-comb bandpass filtering is often used, either alone or in cascade with a conventional chroma bandpass filter, for separating chrominance sidebands from luminance. The line-comb bandpass filtering suppresses cross-luminance because of the pronounced line-to-line correlation of luminance signal. Transmitting the same digital signals in each consecutive pair of successive scan lines provides for perfect line-to-line correlation of the digital signal sidebands in corresponding pixels of the two scan lines in each such consecutive pair, providing that the digital signal is encoded in the sideband frequencies of a subcarrier that does not exhibit 180° spatial phase shift from scan line to scan line. Then, line-comb bandpass filtering suppresses crosstalk of the digital signal sidebands into alternate scan lines of its mostly-chrominance-signal response.

More importantly, inasfar as the invention in certain of its aspects is concerned, line-comb lowpass filtering suppresses cross-chrominance in alternate scan lines of its response. In an aspect of the invention, this suppression of cross-chrominance in alternate scan lines of the line-comb lowpass filter response is preferably made nearly perfect by averaging color-difference signals in each consecutive pair of successive scan lines. Such averaging provides for perfect line-to-line anti-correlation of the orthogonal AM sidebands of the complex color subcarrier in corresponding pixels of the two scan lines in each such consecutive pair. Such averaging reduces the vertical spatial resolution of chroma in each frame, but this reduction of vertical resolution is not apparent at normal viewing distances. The line pairing in chroma averaging is interleaved in vertical spatial phasing from frame to frame, so the resolution loss is reduced for static portions of the televised image. Prior to such averaging, the vertical spatial resolution of chroma in each frame is the equal of the vertical spatial resolution of luma, while the horizontal spatial resolution of chroma in each frame is only one-sixth or one-seventh the horizontal spatial resolution of luma.

A subcarrier that is a multiple of scan line rate does not exhibit 180° spatial phase shift from scan line to scan line. A subcarrier that is an odd multiple of half scan line frequency, but has its phase shifted 180° between the end of each scan line and the beginning of the next, does not exhibit 180° spatial phase shift from scan line to scan line. The sidebands of either of these subcarriers do not exhibit 180° spatial phase shift between two scan lines in which the modulating signal is repeated. Therefore, with either of these modulated subcarriers, the separation of the modulated subcarrier and chrominance from each other using line-comb filtering is good. The choice of a subcarrier that is an odd multiple of half scan line frequency, but has its phase shifted 180° between the end of each scan line and the beginning of the next, will be shown further on in this specification to be preferable with regard to spectral interleaving with the luminance signal.

When the subcarrier can be separated nearly perfectly from the chrominance sidebands by lowpass line-comb filtering, a frequency band becomes available for the transmission of digital data without substantial interference by components of the composite video signal. This band is below the 4.2 to 4.8 MHz band occupied by the frequency-modulated 4.5 MHz sound carrier and is above the band below about 2.5 MHz wherein most of the energy in the luminance component of a composite video signal is on average. Filtering procedures to separate the subcarrier modulated by the digital signals from the luminance component of a composite video signal have been considered by the inventors. One objective of such filtering is to reduce the luminance-signal interference with the transmission of digital data in this 2.5 to 4.2 MHz band. Another objective is to reduce the luminance-signal interference with the transmission of digital data at frequencies below 2.5 MHz, particularly those frequencies above the zero to 0.75 MHz band freed of interfering luminance signal components by using a quadrature-phase VSB AM carrier for the transmission of digital data.

Unlike the channel for chrominance signal, the channel for luminance signal does not have excessive spatial or temporal resolution for all possible signal conditions. Nevertheless, on average, the luminance signal does exhibit high degrees of correlation between corresponding picture elements (or "pixels") in consecutive frames and between pixels in the same locality within a frame. Causing the subcarrier modulated by the digital signals to exhibit high degrees of anti-correlation between corresponding picture elements (or "pixels") in consecutive frames will provide a basis for separating the digital signal sidebands from the luminance signal by bandpass frame-comb filtering. Bandpass frame-comb filtering also provides a basis for separating the digital signal sidebands from the luminance signal of the adjacent channel next higher in frequency, which can be, taken, advantage of when designing the intermediate-frequency (IF) amplifiers for the digital signal receiver.

The visibility of the signals encoding digital information in the luminance components of the color signals supplied to the television picture display apparatus is reduced by transmitting the same sequence of digital signals in each frame of a successive group of M consecutive frames, but with opposite spatial phasing of the subcarrier in scan lines occurring during odd-numbered frames from that in corresponding scan lines occurring during even-numbered frames, where:

(1) the scan lines in each frame are considered to be consecutively numbered in order of their occurrence beginning with one, (2) the frames are considered to be consecutively numbered modulo-M in order of their occurrence, (3) $M=2^N$, and (4) N is a positive integer equal to or greater than one.

In the interest of keeping data rate high and reducing the number of frames that have to be stored, N is preferably chosen to be one, with the same digital signals being transmitted in consecutive pairs of frames but modulating subcarrier in opposite spatial phasing in corresponding scan lines in the two frames of each pair. If the subcarrier for digital data is an odd multiple of half scan line frequency having its phase shifted 180° between the end of each scan line and the beginning of the next, frame-to-frame reversal of subcarrier phase in corresponding scan lines of consecutive frames occurs automatically. If the subcarrier for digital data is an even multiple of half scan line frequency with phase continuity from one scan line to the next in each frame, frame-to-frame reversal of subcarrier phase in corresponding scan lines of consecutive frames requires a switch in subcarrier phase to be made at corresponding points in each consecutive frame.

The repetition of the digital information in similar spatial phasing in each successive pair of line scan intervals and the further repetition of the digital information in opposite spatial phasing in each successive pair of frames reduces the channel capacity for digital signal (presuming the absence of interfering composite video signal) four times, but significant advantages are obtained in return. There is a significant reduction in the amount of interference from the composite video signal, owing to cancellation of portions of that signal during the comb-filtering processes. In particular, chrominance information and static luminance information are almost completely removed from the frequency spectrum. At the same time the digital data combines in accordance with algebraic addition, while random noise combines in accordance with vector addition, to increase the energy of the digital data by 6 dB respective to random noise and by at least 3 dB respective to the luminance signal components that change from frame to frame. Furthermore, impulse noise that rings the video IF amplifier is much less likely to destroy the digital information in four scan lines than in one. These improvements in signal strength versus noise translate into a lessening of the expected error rate and in a reduced need for error-correcting coding; the reduced need for error-correcting coding lessens the overhead associated with such coding and gains back some portion of the channel capacity.

The repetition of the digital information in similar spatial phasing in each successive pair of line scan intervals and the further repetition of the digital information in opposite spatial phasing in each successive pair of frames places the digital information in portions of the spectrum known to television engineers as the Fukinuki "holes". See for example, T. Fukinuki et al., "Extended Definition TV Fully Compatible with Existing Standards", IEEE Transactions on Communications, Vol. COM-32, No. 8, August 1984, pages 948–953; and T. Fukinuki et al., "NTSC FULL COMPATIBLE EXTENDED DEFINITION TV PROTO MODEL AND MOTION ADAPTIVE PROCESSING", reprinted from IEEE Communications Society IEEE Global Telecommunications Conference, No. 4.6, Dec. 2–5, 1985, pages 113–117; the disclosures of which are incorporated hereinto by reference thereto. In practice, the use of the Fukinuki "holes" for the transmission of video information has not proven to be completely satisfactory; the spatial and temporal correlation/anti-correlation patterns of additional video information prevent the degree of randomness of signal that is necessary for its being completely hidden in a normal television picture received by TV receivers already in the field. Attempts have been made by extended-definition television (EDTV) system designers to randomize the scanning pattern of the additional video information, in order to avoid its appearing in phantom form in the normal television picture. The problem of phantom Fukinuki-hole information appearing in the normal television picture is less severe where the energy of the information is low, as is the case with the subcarrier modulated with digital information, than when the energy of the Fukinuki-hole information has to be substantially as high as normal composite video signal, as is the case with extended video information. Transmitting the digital data on a quadrature VSB AM carrier suppresses the portions of the Fukinuki phantoms in the horizontal spatial frequencies below about 1 MHz which would otherwise be present in the in-phase video detector response.

Digital information unrelated to video and transmitted at high symbol rates tends to be spatially random, and coding techniques can be employed to increase the degree of spatial randomness. While in each consecutive pair of scan lines the digital information is repeated, as presented on a TV viewing screen these scan lines are separated by an intervening scan line because of the spatial interleaving in each TV frame of the scan lines of its final field with the scan lines of its initial field. Supposing the digital information has been encoded so as to be substantially spatially and temporally random as mapped against the raster scanning of a television screen, if one chooses a suitable form of modulation of the subcarrier for that digital information, it should be less distinguishable from noise than raster-scanned video information. Single-sideband amplitude-modulation (SSB AM) with suppressed subcarrier is the simplest modulation scheme that achieves substantially the maximum data rate for a given bandwidth. On-off keying (OOK), which codes ZEROs and ONEs as absence of carrier and presence of carrier, can result in patchiness in the "noise" contributed by the signals encoding digital information, particularly for coding schemes that allow long runs of ZEROs or ONEs, and particularly when considering images one frame at a time. This could be a lack of randomness that would occasionally cause the Fukinuki-hole information appearing in the normal television picture to be a perceptible phantom.

The inventors point out that a "constant-power" modulation scheme, such as provided by various forms of phase shift keying (PSK), is preferable from the standpoint of a viewer of Fukinuki-hole phantoms assessing them as being characterless noise and disregarding their presence. It is generally known by communications engineers that PSK has better capability of rejecting broad-spectrum interfering or "jamming" signals than any other form of digital modulation. The composite video signal can be considered to be a broad-spectrum interfering or "jamming" signal, the inventors point out. Repeating the PSK so as to place its spectra into the Fukinuki holes permits portions of this jamming signal to be eliminated by comb filtering.

When there is appreciable frame-to-frame change in luminance signal component in those areas of the television pictures generated from the composite video signals modified to include digital signal content, bandpass frame-comb filtering in the digital signal receiver cannot completely remove the luminance signal accompanying the digital signal sidebands. This is so in portions of frames containing moving images and is so in a pair of frames when a cut between camera takes occurs therewithin. Where an area of remnant luminance signal extends over a significant number of pixels in the horizontal direction or vertical direction, there is a high likelihood of appreciable local spatial correlation amongst adjacent pixels in that direction and thus of continuity of luminance energy across symbol boundaries of the digital information as mapped to image space. When crossing a symbol boundary in the horizontal direction or vertical direction, going from one random symbol to another, digital information has a 50% chance of being a ONE or ZERO in the random symbol gone to. These facts manifest themselves in the frequency spectra of the PSK and of the remnant luma having little interaction with each other. Consequently, the synchronous detection of the PSK carrier in the horizontal direction during symbol recovery will strongly discriminate in favor of the PSK modulating signal and generally will strongly discriminate against the remnant luminance signal.

The frequency spectrum of components of the composite video signal descriptive of fast-slewing video signal transitions at edges transversal to scan lines can be made to be less interfering with the frequency spectrum of the subcarrier with keyed phase shift, the inventors point out, if the subcarrier is an odd multiple of half scan line frequency and has its phase shifted 180° between the end of each scan line and the beginning of the next. The reduced interference between the frequency spectra will reduce the incidence of error associated with the synchronous detection of symbols. Most of the high-frequency energy in a luminance signal having edges transversal to scan lines is located at even multiples of half scan line frequency. While the digital codes used as keying signal are frequently chosen to have the same number of ZEROs and ONEs in order to suppress the subcarrier, so the subcarrier being located at an odd multiple of half scan line frequency would appear not to be particularly significant, choosing the symbol rate to be a multiple M times scan line frequency will cause a substantial portion of the energy in the sidebands of the subcarrier to be located close to odd multiples of half scan line frequency, providing that M=2N, where N is a positive integer as large as permitted by the video bandwidth available.

For example, choosing N=8 results in a SSB BPSK signal with 256 $f_H$=4,027,971 Hz bandwidth, in which a symbol variation (n/256) times maximum symbol rate places a respective sideband at an odd multiple of half scan line frequency, where n is any positive number from 1 to 256. Such an SSB BPSK signal can be formed as the upper sideband of a DSB BPSK carrier and separated by filtering for downconversion in frequency to a 6.5 $f_H$=102,273 Hz subcarrier. The resulting SSB BPSK signal extends from 102,273 Hz to 4,130,244 Hz, so it does not interfere with the FM sound carrier offset from the video carriers so as to be in a 4.2–4.8 MHz band as referred to "zero" video carrier frequency. Since the SSB BPSK signal is an "upper" sideband, there is no appreciable energy between the half band frequency of 2,116,259 Hz and the uppermost frequency of 4,130,244 Hz to interfere with the chrominance sidebands of the color subcarrier. As compared to QPSK or MPSK, which are invariably DSB in nature, the inventors find "upper" SSB BPSK is better able to avoid putting appreciable energy into the chrominance sidebands of the color subcarrier, while utilizing as much of the baseband bandwidth of the composite video signal as possible. The reduction of energy in the portion of the spectrum in which chroma resides in the composite video signal substantially reduces the "chroma noise" perceived by a person viewing the screen of a TV receiver that separates chroma from luma by conventional bandpass filtering rather than by bandpass line-comb filtering, when the composite video signal with PSK subcarrier buried therein is being received.

The inclusion of error-correcting codes in the digital data is advisable. A principal reason for using such error-correcting codes is to be able to correct in the digital signal receiver those burst errors caused by impulse noise, but the error correction procedures correct as well those errors arising from remnants of luminance and chrominance signals that are left after comb filtering and are of such nature as to cause jamming interference with the PSK. Another principal reason for using such error-correcting codes is to be able to correct for inter-symbol error arising from signaling close to the channel bandwidth capabilities. Coding of the digital signal can also be done prior to its transmission so as to randomize the patterns in the Fukinuki phantoms when the data tends to be repetitive, and appropriate decoding will then be done in the digital receiver.

There is a substantial amount of synchronizing information available in the composite video signal that the PSK is buried in, so differential encoding in which ZEROs and ONEs are encoded by absence of or presence of phase shift at each predicted keying interval is not necessary. Direct encoding of ZEROs and ONEs as respective phases of the PSK subcarrier can be used, in which pairing of errors is less likely to occur. On the other hand, timing errors can arise during comb-filtering of redundant PSK subcarrier from the composite video signal and are better tolerated by PSK that uses differential encoding.

SUMMARY OF THE INVENTION

The invention in various aspects thereof relates to a system for transmitting digital information buried in a composite video signal, using a phase-shift-keyed (PSK) subcarrier having its spectral components in the Fukinuki holes of the composite video signal. The invention relates in various other aspects thereof to a system for receiving digital information transmitted via the PSK subcarrier with its spectral components in the Fukinuki holes of the composite video signal and separating the digital information from the composite video signal. In preferred systems embodying the invention, in order to reduce the interaction of the composite video signal frequency spectrum with the PSK frequency spectrum, the PSK subcarrier is of a frequency that is an odd multiple of half scan line frequency, the subcarrier having its phase reversed at corresponding points in each line and at corresponding points in each frame; and the symbol rate is a multiple of scan line frequency that is an integral power of two. In the more preferred systems embodying the invention, in order to reduce the spectral energy of the PSK in the band of composite video signal frequencies including chrominance information, an upper single sideband binary phase-shift keyed (SSB PSK) subcarrier is employed having a frequency that is a few times odd multiple of half scan line frequency.

DETAILED DESCRIPTION

Figure 1:
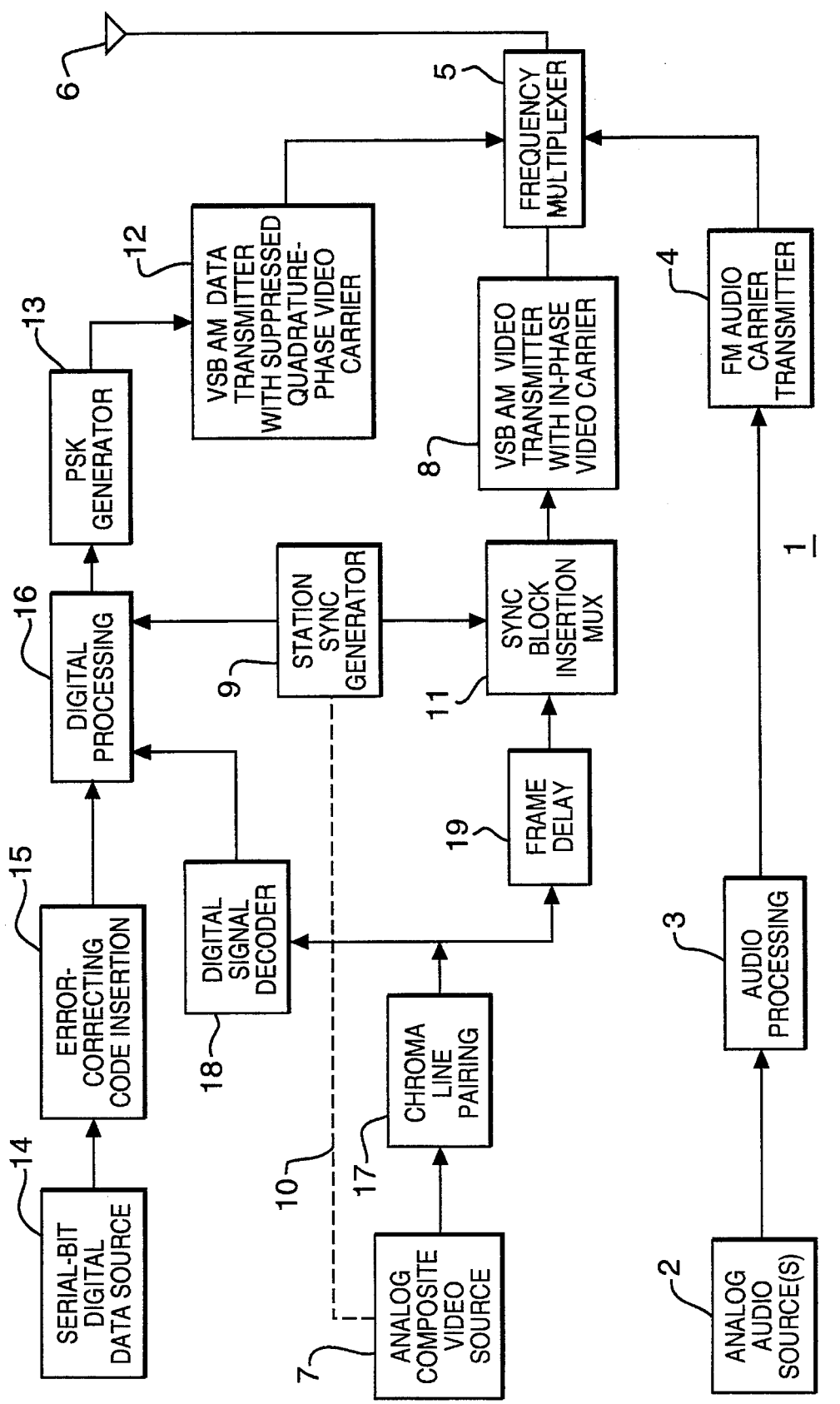
FIG. 1 is an overall schematic diagram of a television transmitter for transmitting a television signal with a digital signal buried therewithin, which television transmitter embodies aspects of the invention.

Generally, equalizing delays have been omitted from the drawing figures to simplify them and to make them easier to understand. One skilled in the art of video signal processor design will appreciate the need for such delays to properly time-align pixels or data subject to different delays on different processing paths due to the differing processing performed in those paths. One skilled in the art would understand where such delays would be necessary and how long each of the delays would have to be, and such delays will not be described or discussed below. In logic circuitry, one skilled in the art would understand how to provide the shimming delays required to overcome undesired "logic race" conditions or to compensate for latent delays in performing logic operations; and details of logic circuitry design with regard to providing shimming delay will not be discussed below. Further, where an analog-to-digital converter (ADC) is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

FIG. 1 shows a television transmitter 1 for transmitting a television signal with a digital signal buried therewithin. A source 2 supplies one or more analog audio signals to audio processing circuitry 3 which supplies a modulating signal to an audio carrier transmitter 4 for modulating the frequency of the audio carrier wave. The audio processing circuitry 3 includes delay as needed for synchronizing sound and picture. The audio processing circuitry 3, in accordance with customary practice, also includes pre-emphasis networks for the analog audio signal(s) and may include apparatus for generating stereophonic and secondary audio program (SAP) subcarriers for inclusion in the modulating signal supplied to the audio carrier transmitter 4. The frequency-modulated (FM) audio carrier is typically supplied from the transmitter 4 to a multiplexer 5 to be frequency-multiplexed with in-phase and quadrature-phase VSB AM picture carriers. In a television transmitter 1 for over-the-air broadcasting, this multiplexer 5 typically takes the form of an antenna coupling network and the resulting frequency-multiplexed signal is broadcast from a transmitting antenna 6. A television transmitter for the head end of a cable broadcasting system will not have the transmitting antenna 6 used in over-the-air broadcasting. The multiplexer 5 will take different form, with the frequency-multiplexed signal from the channel under consideration being further frequency-multiplexed with the frequency-multiplexed signals from other channels, and with the resulting signal being applied by linear amplifiers to the trunk cables of the cable broadcasting system.

In FIG. 1 a source 7 supplies an analog composite video signal that is the basis for the modulating signal supplied to a transmitter 8 that in turn supplies the VSB AM picture carrier to the multiplexer 5, there to be frequency-multiplexed with the frequency-modulated (FM) sound carrier. The vertical synchronizing pulses, horizontal synchronizing pulses and color burst of analog composite video signal from the source 7 are synchronized with corresponding signals supplied by a station synchronizing signal generator 9. A control connection 10 between the source 7 of composite video signal and the station sync generator 9 symbolizes the means used for this synchronization. Where the source 7 is a remote generator of composite video signal, such as a downtown studio or another television station networked with the local television station, the control connection 10 may be a genlock connection to the station sync generator 9. Where the source 7 is a local camera, that local camera may receive synchronization information from the station sync generator 9 via the control connection 10. These and other synchronizing schemes including those for video tape recorders and telecine apparatus are familiar to those skilled in the art. Typically, a time-division multiplexer 11 is used to insert sync block information including vertical synchronizing pulses, horizontal synchronizing pulses, equalizing pulses, color burst and pedestals (commonly referred to as "porches") into the composite video signal applied as modulating signal to the picture carrier transmitter 8 in place of original sync block information.

The FIG. 1 television transmitter 1 differs from those previously used in that a further transmitter 12, in response to a PSK subcarrier supplied thereto as a modulating signal from a PSK generator 13, supplies a VSB AM suppressed carrier in quadrature phasing with the VSB AM video carrier to the multiplexer 5, there also to be frequency-multiplexed with the frequency-modulated (FM) sound carrier. A source 14 supplies a digital signal in serial-bit form to apparatus 15 for inserting additional bits of error-correcting code into the serial-bit stream applied to digital processing circuitry 16. The digital processing circuitry 16, which will be described in detail further on in this specification with reference to FIG. 3 of the drawing, supplies keying signal to the PSK generator 13. The transmitter 8 that supplies the VSB AM video carrier to the multiplexer 5 is carefully designed and operated so as to avoid incidental phase modulation that might interfere with the quadrature-phase VSB AM suppressed carrier modulated with the PSK subcarrier. The transmitter 12 is constructed so as to suppress the quadrature-phase carrier and sidebands thereof up to a few hundred kHz, so as not to interfere in any way with the transmission of synchronizing signals by the in-phase-video-carrier transmitter 8. Since the quadrature-phase VSB AM carrier modulated with the PSK subcarrier is suppressed, the phasing of the combined VSB AM carriers is not appreciably different from that of the in-phase VSB AM video carrier. While FIG. 1 shows the transmitters 8 and 12 as being separate from each other, in practice the same upper sideband filters and final amplifier stages can be shared by the transmitters 8 and 12.

FIG. 1 shows chroma line pairing circuitry 17 connected after the source 7 of analog composite video signal and before the sync-block-insertion multiplexer 11. A digital-signal decoder 18, used for detecting the errors that the transmitted composite video signal will cause in the detection of digital signal is connected after the chroma line pairing circuitry 17 if it is used. If the chroma line pairing circuitry 17 is not used, the digital-signal decoder 18 can be connected to receive analog composite video signal directly from the source 7 thereof. The latency, or delay, associated with detecting the errors is somewhat more than the duration of one frame. So, when the digital-signal decoder 18 is used for error prediction, the composite video signal supplied from the source 7 (and modified by the chroma line pairing circuitry 17 if it is used) is subjected to about one-frame delay by a frame delay circuit 19 before its being supplied to the video transmitter 8. The frame delay circuit 19 is, in accordance with current practice for constructing frame delay, assumed to be constructed using digital random access memory (RAM) operated in a read-then-write-over mode. The analog composite video signal is converted to digital composite video signal for writing the RAM, the sampling rate in the analog-to-digital conversion typically being chosen to be a multiple of the color subcarrier frequency. The chroma line pairing circuitry 17, if used, is preferably constructed in digital hardware. In such case, analog-to-digital conversion is performed on the input signal to the chroma line pairing circuitry 17; and digital output signal from the chroma line pairing circuitry 17 is used for writing the RAM without need for analog-to-digital conversion. The actual latency or delay through the frame delay circuit 19 may depart somewhat from the duration of one frame to compensate for other delays in the composite video signal path to the video transmitter 8. The READ output of the RAM supplies digital output signal to a digital-to-analog converter (DAC) for supplying frame-delayed analog composite video signal to the sync-block-insertion multiplexer 11.

Figure 2:
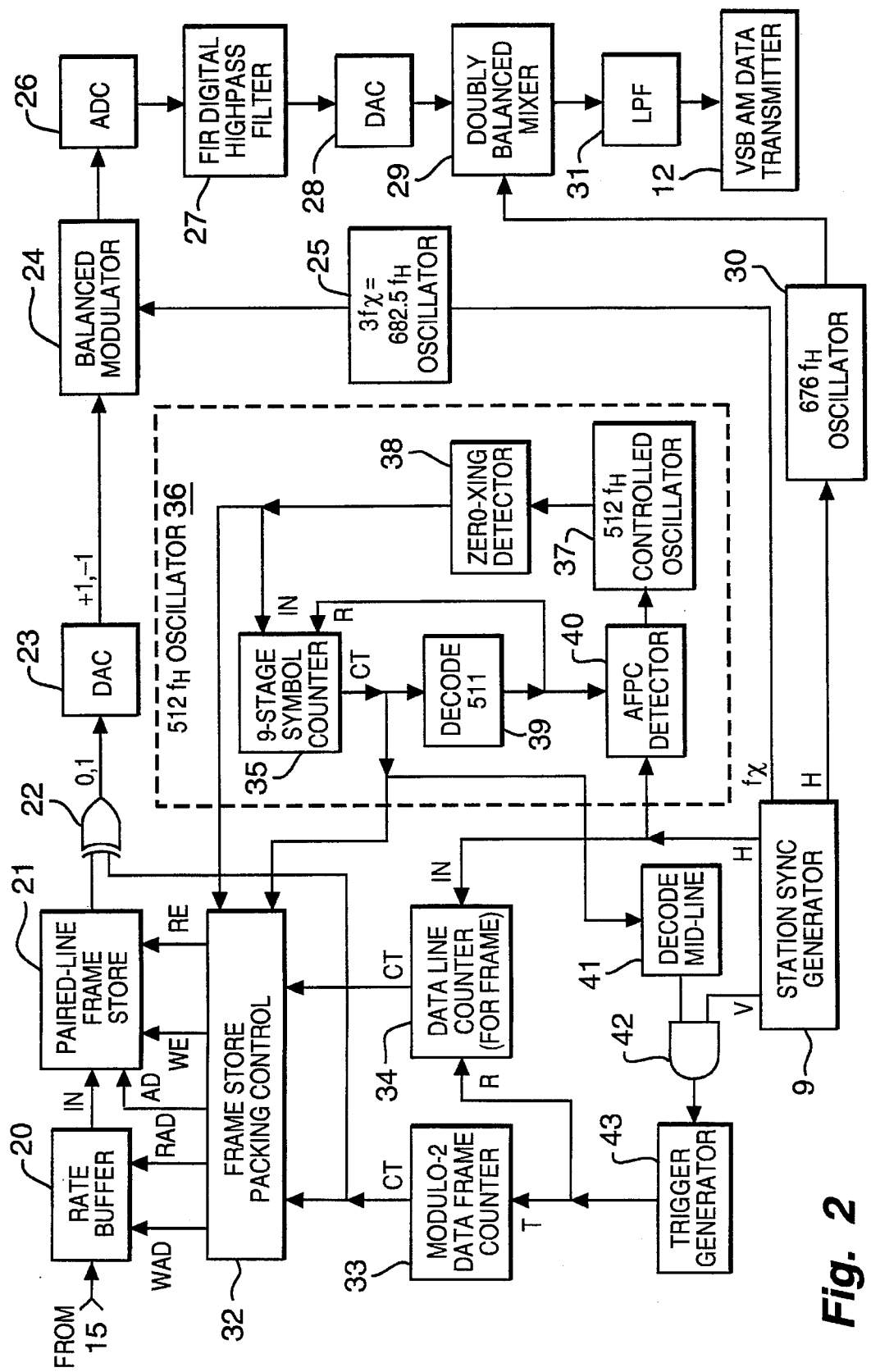
FIG. 2 is a schematic diagram showing in detail a preferred embodiment of the digital processing circuitry and PSK generator of FIG. 1.

FIG. 2 shows in more detail the construction of the PSK generator 13 and the digital processing circuitry 16 of the FIG. 1 TV transmitter 1 when the form of PSK is the preferred single-sideband binary phase-shift keying (SSB BPSK). The apparatus 15 supplies in serial-bit form to a rate buffer 20 digital signal including bits of error-correcting code. The rate buffer 20 is a first-in/first-out (FIFO) memory that supplies the bits on a regularly timed basis to a frame store memory 21 for writing during and only during alternate frames of the analog composite video signal supplied by the source 7. The frame store memory 21 is a "paired-line" frame store storing the number of scan lines (262.5) in a conventional television field or field store therefor; this is possible because each scan line and the final half scan line of digital data in the memory 21 is scanned and scanned once again before advancing to the next consecutive pair of scan lines. Each scan line and the final half scan line of digital data in the memory 21 is also read and re-read during respective frames of consecutive pairs of frames of composite video signal, to generate output signal supplied as a first input signal to a two-input exclusive-OR gate 22. The data supplied from the output of XOR gate 22 corresponds to the data XOR gate 22 receives as its first input signal except for a frame-to-frame reversal of logic sense caused by the XOR gate 22 responding to its second input signal. The second input signal switches from ZERO to ONE between the initial and final fields of odd frames, and it switches from ONE to ZERO between the initial and final fields of even frames. This reverses the logic sense in the middle of scan line 263 when the final half scan line in the memory 21 is read and re-read. The frame-to-frame reversal of carrier phase is done in midfield to simplify the counter arrangements for providing frame-to-frame spatial alignment of the paired scan lines with repeated chrominance and PSK in the portions of the image frame that are viewed on the TV screen. In the following portions of this specification, then, the "frames" for digital data will be presumed to be offset a field duration from the frames of the composite video signal.

The bit-serial stream of ZEROs and ONEs from the XOR gate 22 is supplied to a digital-to-analog converter (DAC) 23. The DAC 23 supplies modulating signal to a balanced modulator 24, which modulating signal is of a prescribed positive value responsive to a ZERO and is of a prescribed negative value responsive to a ONE. The prescribed negative level of analog modulating signal has the same absolute value as the prescribed positive level of analog modulating signal. The design of the sampling clock rejection lowpass filter of the DAC 23 is of particular concern since it largely determines (a) the actual symbol rate that can be achieved without significant inter-symbol error and (b) the amount of inter-symbol error associated with signaling close to the Nyquist limit. The fact that the PSK signal is being transmitted together with a relatively large composite video signal that includes frequent timing references helps in determining the exact positioning in time of symbols; this allows somewhat more latitude in the filter design allowing it more nearly to approximate the (sin x)/x ideal filter response that allows for zero-intersymbol error when the symbol rate is at the Nyquist limit.

A controlled oscillator 25 supplies a carrier wave to the balanced modulator 24, which carrier wave is of a frequency 10.74 MHz that is three times the color subcarrier frequency $f_X$ or 682.5 times the horizontal scan line frequency $f_H$. The output signal from the balanced modulator 24 is double-sideband binary phase shift keying (DSB BPSK) of the 10.74 MHz carrier, one sideband of which is to be translated in frequency to fit within the baseband allotted to the composite video signal.

The suppression of one sideband of the DSB PSK signal can be done with perfect phase linearity in the digital regime using finite-impulse-response (FIR) filtering. Accordingly, the DSB BPSK output signal from the balanced modulator 24 is digitized by an analog-to-digital converter (ADC) 26 for application as input signal to an FIR digital highpass filter 27 having a cut-off frequency just above the 10.74 MHz carrier frequency as referred to the analog regime. The highpass filter 27 response is converted to an analog SSB BPSK signal by a digital-to-analog converter 28. The ADC 26, the FIR digital highpass filter 27, and the DAC 28 can be clocked at twelve times the color subcarrier frequency $f_X$, for example. At such high clocking rate, the ADC 26 is preferably a flash converter.

The analog SSB BPSK signal is supplied by DAC 28 to a mixer 29 to be translated in frequency to fit within the baseband allotted to the composite video signal. The mixer 29 is of subheterodyne type, with an oscillator 30 supplying the mixer 29 a carrier at 676 times the horizontal scan line frequency $f_H$ or 10.64 MHz. Accordingly, the mixer 29 converts SSB BPSK signal that is the upper sideband of the 10.64 MHz carrier frequency to be the upper sideband of the carrier at 6.5 times the horizontal scan line frequency $f_H$ or 102 273 Hz. The mixer 29 is preferably of a doubly balanced type, balanced both against the 10.64 MHz carrier supplied by the oscillator 30 and against the 10.74 to 14.77 MHz SSB BPSK sideband supplied by DAC 28. This eases the design requirements on an analog low-pass filter 31 cascaded after the mixer 29 to suppress the image at 21.38 to 25.51 MHz. The low-pass filter 31 should be as linear-phase in nature as possible up to just before its cut-off frequency, which has to be above 4.1 MHz and can be almost 10.74 MHz. The response of this low-pass filter 31 is supplied as modulating signal to the quadrature-phase VSB AM video carrier transmitter 12.

Alternatively, using a lowpass FIR digital filter and a 10.84 MHz (689 $f_H$) oscillator to carry out a superheterodyne in the mixer 29, rather than the bandpass FIR digital filter 27 and the 10.64 MHz (676 $f_H$) oscillator 30 to carry out the subheterodyne, places more difficult design requirements on the analog low-pass filter 31 cascaded after the mixer 29. The cut-off frequency for the filter 31, which has to be above 4.1 MHz, is then preferably below 6.61 MHz, in case the mixer 29 is not perfectly balanced. Achieving phase linearity up to and just past 4.1 MHz is more difficult to do with the lower cut-off frequency.

The writing and reading of the data buffer 20 and of the frame store memory 21 is controlled by frame-store packing control circuitry 32. The packing control circuitry 32 receives a DATA FRAME COUNT signal from a modulo-2 data frame counter 33, a DATA LINE COUNT signal from a data line counter 34, and a SYMBOL COUNT signal from a symbol counter 35. The DATA FRAME COUNT bit is supplied from the frame counter 33 as a first input signal to a two-input AND gate in the packing control circuitry 23 used to generate READ ENABLE signal for the rate buffer 20 and WRITE ENABLE signal for the frame store 21. The least significant bit of the DATA LINE COUNT signal output from the counter 34 is the second input signal to this AND gate. The more significant bits of the DATA LINE COUNT signal are applied by the packing control circuitry 23 to the frame store 21 as paired-line addressing. The SYMBOL COUNT signal is applied by the packing control circuitry 32 to the frame store 21 as within-line addressing. The paired-line addressing and within-line addressing comprise the complete addressing AD the packing control circuitry 32 applies to the frame store 21 in FIG. 2. The circuitry 32 also generates a write enable signal WE for the frame store 21, read addressing RAD supplied to the rate buffer 20 in synchronism with the complete addressing AD supplied to the frame store 21 during the writing thereof, and write addressing WAD for the rate buffer 20. When the digital data is selectively transmitted, the circuitry 32 also generates a read enable signal RE for the frame store 21.

The station sync generator 9 supplies horizontal sync pulses H to a count input of the data line counter 34, which counts the number of lines in each frame of data to generate DATA LINE COUNT signal. The horizontal sync pulses H are also supplied to the oscillator 30, for controlling the frequency of its oscillations to be 676 times the horizontal scan line frequency $f_H$, and to an oscillator 36, for controlling the frequency of its oscillations to be 512 times the horizontal scan line frequency $f_H$.

FIG. 2 shows the 512 $f_H$ oscillator 36 as including a voltage-controlled oscillator (VCO) 37, a zero-crossing detector 38, the symbol counter 35, a 511-count decoder 39 and an automatic frequency and phase control (AFPC) detector 40. The symbol counter 35 comprises nine binary counting stages. The zero-crossing detector 38, which might be more properly termed an average-axis-crossing detector generates a pulse whenever the sinusoidal oscillations of the oscillator 36 cross their average axis in a prescribed direction. The zero-crossing detector 38 customarily comprises a limiter amplifier that generates square waves responsive to the sinusoidal oscillations of the VCO 37, a differentiator for generating pulses responsive to transitions of these square waves, and a clipper for separating pulses of one polarity to be supplied to the frame store packing control circuitry 32 for timing purposes. These pulses are also supplied to the symbol counter 35 to be counted in each consecutive line, thereby to generate the SYMBOL COUNT signal supplied to the packing control circuitry 23. The 511-count decoder 39 decodes the SYMBOL COUNT reaching 511 to generate a pulse. Instead of letting the SYMBOL COUNT simply roll over to arithmetic zero because full count is an integral power of two, each pulse from the 511-count decoder 39 can be used to reset the counter 35 on the next pulse supplied to the counter 35 by the zero-crossing detector 38, thus returning SYMBOL COUNT to arithmetic zero. The 511-count decoder 39 supplies pulses to the AFPC detector 40, to be compared with the horizontal sync pulses H to develop an AFPC voltage supplied to the VCO 37. This completes a negative feedback loop that adjusts the frequency of the VCO 37 oscillations to be 512 times the horizontal scan line frequency, or 8 055 943 Hz. In practice, the 511-count decoder 39 may be dispensed with, and the carry pulses from the final binary counting stage of the symbol counter 35 may be supplied to the AFPC detector 40 for comparison with the horizontal sync pulses H.

The construction of the oscillator 30 can be similar to that shown for the oscillator 36. A 676-count decoder is used rather than using a 511-count decoder as in the oscillator 36, however.

The symbol counter 35 supplies the SYMBOL COUNT signal to a decoder 41 that generates a ONE for a few values of SYMBOL COUNT in the middle of scan lines and otherwise generates a ZERO. The decoder 41 output signal is supplied as a first input signal to a two-input AND gate 42. The station sync generator 9 supplies vertical sync pulses V as a second input signal to the AND gate 42. Each rising edge of the output signal of the AND gate 42, which occurs midway through scan line 263 in the composite video signal, is sensed in trigger generation circuitry 43 and used to generate a trigger pulse supplied to the modulo-2 data frame counter 33, so as to advance the DATA FRAME COUNT signal. This trigger pulse is also applied to the data line counter 34 to reset its DATA LINE COUNT, which should then be 512, to arithmetic zero.

Figure 3:
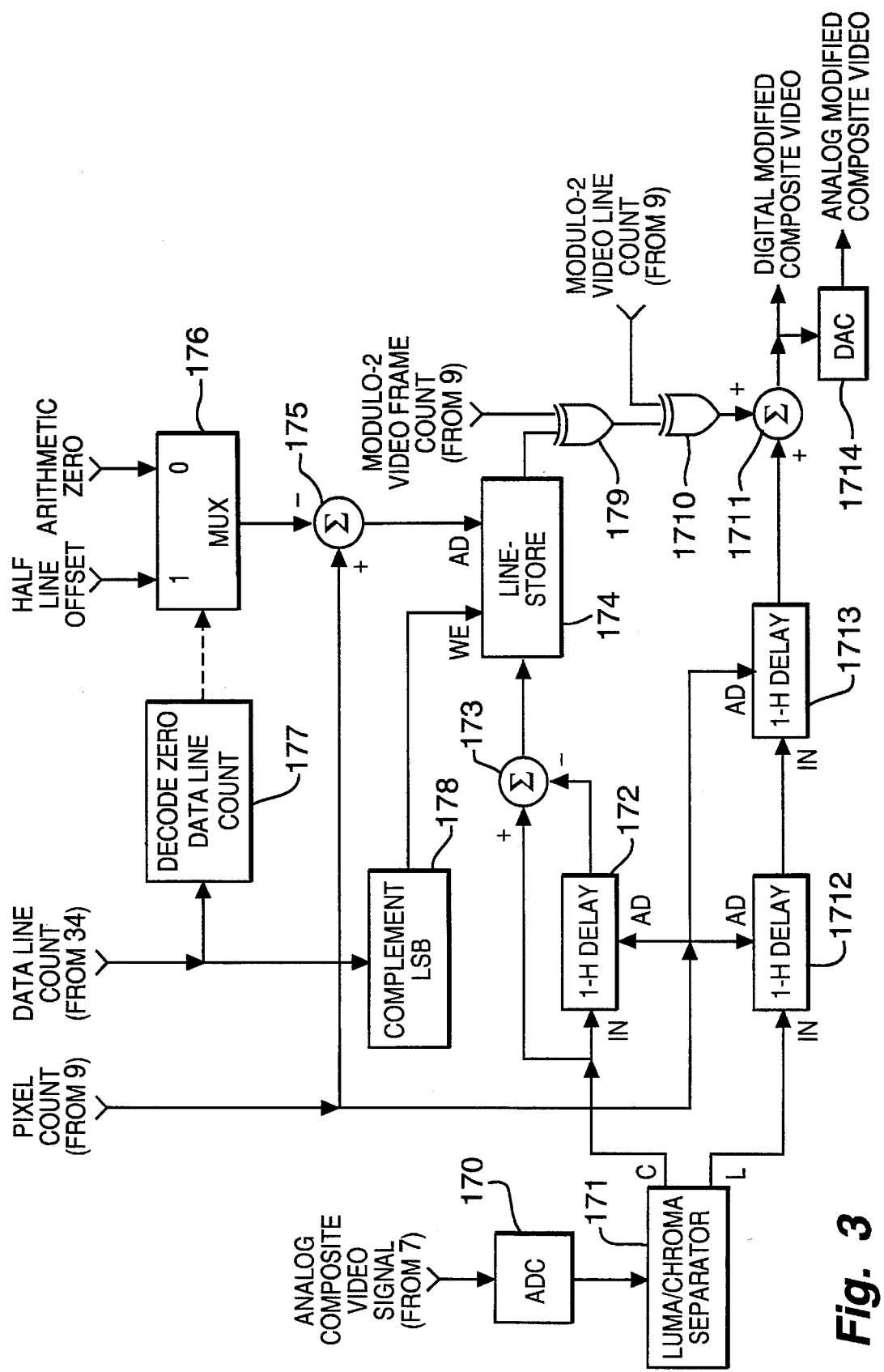
FIG. 3 is a schematic diagram of chroma line-pairing circuitry as can be used in the FIG. 1 television transmitter in furtherance of aspects of the invention.

FIG. 3 shows how the chroma line pairing circuitry 17 can be constructed in digital hardware. Analog composite video signal supplied from the source 7 thereof to the circuitry 17 is digitized by an analog-to-digital converter 170 therewithin. The resulting digital composite video signal is applied to a digital luma/chroma separator 171, which can be any one of a number of types known in the art. The separated digital chrominance signal C from the luma/chroma separator 171 is supplied as input signal to a 1-H delay line 172 and as a minuend input signal to a digital subtractor 173. The separated digital chrominance signal C as delayed by the duration of one scan line and supplied as output signal from the 1-H delay line 172 is supplied as subtrahend input signal to the subtractor 173. The difference output signal from the subtractor 173 averages the values of corresponding pixels of chroma in the current and previous scan lines.

This two-line average is supplied to the write-input port of a linestore memory 174, which is conditioned only during alternate scan lines for being written after being read, is not otherwise conditioned for being written, and is read from every scan line. The linestore memory 174 is presumed to be a RAM furnished PIXEL COUNT from a digital subtractor 175 as addressing for its storage locations. The subtractor 175 receives per scan line PIXEL COUNT from the station sync generator 9 as its minuend input signal, and receives the output signal from a multiplexer (MUX) 176 as its subtrahend input signal. During the latter half of scan line 263 in each frame of composite video signal, the MUX 176 selects a number equal to the number of pixels in half a scan line as the subtrahend signal for the subtractor 175. Otherwise, the MUX 176 selects arithmetic zero as the subtrahend signal for the subtractor 175. This can be arranged by using a decoder 177 to detect the DATA LINE COUNT from the data line counter 34 of FIG. 2 being arithmetic zero to generate a logic ONE for application to the MUX 176 as its control signal. The least significant bit of the DATA LINE COUNT is one's complemented by a bit-complementor 178 and applied to the linestore memory 174 as a write enable (WE) signal, to condition the memory for being written after being read only during alternate scan lines.

While the read-out from the linestore memory 174 exhibits frame-to-frame change of 180° of the spatial phasing of the suppressed color carrier in the horizontal direction, it does not exhibit the correct line-to-line change of 180° of the spatial phasing of the suppressed color carrier in the horizontal direction. The read-out from the linestore memory 174 is supplied as a first input signal to a two-input XOR gate 179 that receives as a second input signal a modulo-2 count of the frames in the composite video signal. The output signal from the XOR gate 179, which is supplied as a first input signal to a further two-input XOR gate 1710, exhibits neither frame-to-frame nor line-to-line change of the spatial phasing of the suppressed color carrier in the horizontal direction. The XOR gate 1710 receives as a second input signal a modulo-2 count of the lines in the composite video signal. The paired-line digital chrominance signal C' supplied as output signal by the XOR gate 1710 exhibits change of 180° of the spatial phasing of the suppressed color carrier in the horizontal direction from scan line to scan line, as should be exhibited by a proper chrominance signal. If the sense of polarity of the color subcarrier is incorrect with respect to the sense of polarity of the color subcarrier in the chrominance signal C from the luma/chroma separator 171, as determined by finding marked anti-correlation between the chrominance signal C delayed two scan lines and the chrominance signal C', the modulo-2 count of the lines in the composite video signal is altered by one; the circuitry for doing this is not shown in FIG. 3. The paired-line digital chrominance signal C' is applied to a digital adder 1711 as its first summand input signal, there to be added together with a second summand input signal to generate a digital modified composite video signal as sum output signal from the adder 1711. A digital-to-analog converter 1714 may be included in the chroma line pairing circuitry 17 for converting this digital modified composite video signal to an analog modified composite video signal for application to the digital-signal decoder 18.

The paired-line digital chrominance signal C' is delayed by two lines on average from the digital chrominance signal C and the digital luminance signal L separated by the luma/chroma separator 171. The separated digital luminance signal L from the separator 171 is supplied as input signal to a cascade connection of two 1-H delay lines 1713 and 1714. The output signal of delay line 1714 is delayed for the duration of two scan lines respective to the separated digital luminance signal L the separator 171 supplies as input signal to delay line 1713, bringing into temporal alignment with the paired-line digital chrominance signal C' the luminance signal supplied as output signal from delay line 1714 and applied to the adder 1711 as its second summand input signal.

Each of the 1-H delay lines 172, 1713 and 1714 can be a RAM operated in a read-then-write-over mode and addressed, like the linestore memory 174, by PIXEL COUNT from a suitable counter. The two scan line durations of delay in the FIG. 2 embodiment of the chroma line pairing circuitry 17 are compensated against by shortening the delay in the "frame" delay 19 in like amount.

Motion-adaptive filters for eliminating significant luminance signal content in the Fukinuki holes are known in the art from work done in EDTV and in television tape recording. Such filtering of the composite video signal supplied by the source 7 in FIG. 1 will reduce the likelihood of interference with the digital data modulating a subcarrier subsequently buried in the composite video signal, but the changes in the composite video signal cause barely perceptible changes in the images viewed on screen. In television tape recording using folded-spectrum luminance signals, motion-adaptive filters are used to prepare the luminance signal for folding its upper-frequency half band into the Fukinuki holes of its lower-frequency band, thereby to generate a folded-spectrum video signal of a bandwidth half that occupied by the luminance signal prior to spectrum folding. Such a motion-adaptive filter is described in C. H. Strolle et allii U.S. Pat. No. 5,113,262 issued 12 May 1992, entitled "VIDEO SIGNAL RECORDING SYSTEM ENABLING LIMITED BANDWIDTH RECORDING AND PLAYBACK" and assigned to Samsung Electronics, Co., Inc. by the inventors pursuant to agreements to so assign their inventions in force at the time their invention was made. If this type of motion-adaptive filter is included in the television transmitter 1, it is convenient to locate it in the FIG. 3 chroma line pairing circuitry, within the delay path from the luma/chroma separator 171 to the adder 1711. One of the 1-H delay lines 1713 and 1714 can be replaced by a delay line affording somewhat less delay, to compensate for the latency of the motion-adaptive luminance signal filter.

Figure 4:
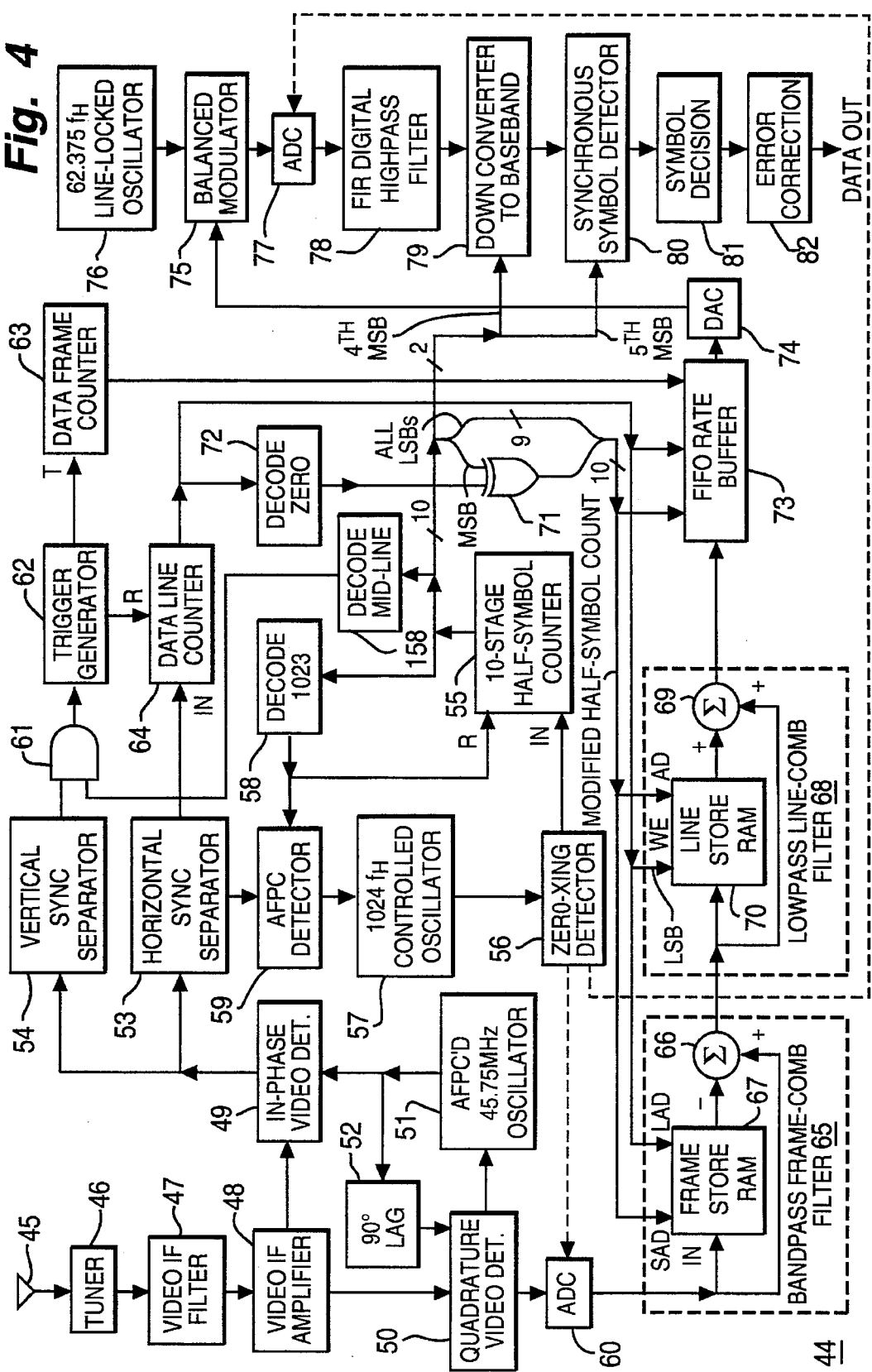
FIG. 4 is a schematic diagram of a digital-signal receiver for receiving a television signal with a digital signal buried therewithin and extracting the buried digital signal, which digital-signal receiver embodies further aspects of the invention.

FIG. 4 shows a digital-signal receiver 44 for receiving, from means such as an antenna 45, a television signal with a digital signal buried therewithin and extracting the buried digital signal. A tuner 46 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 47 selects the video intermediate frequencies for application as input signal to an intermediate-frequency (IF) amplifier 48 and rejects the image set of frequencies. The current custom is to use a surface-acoustic-wave (SAW) filter for the video IF filter 47 and to construct the video IF amplifier 48 within a monolithic integrated circuit (IC), as a multi-stage amplifier without interstage tuning. The video IF amplifier 48 supplies the amplified video IF signal to an in-phase synchronous video detector 49 and to a quadrature-phase synchronous video detector 50. An oscillator 51 oscillating with a nominal frequency of 45.75 MHz supplies its oscillations to the in-phase synchronous video detector 49 without phase shift and to a quadrature-phase synchronous video detector 50 with 90° lagging phase shift provided by a shift network 52. The oscillator 51 has automatic frequency and phase control (AFPC) responding to the output signal of the quadrature-phase synchronous video detector 50. The synchronous video detectors 49 and 50 are customarily included together with the video IF amplifier 48 and portions of the oscillator 51 within the IC. Each of the video detectors 49 and 50 may either be of exalted carrier type or of true synchronous type. In-phase modified composite video signal recovered by the in-phase synchronous video detector 49 is supplied to a horizontal sync separator 53 and to a vertical sync separator 54, which recover horizontal and vertical synchronizing pulses from the in-phase modified composite video signal, respectively.

The aspects of the digital-signal receiver 44 thusfar considered are generally familiar to persons skilled in the art of TV receiver design. There are some peculiarities in the preferred designs for the video IF filter 47, which will be described further on in this specification. The bandwidth of the quadrature-phase video detector 50 is as least as wide as that of a conventional video detector and in fact can be broader so as not to introduce inter-symbol interference into the PSK when the signaling rates approach the Nyquist limit.

In practice the digital receiver 44 usually will include ghost suppression circuitry, which is not separately and explicitly shown in FIG. 4, but will be described in more detail further on in this specification with reference to FIGS. 15–17 of the drawing. Each of the in-phase and quadrature-phase video detectors 49 and 50 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency, are extracted from selected vertical-blanking-interval (VBI) scan lines of the video signal detected by the in-phase synchronous video detector 49. The GCR signals are digitized and supplied as input signal to the computer for calculating the adjustable parameters of the ghost-cancellation and equalization filters. Alternatively or additionally, direct-current or low-frequency components in the quadrature-phase video detector 50 response can be sensed and used as a basis for calculating the adjustable parameters of the ghost-cancellation filters.

In the FIG. 4 digital-signal receiver 44, a HALF-SYMBOL COUNT signal is generated by a half-symbol counter 55 counting pulses generated by a zero-crossing detector 56 in response to sinusoidal oscillations received from a voltage-controlled oscillator 57. A decoder 58 decodes the PIXEL COUNT reaching 1023 to generate a pulse that resets the counter 55 on the next pulse supplied to the counter 55 by the zero-crossing detector 56, returning HALF-SYMBOL COUNT to arithmetic zero. The pulses generated by the decoder 58 are supplied to an AFPC detector 59 to be compared to the horizontal sync pulses H separated by the horizontal sync separator 53 for generating an automatic frequency and phase control (AFPC) voltage signal for application to the VCO 57. These arrangements control the frequency of the oscillations supplied from the line-locked VCO 57 to be 1024 times the horizontal scan line frequency $f_H$, or 16 111 886 Hz. The term "line-locked" used in reference to a controlled oscillator means that the frequency of its oscillations is maintained in constant ratio to the 15,734.264 Hz scan line frequency, which is customarily done by AFPC circuitry comparing the frequency of its oscillations as divided by a suitable factor to horizontal synchronizing pulses.

Pulses are supplied at 16 MHz rate from the zero-crossing detector 56 to an analog-to-digital converter 60, to time the sampling of the quadrature-phase video detector 50 response during the digitization thereof by the ADC 60. Sampling during digitization has to be done at well above color subcarrier frequency to avoid sampling chrominance too seldom, sampling somewhat more frequently than Nyquist rate being desirable in order to improve the cancellation of chrominance in subsequent lowpass line-comb filtering procedures. The rate of sampling during digitization has to be at least symbol rate; and, in the interest of being able to lowpass filter satisfactorily after converting the digital samples of comb filtering response back to the analog regime, the rate of sampling during digitization is preferably at, least a few times symbol rate. Digitizing at a multiple of symbol rate permits the phase of the sampling by the ADC 60 to be tweaked so quantizing errors appear only in the real symbol time and frequency spectra, and so do not give rise to inter-symbol confusion. Having the line-locked oscillator 57 oscillate at a multiple of symbol rate also avoids the need for a separate oscillator oscillating at symbol rate for timing the symbol-comb filtering procedures. Since the symbol rate is an integral power of two times the scan line frequency $f_H$, the most significant bit of HALF-SYMBOL COUNT toggles at mid-line, which is useful in addressing the RAMs used in the bandpass frame-comb and lowpass line-comb filters. The requirements on the linear-phase lowpass filtering after digital-to-analog conversion of the comb filter response are made less difficult by choosing a higher digitization rate for the digital comb filtering, but digitization and the timing thereof becomes more difficult. Digitizing at twice symbol rate causes the SSB BPSK output signal of a rate buffer used after comb-filtering to fall into the 4.05 to 5.03 MHz frequency range with the modulating frequency ranging from 25.6 kHz to 1.01 MHz, so reasonably linear-phase analog lowpass filtering of the comb filter response after its conversion to the analog regime is possible.

The possibilities of radiation back into earlier portions of the digital receiver 44 tending to make the receiver undesirably regenerative and of radio-frequency interference (RFI) with other apparatus are also factors to be considered in choosing the digitization rate in an ultimate design. The radiated radio-frequency (RF) power, particularly at high harmonics that fall within the input frequency tuning range of the tuner 46, tends to be less if the digitization rate is lower in frequency. Digitizing at twice symbol rate (16.12 MHz) causes the second harmonic spectrum of sampling before digitization to extend from 32.24 to 40.84 MHz and the third harmonic spectrum of sampling before digitization to extend from 48.36 MHz to 61.26 MHz. The gap between these harmonic spectra spans the 41 to 47 MHz video intermediate frequencies, lessening the risk of problems with regeneration owing to radiation back to the video IF filter 47 at the input of the video IF amplifier 48. The third harmonic spectrum of sampling before digitization can cause interference problems with channels 2 and 3, if the RF shielding of elements 46–52 of the digital receiver 44 is not done properly.

PIXEL COUNT is supplied from the pixel counter 55 to a decoder 158 that generates a ONE for a few values of PIXEL COUNT in the middle of scan lines and otherwise generates a ZERO. The decoder 158 output signal is supplied as a first input signal to a two-input AND gate 61. The vertical sync separator 54 supplies vertical sync pulses V as a second input signal to the AND gate 61. Each rising edge of the output signal of the AND gate 61, which occurs midway through scan line 263 in the composite video signal, is sensed in trigger generation circuitry 62 and used to generate a trigger pulse supplied to a modulo-2 data frame counter 63, so as to advance a regenerated DATA FRAME COUNT signal.

This trigger pulse is also applied to a data line counter 64 to reset the DATA LINE COUNT regenerated as its output signal, which should then be 512, to arithmetic zero. The data line counter 64 is connected to count the horizontal sync pulses H supplied from the horizontal sync separator 53. The DATA LINE COUNT is used to control the selection of the VBI scan lines containing GCR signals in the circuitry (not explicitly shown in FIG. 4) for acquiring data for the computer (also not explicitly shown in FIG. 4) that calculates the adjustable filtering parameters for the equalization and ghost-cancellation filters included within the video detectors 49 and 50.

The ADC 60 supplies digitized quadrature-phase video detector response as to a bandpass frame-comb filter 65. The bandpass frame-comb filter 65 comprises a digital subtractor 66 and a digital framestore 67 responding to signal samples applied to its input port to supply those signal samples at its output port the duration of one frame scan later in time. The digital framestore 67 is conveniently constructed as a RAM operated in a read-then-write-over mode. This RAM receives the DATA LINE COUNT from the counter 64 as line addressing (LAD) and the HALF-SYMBOL COUNT from the counter 55 as symbol addressing (SAD). The subtractor 66 receives as a minuend input signal from the ADC 60 digital samples of quadrature-phase video detector response in the current frame and receives as a subtrahend input signal the corresponding digital samples of the previous frame from the framestore 67. The difference signal from the subtractor 66 is the bandpass frame-comb filter 65 response, from which luminance components that exhibit frame-to-frame correlation are suppressed.

The bandpass frame-comb filter 65 response is supplied as input signal to a lowpass line-comb filter 68, which includes a digital adder 69 and a random access memory 70 that has the capability of being operated as a digital linestore. The RAM 70 is operated in a read-then-write-over mode and receives as addressing signal AD the single-bit output of an exclusive-OR gate 71 and all except the most significant of the bits of the HALF-SYMBOL COUNT from the counter 55. The least significant bit of the DATA LINE COUNT is used as a write enable (WE) signal for the RAM 70. The two-input XOR gate 71 has the most significant bit (MSB) of the HALF-SYMBOL COUNT applied thereto as a first input signal and has the output signal of a decoder 72 applied thereto as a second input signal. The decoder 72 decodes the DATA LINE COUNT from the counter 64 being zero during the latter half of scan line 263 of the composite video signal to supply a ONE, conditioning the response of the XOR gate 71 to be the one's complement of the MSB of the HALF-SYMBOL COUNT. At all other times the decoder 72 supplies a ZERO output signal, conditioning the response of the XOR gate 71 to be the same as the MSB of the HALF-SYMBOL COUNT. This addressing conditions the RAM 70 when operated in read-then-write-over mode to function as an H/2 delay line during the latter half of scan line 263 of each frame of the composite video signal and to function as a 1-H delay line at all other times. During the latter half of scan line 263 of each frame of the composite video signal, the digital adder 69 adds successive samples of that latter half scan line of bandpass frame-comb filter 65 response to corresponding successive samples of the earlier half scan line of that signal read from the RAM 70. During the other scan lines of each frame of the composite video signal, the digital adder 69 adds successive samples of the current scan line of bandpass frame-comb filter 65 response to corresponding successive samples of the just-previous scan line of that signal read from the RAM 70. The lowpass line-comb filter 68 removes the anti-phase chrominance in paired scan lines to generate during alternate scan lines of alternate frames a response in which PSK free of interfering chrominance appears.

A first-in/first-out (FIFO) rate buffer 73 is conditioned by the DATA FRAME COUNT and the least significant bit of DATA LINE COUNT to accept input samples from only those alternate scan lines (and half scan line) of each alternate frame in which PSK free of interfering chrominance appears in the response. The samples from the FIFO rate buffer 73 are supplied to a digital-to-analog converter 74 at the twice the 1 MHz symbol rate that obtains after rate-buffering to eliminate redundant digital data. The PSK from the DAC 74 cannot be synchronously detected directly, because it is impossible to sort the modulating frequency spectrum from its image spectrum by lowpass filtering. This due to the carrier frequency not exceeding the modulating frequency. An upconversion followed by single sideband selection is necessary before synchronously detecting the PSK to recover the symbol stream. Since the spacing between the lower and upper sidebands of the quadrature-phase picture carrier in the rate-buffered DAC 74 output signal is only 3.25 $f_H$, in order that this 51,136 Hz spacing be in as large ratio as possible to the carrier frequency to ease the difficulty of designing the single-sideband selection filter, the upconversion should be to as low a carrier frequency as feasible.

The upconversion is carried out in the FIG. 4 digital receiver 44 by applying the PSK signal from the DAC 74, which PSK signal extends up to 65.625 $f_H$ (or 1,032,561 Hz), to a mixer 75 for heterodyning with a sinusoidal 62.375 $f_H$ (or 981,425 Hz) carrier wave supplied from a line-locked oscillator 76. The mixer 75 is of a type the output signal of which is balanced against both its input signals. The upconversion with a 62.375 $f_H$ carrier wave folds over the lower sideband of the mixer 75 output signal, so it is not useful. The upconversion places the PSK carrier in the upper sideband of the mixer 75 output signal at 64 $f_H$. This facilitates its synchronous detection in the digital regime when the sample rate is a multiple of 64 $f_H$, which multiple is an integral power of two. The upper sideband of the mixer 75 output signal can extend upward from 64 $f_H$ well past 128 $f_H$, so no substantial restriction on the symbol rate is introduced in the upconversion.

An analog-to-digital converter 77 digitizes the mixer 75 output signal, the sampling of the mixer 75 output signal being timed by pulses supplied at 16 MHz rate from the zero-crossing detector 56. The ADC 77 supplies the digitized mixer 75 output signal as input signal to an FIR digital highpass filter 78 with a sharp cut-off between 61.75 $f_H$ and 64 $f_H$, which filter 78 selects only the upper sideband of the quadrature-phase video carrier. The linear-phase single-sideband selection filter after the mixer 75 is easier to implement in the digital regime than in the analog regime, in view of the spacing between the lower and upper sidebands of the translated quadrature-phase picture carrier in the mixer 75 output signal being only 51,136 Hz. The highpass filter 78 being a digital filter is in reality a bandpass filter, but the passband is of sufficient bandwidth that the upper sideband of the mixer 75 output signal can extend upward from 64 $f_H$ well past 128 $f_H$; so no substantial restriction on the symbol rate is introduced in the upconversion procedure.

A downconverter 79 homodynes the FIR digital highpass filter 78 response to baseband by mixing it with suitably delayed zero-average-value 64 $f_H$ square wave generated in accordance with the fifthmost significant bit of the HALF-SYMBOL COUNT from the counter 55. The downconverter 79 can comprise a digital multiplier and an FIR digital lowpass filter connected thereafter for responding to the downconversion response in the product output signal, but not the upconversion response that is the image of the downconversion response. The multiplicand signal for the digital multiplier can be formed in two's complement arithmetic from the fifthmost significant bit of the HALF-SYMBOL COUNT as the most significant (sign) bit and a wired ONE as least significant bit; and the multiplier signal for the digital multiplier is the highpass filter 78 response. The downconverter 79 recovers a PSK 64 $f_H$ carrier as its output signal.

A synchronous detector 80 synchronously detects the PSK at the 128 $f_H$ rate-buffered symbol rate by mixing it with suitably delayed zero-average-value 128 $f_H$ square wave generated in accordance with the fifthmost significant bit of the HALF-SYMBOL COUNT from the counter 55. The synchronous detector 80 is of a doubly balanced type, the output signal of which is balanced against each of its input signals, and regenerates the symbol stream in its output signal. Synchronous detection of an input signal can be realized in two's complement arithmetic by selectively complementing each of its bits except its most significant bit, responsive to its most significant bit being a ONE, and adding its most significant bit to the result. The symbol stream from the synchronous detector 80 can be affected by certain remnants of rate-buffered luminance signal. The components of the original baseband luminance signal spectrum that would give rise to these contaminants are frequencies that fall into the Fukinuki holes in phases that are not orthogonal to the PSK components. As noted above, these components can be filtered out of the original baseband luminance signal spectrum at the transmitter.

Symbol decision circuitry 81 of a type known in the art of digital communications receives the symbol stream from the synchronous detector 80 and makes a decision as to whether the symbol is most likely a ZERO or is most likely a ONE. The symbol decision circuitry 81 typically contains comparators operated as threshold detectors for symbol potential excursions that swing negative in polarity and for symbol potential excursions that swing positive in polarity. The threshold detection results are used to control the decision as to whether the symbol is most likely a ZERO or is most likely a ONE. The symbol decision circuitry 81 is preferably of a type in which the voltages supplied to the comparators to determine the thresholds for threshold detection are automatically adjusted responsive to symbol strength. In such case, the symbol decision circuitry 81 includes circuitry for detecting the average or average peak levels of the negative-potential excursions and the average or average peak levels of the positive-potential excursions of the symbol stream. There is circuitry for reckoning from these detected levels the voltages supplied to the comparators to establish the thresholds for threshold detection.

Error correction circuitry 82 receives the results of the decisions by the symbol decision circuitry 81 as serial-bit digital input data and corrects the errors therein to provide corrected serial-bit digital data, which should correspond to the serial-bit digital data that FIG. 1 shows the source 14 to supply to the television transmitter 1. This correspondence will not obtain, however, if the DATA FRAME COUNT of the counter 63 in the digital receiver 44 does not correspond to the DATA FRAME COUNT of the counter 33 at the TV transmitter 1.

A determination as to whether the DATA FRAME COUNT of the counter 63 is correct can be made within the symbol decision circuitry 81 by determining the number of symbol decisions that do not have a high probability of being correct. When the frames of data are being combined in pairs in correct phasing to supply signal for synchronous symbol detection, the digital data in the four scan lines being combined at any time will be very likely to combine constructively, so a large fraction of the symbol decisions have good probability of being correct. When the frames of data are being combined in pairs in incorrect phasing to supply signal for synchronous symbol detection, the digital data in a pair of scan lines of the current frame are less likely to combine constructively with the corresponding pair of scan lines of the previous frame. If the digital data are random as to ZERO and ONE patterns in the two frames the likelihood of the scan line pairs combining destructively becomes appreciably high, so the fraction of the symbol decisions that have poor probability of being correct is raised considerably. Lossy integration of the number of the symbol decisions that have poor probability of being correct can be used to generate a decision that the DATA FRAME COUNT of the counter 63 is incorrect. A trigger pulse can be generated in response to this decision and applied to the counter 63 in order to correct the phase of the DATA FRAME COUNT therefrom.

Practically speaking, the better way to arrange for synchronizing the DATA FRAME COUNT in the TV transmitter 1 and in the digital data receiver 44 is by reference to the ghost cancellation reference (GCR) signals which occur in prescribed permutations of burst phasing and Bessel chirp phasing in the $19^{th}$ scan lines of a four-frame cycle. Apparatus for generating DATA FRAME COUNT other than by the single-binary-stage counter 63, which apparatus refers the DATA FRAME COUNT to GCR signals detected by the in-phase video detector 49, is described further on in this specification with reference to FIGS. 15 and 16 of the drawing.

Differential PSK encoding may be used, in order to increase tolerance for line-locked oscillator phasing errors, but the PSK does not have to be differentially encoded if phasing errors are kept small in the oscillations from the line-locked oscillator. Sampling at the video detector responses at half-symbol rate during their digitization provides almost four samples of the 4.1 MHz highest-frequency SSB BPSK sideband, so ADC 60 response is never severely reduced as a function of sampling phase. Automatic symbol synchronization circuitry, which is not explicitly shown in FIGS. 4 and 7, can be used to adjust the sampling phase during digitization of the video signal from which the PSK subcarrier is extracted, so as to be optimal for lowest intersymbol error. In this circuitry an electrically controlled adjustable delay line is introduced into the connection from the horizontal sync separator 53 to the AFPC detector 59 of the line-locked oscillator 57 and to the AFPC detector of the line-locked oscillator 76. Control signal for adjusting the delay of this delay line can be derived by quadrature-phase synchronous symbol detection.

While the 64 $f_H$ heterodyning carrier wave for the downconverter 79, the 128 $f_H$ heterodyning carrier wave for the synchronous detector 80, and the 64 $f_H$ heterodyning carrier wave for the downconverter 95 are described above as being square wave in nature sinusoidal waves can be used instead, being drawn from look-up tables stored in read-only memory addressed by the HALF-SYMBOL COUNT from the counter 55.

The frequencies of the oscillations generated by the oscillators 25 and 30, respectively, which frequencies differ by 6.5 $f_H$, can be chosen differently as long as the frequency of the oscillator 25 is above 256 $f_H$ and is an odd multiple of half scan line frequency. Designing oscillator 25 so the frequency of its oscillations is three times color subcarrier frequency is merely to simplify locking the oscillator to a stable frequency. In order to ease the difficulty of designing the single-sideband selection filter, the downconversion in the mixer 29 should be from as low a carrier frequency as feasible. Line-locked oscillators 25 and 26 at 262.5 MHz and 256 MHz are an attractive design alternative, for example. While oscillators 25, 30, 36, 51, 57 and 76 are presumed above to be voltage-controlled oscillators producing oscillations the frequencies of which are controlled by AFPC voltages, these oscillators can alternatively be constructed so their frequencies are controlled in response to other forms of control signal. E.g., any of these oscillators can be a current-controlled oscillator with its respective AFPC detector being of a type generating AFPC current rather than AFPC voltage. Alternatively, the $3f_X$ oscillator 25 can be a frequency tripler which is injection-locked by applying signal to it at color subcarrier frequency $f_X$.

The FIFO rate buffer 73 can comprise a line expander followed by a frame expander. The line expander is used for doubling the duration of the alternate scan lines of digital data selected from the comb-filtering response, so that samples of that data are clocked uniformly throughout each frame. The frame expander is used for doubling the duration of alternate frames of digital data selected from the output of the line expander response, so that samples of that data are clocked uniformly throughout time.

Figure 5:
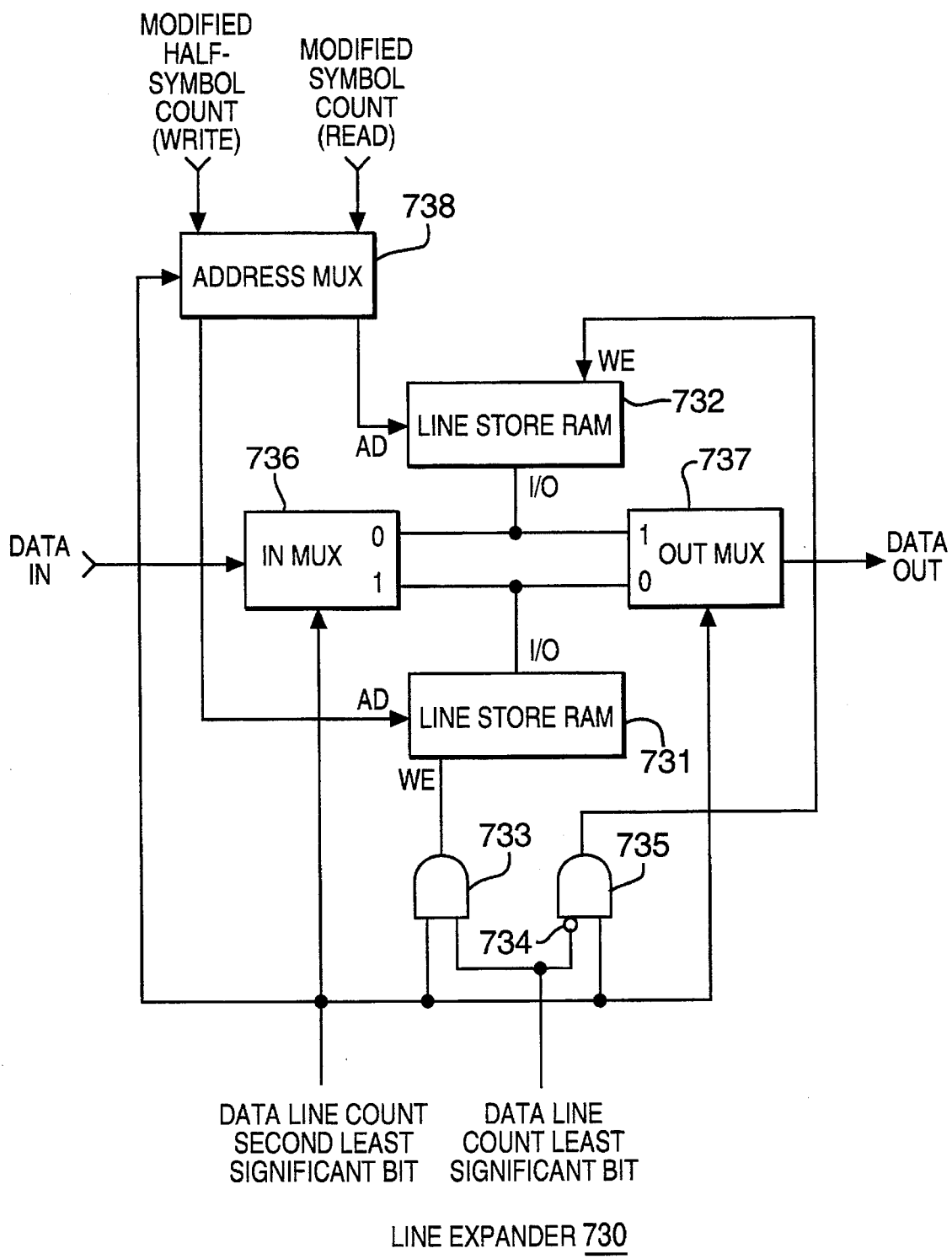
FIG. 5 is a schematic diagram of a line expander as can be incorporated within the rate buffer that is cascaded after the lowpass line-comb filter and the bandpass frame-comb filter in the FIG. 4 digital-signal receiver circuitry.

FIG. 5 shows a typical structure for a line expander 730. Two linestore RAMs 731 and 732 are arranged for being alternately written into and read from on a staggered basis. The least significant bit and the second least significant bit of the DATA LINE COUNT from the counter 64 shown in FIG. 4 are applied to an AND gate 733 to generate a WRITE ENABLE signal for the linestore RAM 731 the second scan line of each frame and every fourth scan line thereafter. The least significant bit of the DATA LINE COUNT is complemented by a NOT gate 734. The resulting bit complement and the second least significant bit of the DATA LINE COUNT are applied to an AND gate 735 to generate a WRITE ENABLE signal for the linestore RAM 732 the fourth scan line of each frame and every fourth scan line thereafter. The second least significant bit of the DATA LINE COUNT is supplied as control signal to an input multiplexer 736, to an output multiplexer 737 and to an address multiplexer 738.

Responsive to the second least significant bit of the DATA LINE COUNT being ONE, the input multiplexer 736 selects a DATA IN signal supplied thereto to the input/output bus of the linestore RAM 731 during the first and second scan lines of each frame and every fourth line after each of them. During those scan lines, responsive to the second least significant bit of the DATA LINE COUNT being ONE, the output multiplexer 737 selects the input/output bus of the linestore RAM 732 for supplying a DATA OUT signal. Responsive to the second least significant bit of the DATA LINE COUNT being ONE, the address multiplexer 738 applies to linestore RAM 731 as its write addressing a MODIFIED HALF-SYMBOL COUNT signal corresponding to (referring back to FIG. 4) the HALF-SYMBOL COUNT supplied from the counter 64 except for being modified by the OR gate 71. At the same time the address multiplexer 738 applies to linestore RAM 732 as its read addressing a MODIFIED SYMBOL COUNT signal with a most significant bit corresponding to the least significant bit of the DATA LINE COUNT and with less significant bits corresponding to all except the last bit of the MODIFIED HALF-SYMBOL COUNT signal.

Responsive to the second least Significant bit of the DATA LINE COUNT being ZERO, the input multiplexer 736 selects the DATA IN signal to the input/output bus of the linestore RAM 732 during the third and fourth scan lines of each frame and every fourth line after each of them. During those scan lines, responsive to the second least significant bit of the DATA LINE COUNT being ZERO, the output multiplexer 737 selects the input/output bus of the linestore RAM 731 for supplying a DATA OUT signal. Responsive to the second least significant bit of the DATA LINE COUNT being ZERO, the address multiplexer 738 applies to linestore RAM 732 as its write addressing the MODIFIED HALF-SYMBOL COUNT signal and applies to linestore RAM 731 as its read addressing the MODIFIED SYMBOL COUNT signal.

Figure 6:
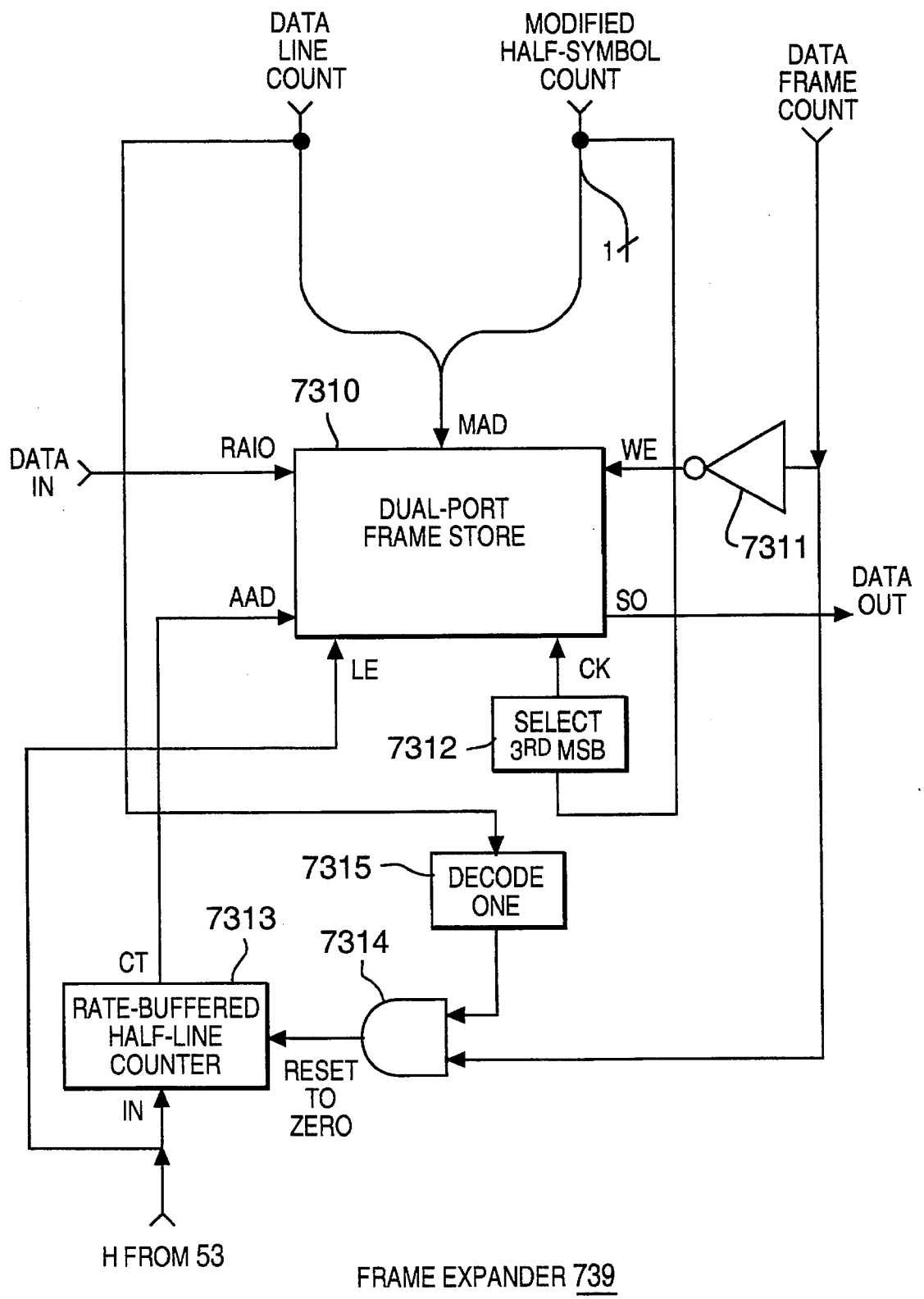
FIG. 6 is a schematic diagram of a frame expander as can be incorporated within the rate buffer that is cascaded after the lowpass line-comb filter and the bandpass frame-comb filter in the FIG. 4 digital-signal receiver circuitry.

FIG. 6 shows a frame expander 739 constructed from a dual-port random-access memory 7310. As with other random-access memories that store multiple-parallel-bit data samples, a dual-port RAM each successive one of such data samples can be written to or read from a storage location specified by a main address (MAD) signal, the writing or reading being via a random-access input/output (RAIO) port. A dual-port RAM additionally includes a shift register, the locations of which can be loaded in parallel with a string of multiple-parallel-bit data samples as selected by an auxiliary address (AAD) signal and then read out serially through a serial output (SO) port. The dual-port RAM 7310 has the storage capability for a frame of the multiple-parallel-bit samples of combined pairs of scan lines—i.e., the number of scan lines of storage capacity associated with a conventional fieldstore memory. The modulo-2 DATA FRAME COUNT is complemented by a NOT gate 7311 to generate a WRITE ENABLE signal (WE) for the RAM 7310. (In actual practice the WE signal can be extracted directly from the data frame counter 63 complementary output without need for the NOT gate 7311). This WE signal conditions the RAM 7310 to be continuously written via its random-access input/output port during and only during each second data frame, as counted modulo-2. The main address (MAD) signal for selecting the storage locations to be overwritten during each second data frame comprises all the bits of the DATA LINE COUNT signal from the counter 64 and all the bits except the least significant of the MODIFIED SYMBOL COUNT signal as described in connection with the line expander 730 of FIG. 5. The DATA LINE COUNT signal from the counter 64 actually counts half scan lines of data, as loaded into the RAM 7310. A wired bit select 7312 selects the thirdmost significant bit of the HALF-SYMBOL COUNT from the counter 55 to clock the shift register included in the dual-port RAM 7310 for supplying the serial output (SO) port thereof.

The dual-port RAM 7310 is arranged so that the auxiliary address (AAD) signal, supplied to the auxiliary address decoder within the RAM 7310 for selecting the strings of data samples to be transferred in parallel into the shift register, selects successive half scan lines of line expander 730 output signal responsive to RATE-BUFFERED HALF LINE COUNT generated by a counter 7313 over a rate-buffered frame, which count corresponds to normal-rate scan line count over two frames and is supplied from the count (CT) output of the counter 7313. The counter 7313 receives horizontal sync pulses H from the horizontal sync separator 53 as input (IN) for count and is reset to zero count by a ONE issuing from the AND gate 7314. The two-input AND gate 7314 receives DATA FRAME COUNT as a first input signal. The second input signal to the AND gate 7314 is from a decoder 7315, which generates a ONE when the DATA LINE COUNT from the counter 64 is arithmetic one.

The FIG. 5 line expander can be replaced by known circuit equivalents. One such equivalent is a dual-port RAM operated for having the storage locations in its random-access portion overwritten by respective pixels of each scan line while reading out serially the pixels of the previous scan line transferred to its shift register portion at the finish of that previous scan line. The FIG. 6 frame expander can be replaced by known circuit equivalents. One such equivalent uses two framestores written and read in phasings staggered by a frame time. The general mode of operation is similar to that of the FIG. 5 line expander except for the differences in time scale and storage capacity for pixels that are involved.

Figure 7:
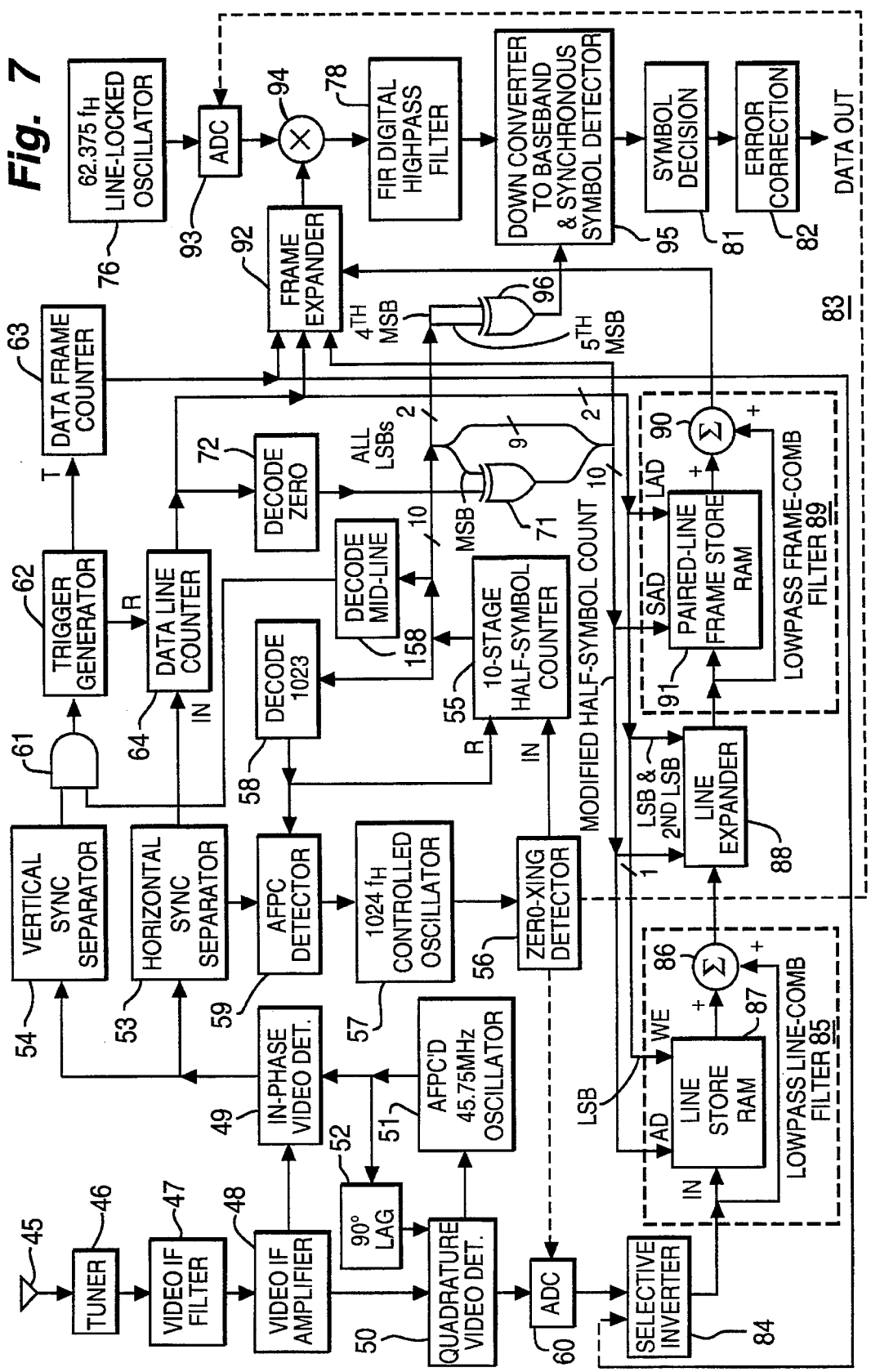
FIG. 7 is a schematic diagram of a digital-signal receiver for receiving a television signal with a digital signal buried therewithin and extracting the buried digital signal, which digital-signal signal receiver differs from the FIG. 4 digital-signal receiver in some respects and embodies still further aspects of the invention.

FIG. 7 shows a digital signal receiver 83 that is not quite as straightforward as the FIG. 4 digital signal receiver 44 in the way it performs comb filtering and symbol detection, but offers advantages in terms of more practical construction. In the symbol detection portion of the digital signal receiver 83, the operations of downconversion of the PSK subcarrier to baseband and synchronous detection at symbol rate are combined. By performing lowpass line-comb filtering and line expansion before frame-comb filtering in the digital signal receiver 83, the storage capability required of the framestore RAM in the frame-comb filter is halved. The framestore RAM in the frame-comb filter is written at half as rapid rate, with an attendant saving in power requirement for writing.

To simplify correctly performing the lowpass line-comb filtering of the digitized quadrature-phase video detector response from the ADC 60, particularly in line 263 of each frame, the frame-to-frame reversal of PSK subcarrier phasing at the transmitter 1 is undone in the digital signal receiver 83 before doing lowpass line-comb filtering. Accordingly, the digitized quadrature-phase video detector response from the ADC 60 is supplied as input signal to a selective inverter 84. The selective inverter 84 receives the DATA FRAME COUNT from the counter 63 as its control input signal. The selective inverter 84 is a frame-by-frame polarity-changing means for generating an output signal that is of an amplitude in constant proportion to the amplitude of the quadrature-phase video detector 50 as digitized by the ADC 50. The selective inverter 84 output signal is the same in polarity as the ADC 50 output signal during a first set of intervals each of one frame duration, when the modulo-2 DATA FRAME COUNT is ZERO. The selective inverter 84 output signal is opposite in polarity from the ADC 50 output signal during a second set of intervals each of one frame duration, when the modulo-2 DATA FRAME COUNT is

ONE.

The selective inverter 84 can, by way of example, be formed from a controlled digital adder with add/subtract capability receiving the modulo-2 DATA FRAME COUNT (or its bit complement, as the case may be) as control signal. Arithmetic zero is applied to the controlled adder as its summand/minuend input signal, and the ADC 50 output signal is applied to the controlled adder as its summand/subtrahend input signal. The sum/difference output signal from the controlled adder is the desired selectively inverted response to the ADC 50 output signal.

Undoing the frame-to-frame reversal of PSK subcarrier phasing at the transmitter 1 in the digital signal receiver 83 before frame-comb filtering causes the luminance signal of composite video signal to exhibit marked frame-to-frame anti-correlation, rather than marked frame-to-frame correlation, and causes the PSK carrier to be repeated in the two frames of each consecutive pair of frames. Consequently, the subsequent frame-comb filtering to enhance the PSK carrier while suppressing luminance will be lowpass, rather than bandpass, in nature.

A lowpass line-comb filter 85, which includes a digital adder 86 and a random access memory 87 that has the capability of being operated as a digital linestore, receives the selective inverter 84 output signal. The RAM 87 is operated in a read-then-write-over mode and is addressed by a MODIFIED HALF-SYMBOL COUNT formed from the single-bit output of the exclusive-OR gate 71 as most significant bit and by all except the most significant of the bits of the HALF-SYMBOL COUNT from the counter 55 as less significant bits. This addressing conditions the RAM 87 when operated in read-then-write-over mode to function as an H/2 delay line during the latter half of scan line 263 of each frame of the composite video signal and to function as a 1-H delay line at all other times. During the latter half of scan line 263 of each frame of the composite video signal, the adder 86 adds successive samples of that latter half scan line of selective inverter 84 output signal to corresponding successive samples of the earlier half scan line of that signal read from the RAM 87. During the other scan lines of each frame of the composite video signal, the adder 86 adds successive samples of the current scan line of selective inverter 84 response to corresponding successive samples of the just-previous scan line of that signal read from the RAM 87. The lowpass line-comb filter 85 removes the anti-phase chrominance in paired scan lines to generate during alternate scan lines of alternate frames a response in which PSK free of interfering chrominance appears.

A line expander 88 of the type shown in FIG. 5 responds to the alternate scan lines (and the half scan lines) of the lowpass line-comb filter 85 response, in which PSK free of interfering chrominance appears, to supply a continuous flow of digital samples to a lowpass frame-comb filter 89. The continuous flow of digital samples in the output signal from the line expander 88 is supplied at a sample rate half the sample rate of its input signal; that is, the line expander 88 supplies PSK samples at symbol rate continuously throughout alternate frames to the lowpass frame comb filter 89. The lowpass frame-comb filter 89 comprises a digital adder 90 and a digital framestore 91 operated as a frame delay. The digital framestore 91 is conveniently constructed as a RAM operated in a read-then-write-over mode and is addressed similarly to the way the dual-port RAM 7310 of FIG. 6 is addressed for writing. This address comprises all the bits except the least significant of the DATA LINE COUNT signal from the counter 64 and all the bits except the least significant of the MODIFIED HALF-SYMBOL COUNT signal. The adder 90 receives the samples of the digitized PSK subcarrier in the current frame from the line expander 88 as a first summand input signal and receives the corresponding pixel samples of the previous frame from the digital framestore 91 as a second summand input signal. The sum signal from the adder 90 is the lowpass frame-comb filter 89 response, from which luminance components that exhibit frame-to-frame correlation are suppressed.

A frame expander 92 of the type shown in FIG. 6 receives the lowpass frame-comb filter 89 response and supplies samples of output signal therefrom at the twice the ultimate 1 MHz symbol rate, which samples correspond to those samples the FIFO rate buffer 73 supplies as its output signal in the FIG. 4 digital signal receiver 44. The balanced mixing of the PSK subcarrier described by these samples with oscillations from the oscillator 76 is performed in the digital regime in the FIG. 7 digital signal receiver 83, rather than in the analog regime as in the FIG. 4 digital signal receiver 44. Accordingly, the sinusoidal oscillations from the oscillator 76 are digitized by an analog-to-digital converter 93, and the digital response of the ADC 93 is supplied as multiplicand input signal to a digital multiplier 94, which receives as a multiplier input signal the digital samples of PSK subcarrier in the output signal of the frame expander 92. The multiplier 94, which functions as a balanced mixer, supplies the digital samples of its product output signal to the highpass filter 78, the operation of which corresponds to the operation of the highpass filter 78 in the FIG. 4 digital signal receiver 44.

The down converter 79 and the synchronous detector 80 of the FIG. 4 digital signal receiver 44 are replaced in the FIG. 7 digital signal receiver 83 by a downconverter 95. A two-input exclusive-OR gate 96 receives the fourthmost significant and fifthmost significant bits of the HALF-SYMBOL COUNT signal from the counter as its input signals. A zero-average-value 64 $f_H$ square wave generated in response to the XOR gate 96 output signal is used as the heterodyning carrier wave by the downconverter 95.

Figure 8:
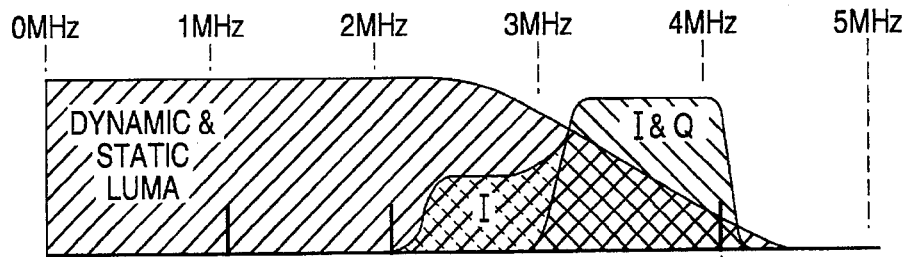
FIG. 8 is a spectral diagram of the frequency spectrum of the output signal of the in-phase video detector in the FIG. 4 or FIG. 7 digital-signal receiver circuitry.
Figure 9:
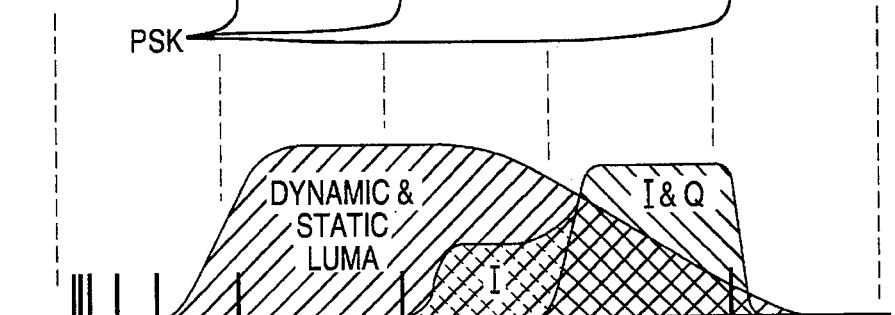
FIG. 9 is a spectral diagram of the frequency spectrum of the output signal of the quadrature-phase video detector in the FIG. 4 or FIG. 7 digital-signal receiver circuitry, which signal is free of luminance signal component below 750 kHz.

FIGS. 8–12 show the frequency spectrum of signals at various points in the digital signal receivers 44 and 83 of FIGS. 4 and 7. The principal higher-frequency components of the PSK subcarrier spectrum are shown as heavy lines at 0.35, 0.6, 1.1, 2.1 and 4.1 MHz. The subcarrier of the PSK signal is shown by a heavy line at 0.1 MHz, although where the coding is of a form having equal numbers of ZEROs and ONEs the subcarrier is suppressed. The frequency spectra presume that the video IF filter 47 includes a 41.25 MHz in-channel sound trap, so in-channel sound carrier does not appear in the 4.2 to 4.8 MHz region of the baseband signals recovered by the in-phase video detector 49 and the quadrature-phase video detector 50, shown in FIGS. 8 and 9, respectively. Above 1.25 MHz the frequency spectrum of FIGS. 8 and 9 are substantially the same. Below 750 kHz, where the video carrier has QAM double sidebands in two orthogonal phases, the PSK signal does not contribute to the FIG. 8 frequency spectrum of the in-phase video detector response, and there is no luminance signal contribution to the FIG. 9 frequency spectrum of the quadrature-phase video detector response. The chrominance signal appears in both the FIG. 8 frequency spectrum of the in-phase video detector response and in the FIG. 9 frequency spectrum of the quadrature-phase video detector response since it is sufficiently high in frequency to be beyond the frequencies detected from QAM double sidebands of the video carrier.

Figure 10:
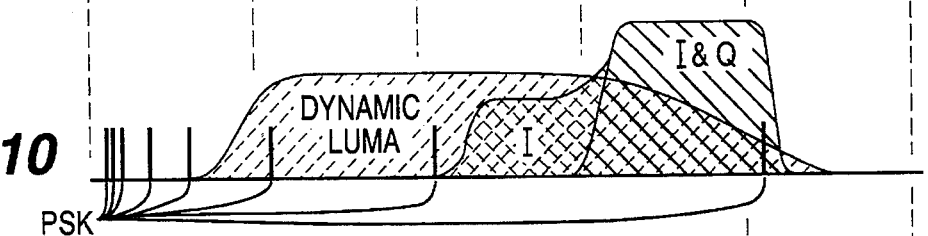
FIG. 10 is a spectral diagram of the frequency spectrum of the response of the bandpass frame-comb filter that is cascaded after the quadrature-phase video detector in the FIG. 4 digital-signal receiver circuitry, which bandpass frame-comb filter response is free of luminance signal component that is static from frame to frame.

FIG. 10 shows the frequency spectrum of the quadrature-phase video detector response after bandpass frame-comb filtering in the FIG. 4 digital-signal receiver circuitry, which filtered response is free of luminance signal component that is static from frame to frame. The PSK subcarrier and chrominance signal components are enhanced by the bandpass frame-comb filtering.

Figure 11:
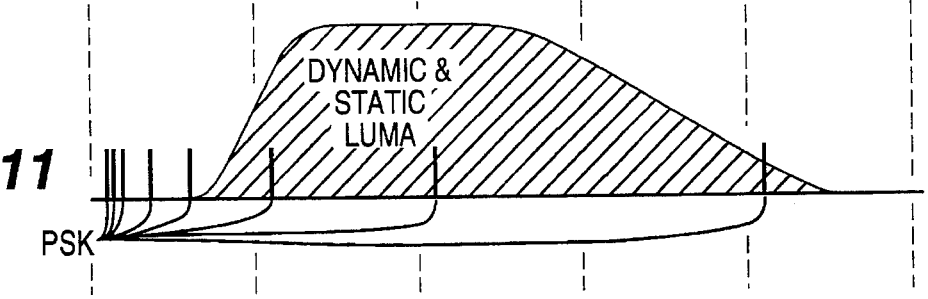
FIG. 11 is a spectral diagram of the frequency spectrum of the response of the lowpass line-comb filter that is cascaded after the quadrature-phase video detector in the FIG. 7 digital-signal receiver circuitry, which lowpass line-comb filter response is free of chrominance signal component.

FIG. 11 shows the frequency spectrum of the quadrature-phase video detector response after lowpass line-comb filtering in the FIG. 7 digital-signal receiver circuitry, which lowpass line-comb filter response is free of chrominance signal component. The PSK subcarrier and luminance signal components are enhanced by the lowpass line-comb filtering.

Figure 12:
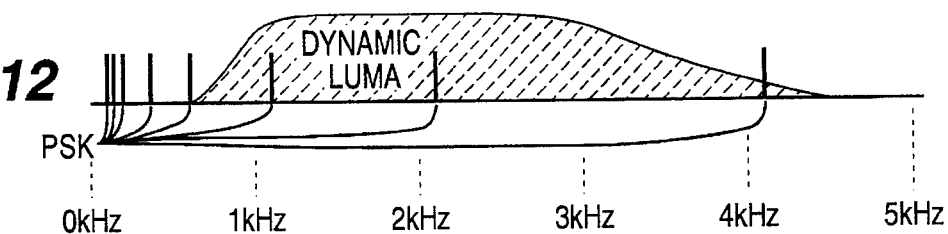
FIG. 12 is a spectral diagram of the frequency spectrum of the rate buffered response after comb filtering is completed in the FIG. 4 or FIG. 7 digital-signal receiver circuitry, which response is free of component response to chrominance signal and of component response luminance signal that is static from frame to frame.

FIG. 12 shows the frequency spectrum of the rate buffered response after comb filtering is completed in the FIG. 4 or FIG. 7 digital-signal receiver circuitry. This response, which is plotted with the frequency scale expanded 4:1 respective to the frequency spectra of FIGS. 8–11, is free both of component response to chrominance signal and of component response luminance signal that is static from frame to frame. The PSK subcarrier and dynamic luminance signal components are enhanced.

The design of the video IF filter 47 in the digital signal receivers 44 and 83 of FIGS. 4 and 7 differs from the current practice in regard to television receivers. In television receivers which use separate video IF filters and separate IF amplifiers following them for supplying the video detector(s) and for supplying the intercarrier sound detector; the upper and lower shoulders of the response of the video IF filter used for picture are respectively around 45 MHz and 42 MHz, to cause the natural frequency of the filter to occur around 43.5 MHz. As referred to video baseband, the shoulders are around 0.75 MHz and 3.75 MHZ, and the natural frequency of the filter is about 2.25 MHz. The location of the lower shoulder is established by the 41.25 MHz in-channel sound trap. The roll-off of the 45.75 MHz video carrier by 6 dB or so facilitates the design of the video IF filter to provide a deeper and wider adjacent-channel sound trap.

The video IF filter 47 can also include a 41.25 MHz in-channel sound trap, with effort being made to preserve phase linearity down to 41.5 MHz. In order to be able to separate the in-phase and quadrature-phase AM sidebands of the video carrier, the upper shoulder of the filter 47 response must be higher in frequency, so that frequencies up to 46.5 MHz are passed without substantial attenuation. This makes the trapping of adjacent-channel sound in the band from 47 to 47.5 MHz appreciably more difficult to do. In a cable broadcasting environment, where the burying of digital data in each channel of video is likely to be of particular economic significance, the strengths of the channels are likely to be reasonably uniform. The adjacent-channel sound can then be expected not to be several times larger than the PSK, so as to introduce significant error into the decoding of the PSK. The adjacent-channel sound carrier is folded around the video carrier during its synchronous detection to appear at 1.5 MHz in the video signal baseband. The 1.25 to 1.75 MHz band in which the FM sidebands of this carrier appear in the video signal baseband are straddled by the principal spectral components of the SSB BPSK at 1.11 MHz and 2.12 MHz, so there is no appreciable interaction of these FM-sideband frequencies with the PSK spectrum. When the digital data receiver receives over-the-air broadcasts, a directional antenna will be required for satisfactorily receiving a weak channel just above a strong channel, in order that the strong interfering adjacent-channel sound carrier not overwhelm the relatively weak PSK.

The natural frequency of the video IF filter 47 will be about 44 MHz, if its response stretches from 41.5 to 46.5 MHz, so the ringing of filter 47 in response to impulse noise will appear around 1.75 MHz in the responses of the video detectors 49 and 50. This is reasonably distant from the principal spectral components of the SSB BPSK at 1.11 MHz and 2.12 MHz. So, after impulse noise, reasonably error-free symbol decoding can be resumed as soon as the IF amplifier comes out of clip as the ringing subsides. The use of transient sensing and impulse noise inversion at the radio-frequency input of the digital signal receiver, so as to minimize IF amplifier ringing into clip, can be worthwhile doing if the receiver is to be used in an environment in which impulse noise is likely.

Alternatively, the video IF filter 47 can be designed not to include a 41.25 MHz in-channel sound trap and to have its lower frequency shoulder at a frequency within the range occupied by the next-higher-radio-frequency television channel. The luminance signal spectrum of that adjacent channel is suppressed to appreciable extent by the bandpass frame-comb filter 65, but the in-channel sound carrier will appear in the samples supplied to the synchronous symbol detector. The purpose for such design is to widen the video IF filter 47 bandwidth so there is less likelihood of intersymbol interference when signaling at 8,055,943 Hz rate. The selectivity of the synchronous symbol detection is relied on to suppress the additional "interfering" signals, which is not unreasonable to do, since there is little interaction of the components of their frequency spectra with the components of the PSK frequency spectrum. It is desirable to place the natural frequency of the video IF filter 47 as it appears in the responses of the video detectors 49 and 50 at about 3.1 MHz, midway between the 2.1 and 4.1 MHz principal sideband frequencies of the PSK. This corresponds to a video intermediate frequency of 42.65 MHz. Presuming the upper frequency shoulder of the video IF filter 47 response to be at 46.5 MHz, 3.85 MHz above the specified natural frequency of 42.65 MHz, the lower frequency shoulder is at 38.8 MHz, 3.85 MHz below the specified natural frequency. The 7.7 MHz wide video IF should pass the PSK without substantially increasing intersymbol interference.

Next consider how the digital signal decoder 17 of FIG. 1 can be constructed. Basically, it resembles a portion of either the digital signal receiver 44 of FIG. 4 or the digital signal receiver 83 of FIG. 7. The elements 45–52 are not used in the digital signal decoder 17, however, the analog composite video signal from the ADC 1714 being applied instead as input signal to the sync separators 53 and 54 and to the ADC 60. The symbol decision circuitry 81 and error correction circuitry 82 are not used in the digital signal decoder 17, either. The output signal from the synchronous detector 80 provides a prediction of the error that will be encountered owing to components of the composite video signal that counterfeit PSK subcarrier.

These predictions of error can be used by the frame store packing control circuitry 30 to change the packing of data into the data frame store 21 and to quench the PSK subcarrier (by means not shown in the drawing) to signal the digital signal receiver that the transmission of data has been suspended for a time. To have enough time to change the packing of data into the data frame store 21, the frame delay circuit 19 has to be replaced by a plural-frame delay circuit.

Figure 13:
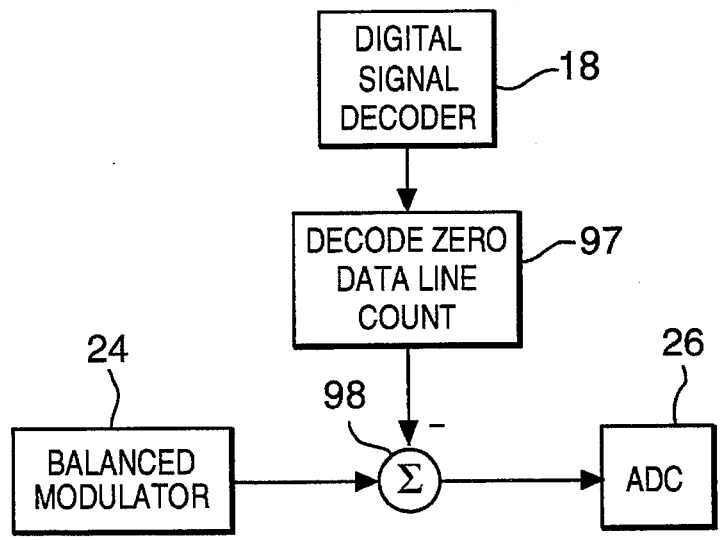
FIG. 13 is a schematic diagram of feed-forward error correcting circuitry that, in accordance with yet another aspect of the invention, can be used in the FIG. 1 television transmitter for transmitting a television signal with a digital signal buried therewithin.

FIG. 13 illustrates a more elegant feed-forward correction method for reducing the likelihood of transmission errors, which method avoids having to replace the frame delay circuit 19 with a plural-frame delay circuit. To the extent that the transmission channel is linear in nature, symbol error arising from the nature of the composite video signal can be corrected for by combining it with the PSK subcarrier transmission in such sense as to cancel error in the PSK subcarrier modulation detected at the digital receiver. Such feed-forward correction will not reduce inter-symbol error arising from transmission channel bandwidth constraints. Such feed-forward correction is superior to error reduction methods that attempt to boost PSK subcarrier power during times the composite video signal is prone to causing error in data transmission, in that the symbol decision circuitry 81 is not forced to revise its decision standards rapidly.

In FIG. 13 the error predicted by the digital signal decoder 17 of FIG. 1 as processed through level and delay trimming circuitry 97 is supplied to a linear combining circuit 98. The linear combining circuit 98 is inserted into the connection from the balanced modulator 24 to the ADC 26 shown in FIG. 2. The linear combining circuit 98, shown as an analog subtractor in FIG. 13, combines the predicted error as processed through level and delay trimming circuitry 97 with the PSK subcarrier from the balanced modulator 24 in such sense as to cancel error in the PSK subcarrier modulation detected at the digital receiver. In some transmitter arrangements the linear combining circuit 98 may in fact be an analog adder, rather than a subtractor.

Figure 14:
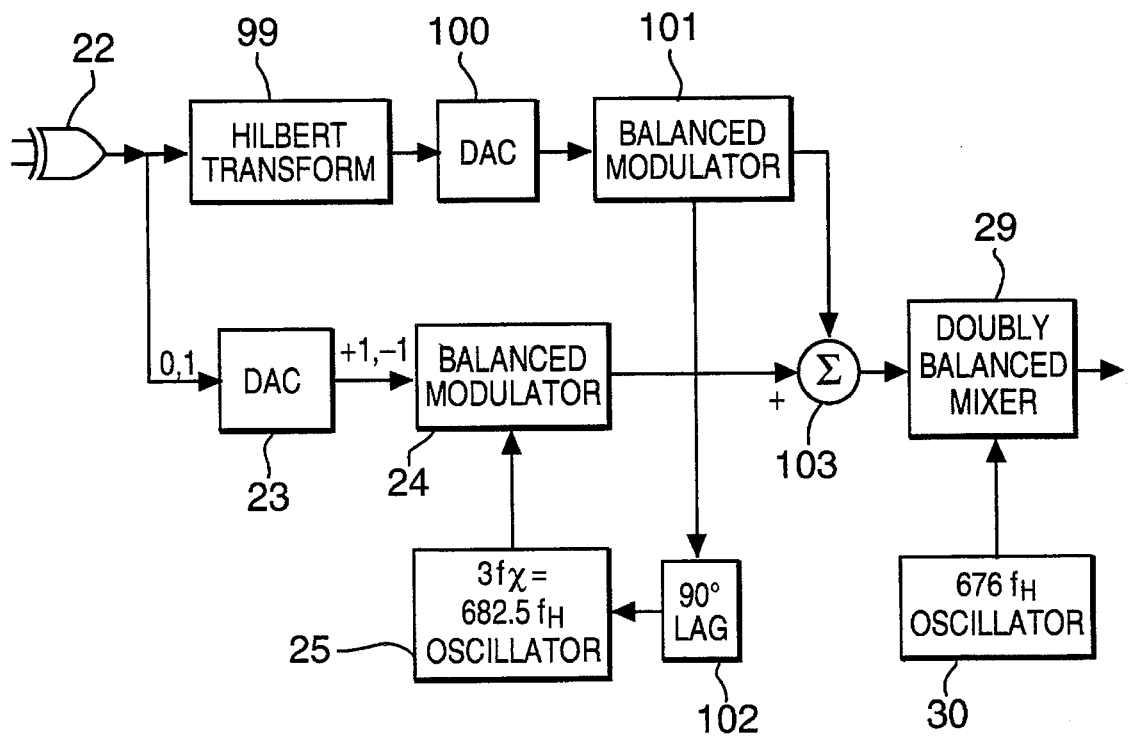
FIG. 14 is a schematic diagram of an alternative form of circuitry for generating single-sideband binary phase-shift-keyed subcarrier that can replace that shown in FIG. 2 in modifications of the FIG. 1 television transmitter which embody the invention in certain of its aspects.

FIG. 14 shows a way of generating the SSB BPSK subcarrier, which is alternative to that shown in FIG. 2 and does not use the FIR digital highpass filter 27. Hilbert transform circuitry 99 receives the 0,1 digital signal from the XOR gate 22 and interprets it as being the sign of polarity of a unity-amplitude input signal. An analog-to-digital converter 100 generates the Hilbert transform of the digital pulse train into analog form, to be applied as modulating input signal to a balanced modulator 101. The oscillations from the 3 $f_x$ oscillator 25 are retarded 90° in phase by a lag network 102 and then applied as carrier wave to the balanced modulator 101. The output signal of the balanced modulator 101 is supplied as subtrahend input signal to an analog subtractor 103 to which the output signal of the balanced modulator 24 is supplied as minuend input signal. The difference output signal from the subtractor 103 is SSB BPSK subcarrier suitable for application to the mixer 29, there to be downconverted by being mixed with the 676 $f_H$ carrier generated by the oscillator 30.

Figure 15:
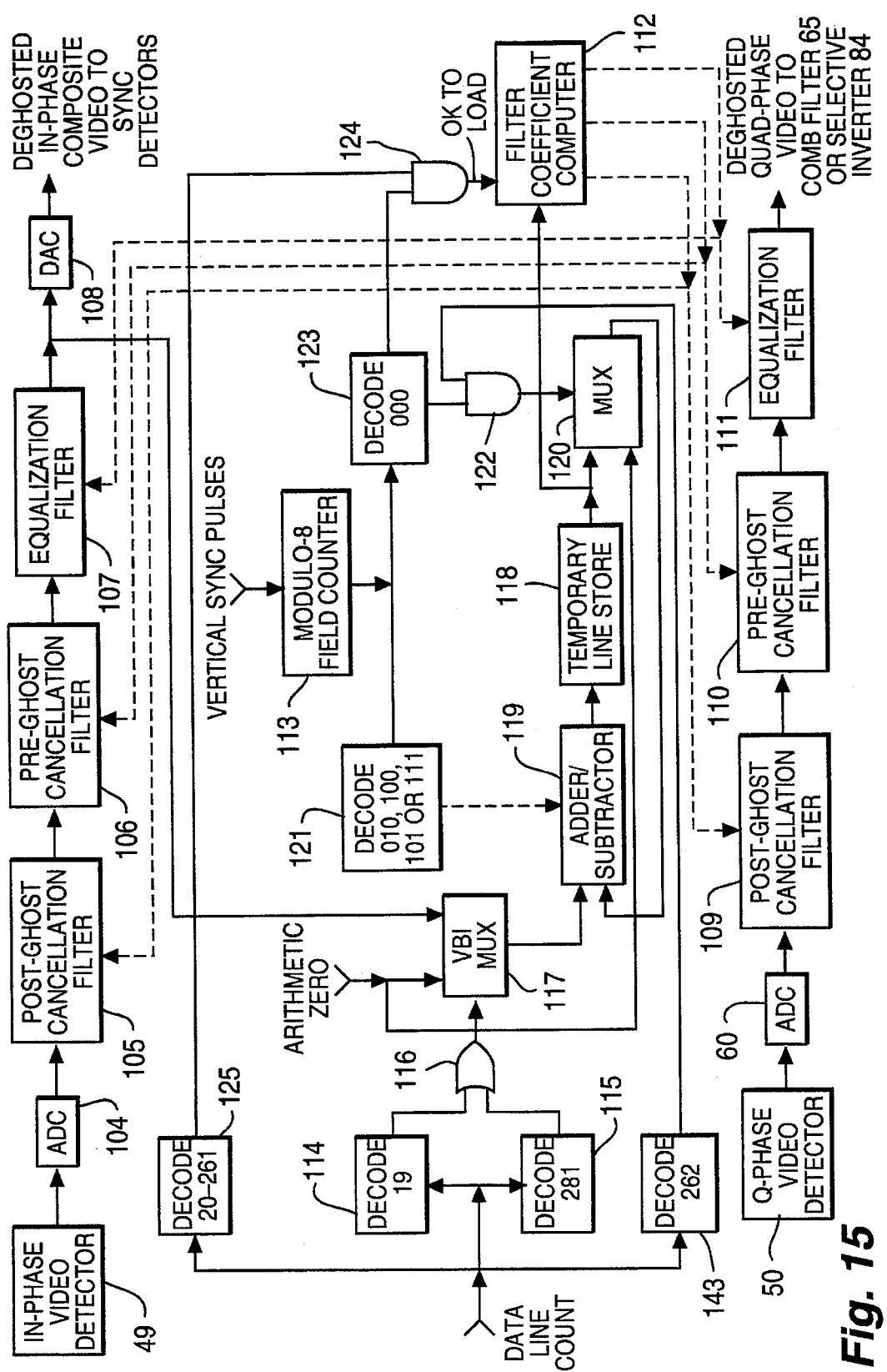
FIG. 15 is a schematic diagram of ghost-suppression circuitry suitable for inclusion in the FIG. 4 or FIG. 7 digital signal receiver.

FIG. 15 shows representative ghost-suppression circuitry for inclusion in the FIG. 4 or FIG. 7 digital signal receiver, which is designed to utilize the ghost-cancellation reference (GCR) signals used in the United States of America. In this de facto standard, Bessel-chirp GCR signals are inserted into the 19$^{th}$ VBI lines of each field. The distribution of energy in the Bessel pulse chirp signal has a flat frequency spectrum extending continuously across the video frequency band. The chirp starts at the lowest frequency and sweeps upward in frequency therefrom to the 4.1 MHz highest frequency. The chirps are inserted into the first halves of selected VBI lines, the 19$^{th}$ line of each field currently being preferred. The chirps, which are on +30 IRE pedestals, swing from −10 to +70 IRE and begin at a prescribed time after the trailing edges of the preceding horizontal synchronizing pulses. The chirp signals appear in an eight-field cycle in which the first, third, fifth and seventh fields have a polarity of color burst defined as being positive and the second, fourth, sixth and eighth fields have an opposite polarity of color burst defined as being negative. The initial lobe of a chirp signal ETP that appears in the first, third, sixth and eighth fields of an eight-field cycle swings upward from the +30 IRE pedestal to +70 IRE level. The initial lobe of a chirp signal ETR that appears in the second, fourth, fifth and seventh fields of the eight-field cycle swings downward from the +30 IRE pedestal to −10 IRE level and is the complement of the ETP chirp signal. The ghost suppression circuitry described with reference to FIGS. 15, 16 and 17 is suitable for a digital signal receiver in which the video IF filter 47 rejects the adjacent channel with next higher channel number.

In FIG. 15 the composite video signal and PSK subcarrier remnants buried therein that are detected by the in-phase video detector 49 are digitized by an analog-to-digital converter 104. The ADC 104, like the ADC 60, is clocked at the 16 MHz half-symbol rate by pulses from the zero-crossing detector 56 of FIG. 4 or 7. In FIG. 15 the digitized in-phase composite video signal with PSK subcarrier remnants buried therewithin supplied from the ADC 104 is applied as input signal to a cascade connection of a post-ghost cancelation filter 105, which is an adaptive filter of IIR type; a pre-ghost cancelation filter 106, which is an adaptive filter of FIR type; and an equalization filter 107, which is an adaptive filter of FIR type. The response of the equalization filter 107 is converted back to analog form by a digital-to-analog converter 108 for application to the horizontal sync separator 53 and the vertical sync separator 54 of the FIG. 4 or 7 digital signal receiver.

In FIG. 15, as in FIG. 4 or 7, the PSK subcarrier and the upper frequencies of the composite video signal that are detected by the quadrature-phase video detector 50 are digitized by an analog-to-digital converter 60. The output signal from the ADC 60 is applied as input signal to a cascade connection of a post-ghost cancelation filter 109, which is similar to the post-ghost cancelation filter 105; a pre-ghost cancelation filter 110, which is similar to the pre-ghost cancelation filter 106; and an equalization filter 111, which is similar to the equalization filter 107. The response of the equalization filter 111 is supplied to the bandpass frame-comb filter 65 of FIG. 4 or to the selective inverter 84 of FIG. 7.

A filter-coefficient computer 112 computes the weighting coefficients for the adaptive filters 105–107 and 109–111. These weighting coefficients are binary numbers, which the filter-coefficient computer 112 writes into registers within the digital filters 105–107 and 109–111. In the IIR filters 105 and 109 the weighting coefficients stored in registers thereof are used as multiplier signals for digital multipliers receiving the filter output signal with various amounts of delay as multiplicand signals. The product signals from the digital multipliers are combined algebraically in digital adder/subtractor circuitry to generate the IIR filter response. In each of the FIR filters 106, 107, 110 and 111 the weighting coefficients stored in registers thereof are used as multiplier signals for digital multipliers receiving the filter input signal with various amounts of delay as multiplicand signals. In each of the FIR filters 106, 107, 110 and 111 the product signals from the digital multipliers are combined algebraically in digital adder/subtractor circuitry to generate the weighted summation response characteristic of an FIR filter.

The number of taps in the FIR filters 106, 107, 110 and 111 depends on the range over which ghost suppression is sought. To keep filter costs within commercial constraints, typically the FIR filters 106 and 110 each have around 64 taps for suppressing ghosts with as much as 6 microseconds displacement from the direct signal. The FIR filters 107 and 111 used for frequency equalization each need only have 32 taps or so. The FIR filters 107 and 111 are typically required to correct in-band video response that can be rolled off by as much as 20 dB at 3.6 MHz, but roll-off at 3.6 MHz is usually less than 10 dB. The roll-off is usually attributable to incorrect orientation of the antenna in off-the-air reception. The cascaded FIR filters 106 and 107 are replaced in some designs by a single FIR filter having about 80 taps, as are the cascaded FIR filters 110 and 111.

The IIR post-ghost cancelation filters 105 and 109 required for suppressing post-ghosts over the full range of 40 microseconds displacement from the direct signal can each be as many as 600 taps long. However, since post-ghosts usually are non-overlapping and occur at discrete displacements, the weighting coefficients for many of these taps of the filters 105 and 109 are zero-valued or nearly so. Each of the tapped delay lines in the IIR filters 105 and 109 is usually designed as a cascade connection of ten-tap-or-so delay lines interspersed with programmable "bulk" delay devices, making each of the filters 105 and 109 what is sometimes termed a "sparse-weighting" filter. The ten-tap-or-so delay lines furnish signals to the digital multipliers for weighting. The incremental delay between successive taps of each of these ten-tap-or-so delay lines is a single half-symbol interval. The programmable bulk delay devices each comprise various length delay lines the chaining together of which can be controlled in response to control signals expressed as binary numbers. Such a sparse-weighting filter will include registers for the binary numbers specifying the delays of the programmable delay devices, the contents of which registers are also controlled by the filter-coefficient computer 112.

In FIG. 15 the vertical sync pulses separated by the vertical sync separator 54 are counted modulo-8 by a three-stage field counter 113, which generates a modulo-8 FIELD COUNT. The middle stage of counter 113 generates a count corresponding to the modulo-2 DATA FRAME COUNT. The modulo-8 FIELD COUNT, the HALF-SYMBOL count from the counter 55, and the DATA LINE COUNT from the counter 64 are available to the filter-coefficient computer 112 for use in timing its operations, although connections for furnishing these counts to the computer 112 are left out of FIG. 15 to reduce its complexity. Decoders 114 and 115 respond to the DATA LINE COUNT being 19 and 251, respectively, to supply ONEs to an OR gate 116. The OR gate 116 responds to supply a ONE during the scan line in each vertical blanking interval containing GCR signal, to condition the output signal of a multiplexer 117 to correspond to the digitized composite video signal from the output of the cascade connection of filters 105, 106 and 107 supplied as a first input signal thereto, rather than to a wired zero supplied as a zeroeth input signal thereto.

The filter-coefficient computer 112 has control over the operating parameters of the filters 105–107 and the similar operating parameters of the filters 109–111. So, by manipulation of the operating parameters of the filters 105–107 the computer 112 can select the point in the cascade connection of these filters from which GCR signal is separated by the GCR signal separator comprising the elements 114–117. For example, the input signal applied to the cascade connection of the filters 105–107 can be selected to the GCR signal separator by the computer 112, by setting the weighting coefficients of the recursive paths in the IIR filter 105 to zero values, so the output response of the IIR filter 105 is determined solely by its input signal; by setting to zero all the weighting coefficients except a unity-valued one defining the kernel center in the FIR filter 106; and by setting to zero all the weighting coefficients except a unity-valued one defining the kernel center in the FIR filter 107. Alternatively, one can make circuit arrangements that will implement more direct and faster selection of the point in the cascade connection of the filters 105–107 from which GCR signal is separated. The fact that the point in the cascade connection of the filters 105–107 from which GCR signal is separated can be selected is important to understand, since this fact will aid in understanding the implementation of the procedure for calculating the variable parameters of the filters 105–107, which is explained further on with reference to the FIG. 17 flow chart.

In FIG. 15 a temporary (scan) line store 118 is provided by a random-access memory (RAM) arranged for read-then-write-over operation as each of its storage locations is sequentially addressed in accordance with the HALF-SYMBOL COUNT. These same addresses are supplied to the filter-coefficient computer 112 to be used to address a line storage register therein when separated GCR signal is transferred, thereto from the temporary line store 118. The temporary line store 118 is connected in an arrangement for accumulating the $19^{th}$-VBI-line GCR signals on a per pixel basis for eight successive fields, in a temporal filtering operation that separates the Bessel-chirp information from other information occurring during those $19^{th}$ VBI scan lines.

Elements 113–123 in the FIG. 15 circuitry combine to form a GCR-signal averaging filter that carries out this temporal filtering operation, which correlates the Bessel-chirp information occurring during those $19^{th}$ VBI scan lines to provide improved signal-to-noise ratio, as compared to using gating simply to separate the Bessel-chirp information from $19^{th}$ VBI scan lines as it occurs. When the corresponding pixels of the eight GCR signals have been accumulated during the $19^{th}$ line of FIELD 000, the eighth and last field of the eight-field sequence, the separated Bessel-chirp information is serially loaded one pixel at a time into a register of the filter-coefficient computer 112 during any line of FIELD 000 when DATA LINE COUNT is in the range from 20 to 261, inclusive, as determined by a decoder 125. In FIG. 15 the line store 118 is cleared of data during the last line of the last field of the eight-field sequence, when DATA LINE COUNT is 262 as determined by a decoder 143.

The temporary line store 118 has to have the capability of storing sixteen-parallel-bit samples, assuming that it is to accumulate on a signed basis eight lines of eight-parallel-bit samples of digitized composite video signal supplied from the ADC 104 via the cascaded filters 105–107. The signed arithmetic is preferably two's complement arithmetic. In partial implementation of the arrangement for operating the temporary line store 118 as a signed accumulator for GCR signals, a digital adder/subtractor 119 supplies a sixteen-parallel-bit output signal to the temporary line store 118 as its write input signal. The digital adder/subtractor 119 receives as a first input thereto the output signal of a multiplexer 120, which normally corresponds to the readout from the temporary line store 118 received as the zeroeth input of the multiplexer 120. The digital adder/subtractor 119 receives as a second input thereto the eight-parallel-bit output signal of the multiplexer 117, together with eight wired ZEROs as a sign-bit extension.

A decoder 121 decodes the modulo-eight field count being one, three, six, or zero (i.e., eight) to furnish a logic ZERO to the digital adder/subtractor 119 to condition it to add its input signals. The decoder 121 decodes the modulo-eight field count being two, four, five, or seven to furnish a logic ONE to the digital adder/subtractor 119 to condition it subtract its second input signal (supplied from the multiplexer 117) from its first input signal (supplied from the multiplexer 120). This arrangement accumulates in the temporary line store 118 the following function:

(FIELD 001 line 19)–(FIELD 010 line 19)
+(FIELD 011 line 19)–(FIELD 100 line 19)

−(FIELD 101 line 19)+(FIELD 110 line 19)
−(FIELD 111 line 19)+(FIELD 000 line 19).

During the last line of the eighth field of each sequence of eight fields, the normally ZERO control signal to the multiplexer 120 is caused to be a ONE. This ONE conditions the multiplexer 120 to furnish an output signal corresponding to a first input thereto, which is an arithmetic zero comprising sixteen parallel bits of wired ZEROs. This results in the resetting of the accumulation result in the temporary line store 118 to arithmetic zero. The control signal for the multiplexer 120 is shown in FIG. 15 as being generated by a two-input AND gate 122. The decoder 143 generates one of the input signals to the AND gate 122, supplying a ONE to the AND gate 122 when and only when the DATA LINE COUNT is 262. A decoder 123 decodes the modulo-eight field count from the field counter 113 to generate the other of the input signals to the AND gate 122. The eighth field of each sequence of eight fields generates a 000 modulo-eight count from the field counter 113, causing the decoder 123 to supply a ONE to the AND gate 122. Both the input signals to the AND gate 122 are ONE only during the last line of the eighth field of each sequence of eight fields, during which line the AND gate 122 supplies a ONE to the multiplexer 120 as its control signal, causing the accumulation result stored in the temporary line store 118 to be reset to arithmetic zero.

A two-input AND gate 124 supplies a ONE to the filter-coefficient computer 112 when the accumulation result stored in the temporary line store 118 is available for transfer into a ghosted Bessel-chirp register within the internal memory of the computer 112. The output signal of the decoder 123 is one of the input signals to the AND gate 124 and is ONE only during the eighth field of each sequence of eight fields. The decoder 125 decodes DATA LINE COUNT to generate the other of the input signals to the AND gate 124, which is ONE on any of lines 20 through 261. Accordingly, the accumulation result stored in the temporary line store 118 is available for transfer into the internal memory of the computer 112 any time during the period inluding scan lines 20 through 261 in the eighth field of each sequence of eight fields.

In actual practice, it is preferable that the temporary line store 118 stores about two scan lines of samples, so that the deghosting range for post ghosts can be extended to 20 microseconds or so. The storage locations in the RAM used as the temporary line store 118 can be addressed by the least significant bit of DATA LINE COUNT together with the HALF-SYMBOL COUNT. The decoder 114 is replaced by a decoder that generates a ONE when and only when DATA LINE COUNT is either 19 or 20, and the decoder 116 is replaced by a decoder that generates a ONE when and only when DATA LINE COUNT is either 251 or 252. To improve the signal-to-noise ratio of the recovered GCR signal it is advantageous to average the GCR signal not over just eight scan lines 19, but over sixteen (or even higher multiple of eight) scan lines 19. This cart be done by modifying the line-19 accumulation circuitry of FIG. 15 or by arranging for the further averaging to be done in the computer 112.

Figure 16:
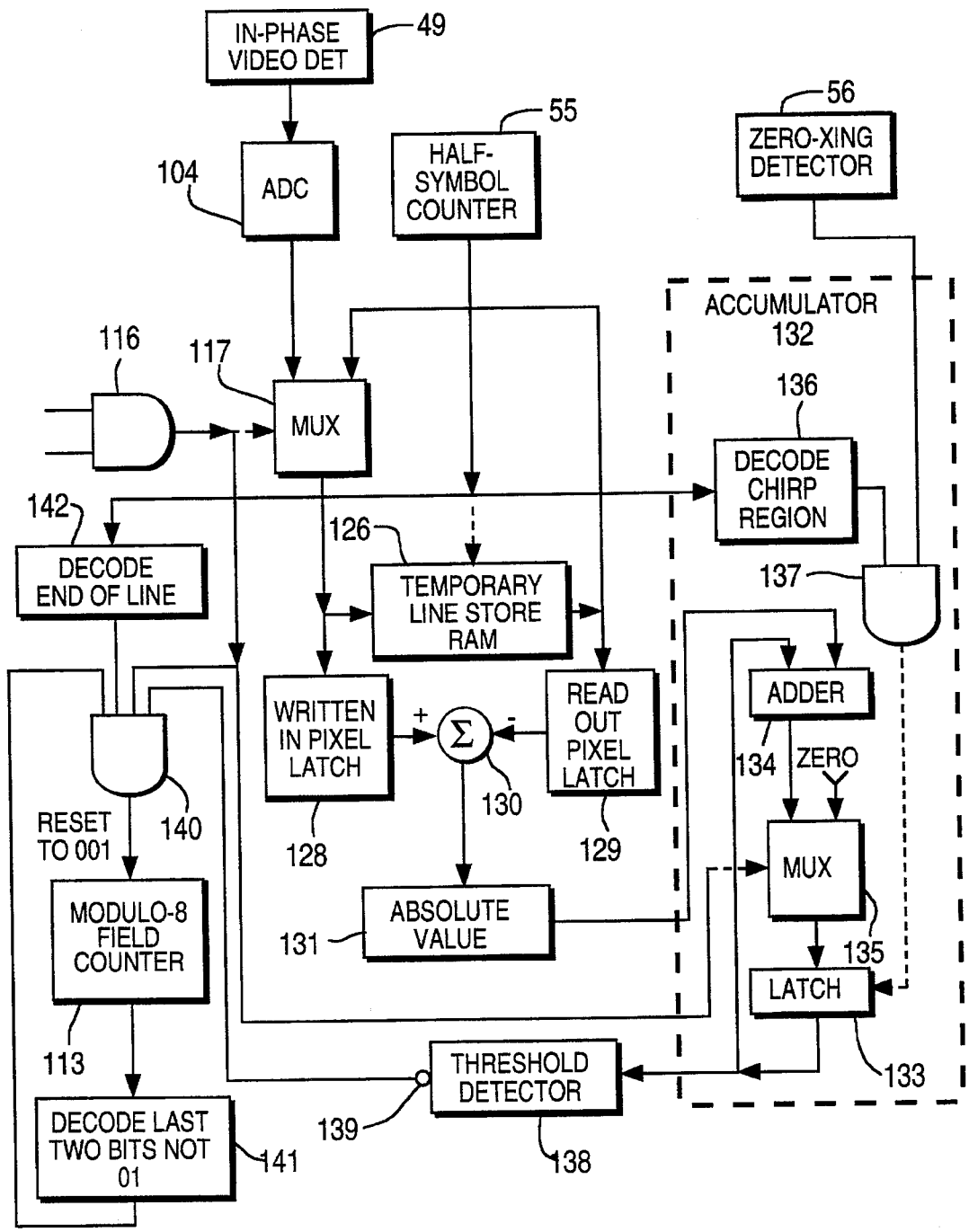
FIG. 16 is a schematic diagram of circuitry for resetting a modulo-eight field counter in the FIG. 15 ghost-suppression circuitry.

FIG. 16 shows circuitry for resetting the modulo-eight field counter 113 so its count either is correctly phased or is misphased by four fields. A temporary line store 126 is shown as being a random-access memory addressed by the HALF-SYMBOL COUNT from the counter 55. The line store 126 is arranged for read-then-write-over operation. The logic ONE issued by the OR gate 116 only during the $19^{th}$ scan line of each field is furnished to a multiplexer 127 to condition the updating of the temporary line store 126 with digitized $19^{th}$ scan line samples supplied from the ADC 104. During other scan lines the logic ZERO issued by the OR gate 116 conditions the multiplexer 127 to apply the data read from the temporary line store 126 for writing back thereinto.

The temporary line store 126 is provided with pixel latches 128 and 129 clocked by the output signal from the zero-crossing detector 56 (which clocking connections are not shown in FIG. 16). The pixel latches 128 and 129 are used for temporarily storing the last pixel written into the temporary line store 126 and the last pixel read out of the temporary line store 126, respectively, aligning those samples in time to be respective ones of the subtrahend and minuend input signals of a digital subtractor 130. The pixel samples of the difference signal from the subtractor 130 will all be zero valued except during $19^{th}$ scan lines. The difference signal from the subtractor 130 is furnished to an absolute-value circuit 131. By way of example, the absolute-value circuit 131 comprises a digital controlled adder/subtractor receiving wired arithmetic zero as its summand/minuend input signal, receiving the difference signal from the subtractor 130 as its summand/subtrahend input signal, and responding to the sign bit of that difference signal to add when that bit is ZERO and to subtract when it is ONE.

An accumulator 132 for successive samples of the absolute-value circuit 131 output signal includes an output latch 133 for temporarily storing successive values of the accumulation result, a digital adder 134 for adding the successive samples of the output signal of the absolute-value circuit 131 to the accumulation result to augment its value, and a multiplexer 135 for selectively supplying the augmented accumulation result to the output latch 133 for updating its contents. The multiplexer 135 is wired for inserting arithmetic zero into the output latch 133 whenever the OR gate 118 does not furnish a ONE which ONE indicates that GCR signal is present in the current scan line. A decoder 136 responds to the HALF-SYMBOL COUNT from the counter 55 being descriptive of those portions of a scan line as may contain Bessel chirp information to furnish a ONE, which is ANDed with the output signal from the zero-crossing detector 56 in an AND gate 137. The output latch 133 is clocked to receive input data responsive only to a ONE being received from the AND gate 137.

The successive samples of the absolute value of the difference of the nineteen lines of the current and previous fields, as supplied serially from the absolute-value circuit 131, are accumulated using the accumulator 132. The accumulation result should have appreciable value if the current field is not FIELD 001 or FIELD 101. The $19^{th}$ lines of FIELD 000 and of FIELD 001 both contain ETP signal, so their difference is zero-valued except for noise. The $19^{th}$ lines of FIELD 100 and of FIELD 101 both contain ETR signal, so their difference is zero-valued except for noise. The output signal of a threshold detector 138, which is a ONE when the accumulation result is substantially more than arithmetic zero and is otherwise a ZERO, is complemented by a NOT gate 139 to supply one of the four input signals of an AND gate 140. A decoder 141 detects the field count from the counter 113 being other than 001 or 101 to furnish a ONE to the AND gate, which ONE is indicative that the field count is misphased and enables the resetting of the counter 113. The output signal of the OR gate 116, which detects the occurrence of the $19^{th}$ line of a field, and the output signal of a decoder 142, which responds to the HALF-SYMBOL COUNT from the counter 55 to detect the end of a scan line, are the other two input signals to the AND gate 140. Providing that the field count is not 001 or 101, the AND gate 140 generates a ONE to reset the counter 113 to 001 field count at the end of the $19^{th}$ line of a FIELD 000 or of a FIELD 100 in the composite video signal detected by the in-phase video detector 49.

Returning to FIG. 15, if the modulo-eight field count provided by the field counter 113 is correctly phased, the accumulation result attained in the temporary line store 118 during FIELD 000, the last field in the cycle of algebraic accumulation, will be eight times the ETP Bessel chirp signal, devoid of accompanying horizontal sync pulse, front porch, back porch including color burst and +30 IRE pedestal. On the other hand, if the modulo-eight field count provided by the field counter 113 is misphased by four fields, the accumulation result attained in the temporary line store 118 during FIELD 000, the last field in the cycle of accumulation will be eight times the ETR Bessel chirp signal devoid of accompanying horizontal sync pulse, front porch, back porch including color burst and +30 IRE pedestal. A wired three binary place shift in the direction towards reduced magnitude divides the accumulation results attained in the temporary line store 118 during FIELD 000 by eight, and the resulting quotients are supplied as the ETP or ETR signal to the filter-coefficient computer 112.

The filter-coefficient computer 112, which is well-adapted to performing correlations against a ghost-free Bessel chirp function ETP or ETR stored in an internal register thereof, is programmed to perform a correlation substep that determines whether the input it receives from the temporary line store 118 during FIELD 000 is ETP signal, is ETR signal, or is unrelated to the ETP or ETR signal. This procedure enables the filter-coefficient computer 112 to determine when no GCR signals are included in the composite video signal detected by the in-phase video detector 49. The computer 112 may then apply predetermined "bypass:mode" weighting coefficients as stored in registers therewithin to the filters 105, 106 and 107, just as is done in the initial powering up of the ghost-suppression circuitry.

Figure 17:
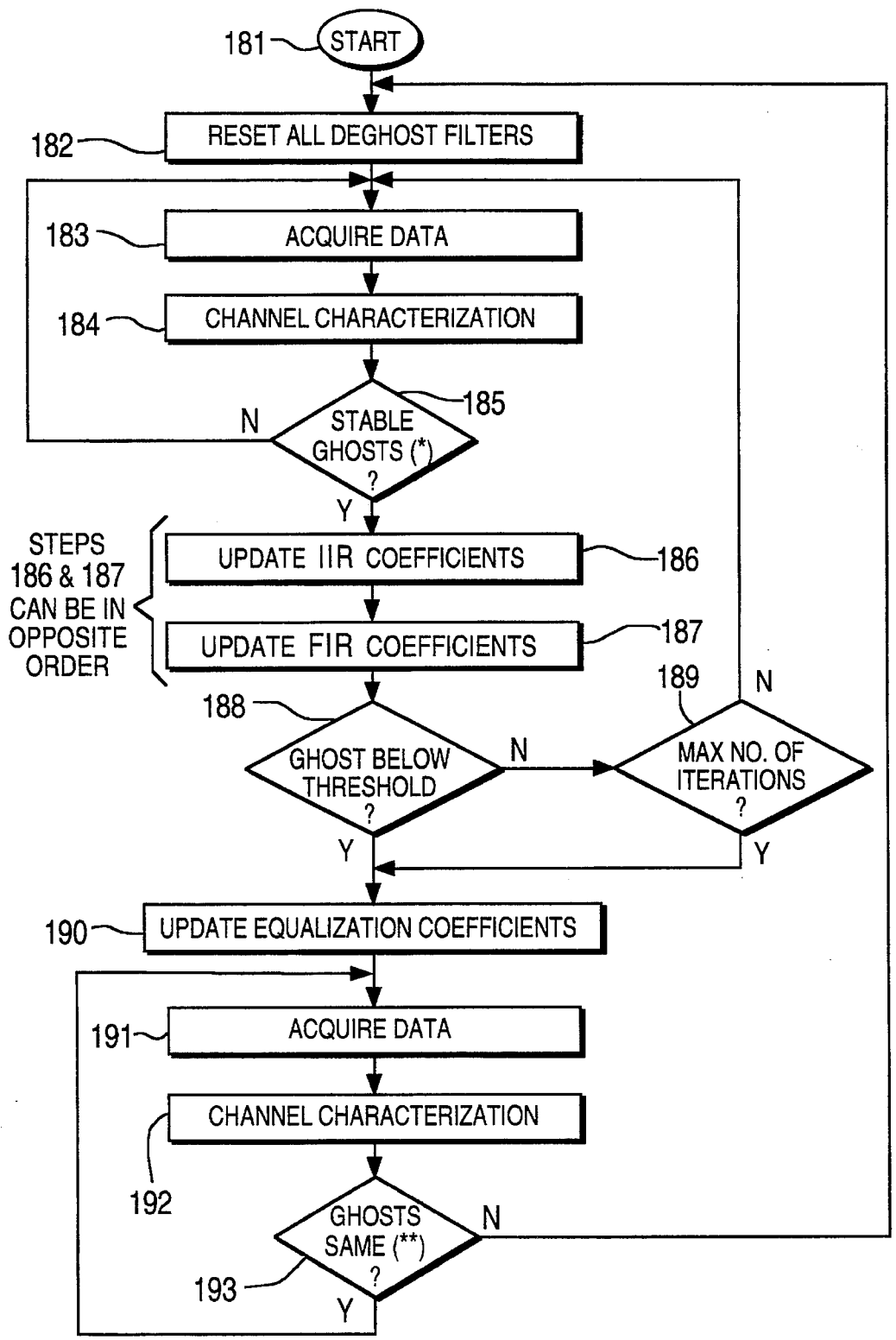
FIG. 17 is a flow diagram of a deghosting method used with the FIG. 15 deghosting circuitry.

FIG. 17 shows the flow diagram of a procedure for establishing the operating parameters of the filters 105–107 and 109–111, which procedure is carried out by the filter-coefficient computer 112. Entry to the START condition 181 of the procedure is at the time power is turned on in the television receiver, when a new channel is tuned, or when a prescribed time has elapsed since the last deghosting procedure. A RESET ALL DEGHOST FILTERS step 182 preferably sets the filter coefficients in the filters 105–107 and 109–111 to values previously determined for the channel to which the tuner 46 is tuned and stored in a channel-addressed memory. Alternatively, during power-up or retuning, the filter coefficients in the filters 105–107 and 109–111 can be set to "bypass mode" values associated with a ghost-free signal; and during periodic deghosting previous values of the filter coefficients are retained during "reset".

An ACQUIRE DATA step 183 then follows, which step 183 is completed after the number of fields elapse that the computer 112 must wait for accumulation in the temporary line store 118 to be completed, in order to generate a separated GCR signal that is suitable input data for the computer 112. The ACQUIRE DATA step 183 includes a correlation substep not shown in FIG. 17 which substep determines whether the input the computer 112 receives from the temporary line store 118 during FIELD 000 is ETP signal, is ETR signal, or is unrelated to the ETP or ETR signal.

A CHANNEL CHARACTERIZATION step 184 then takes place. The computer 112 carries this out by correlating, in the time domain, the ghost-free GCR signal stored in its permanent memory with the ghosted GCR signal separated from the received composite video signal. The location in time of the predominant response in the data supplied the computer 112 is detected, then the respective location in time of each successively smaller one of the significantly large ghost responses, up to the number of post-ghosts that can be suppressed by the filters 105 and 109, and up to the number of pre-ghosts that can be suppressed by the filters 106 and 110. The respective locations in time of the predominant response and multipath responses in the data supplied the computer 112 are calculated and stored temporarily in the internal memory of the computer 112, to be used as the basis for programming the bulk delay lines interspersed between the clumps of taps in the IIR filters 105 and 109. The relative strengths of the predominant response and multipath responses in the data supplied to the computer 112 are calculated and stored temporarily in the internal memory of the computer 112, to be used as the basis for assigning weights to the clumped taps of IIR filters 105 and 109 and to the taps of FIR filters 106 and 110. The CHANNEL CHARACTERIZATION step 184 is carried forward in the filter coefficients computer 112 by taking the discrete Fourier transform (DFT) of the acquired GCR signal and dividing the terms of that DFT by the corresponding terms of the DFT of a ghost-free GCR signal, which latter DFT is known a priori and is stored in the internal memory of the computer 112. This term-by-term division procedure generates the DFT of the reception channel, which is temporarily stored in the internal memory of the computer 112.

As part of the CHANNEL CHARACTERIZATION step 184, it is preferable to normalize the terms of the DFT of the reception channel respective to the energy in the predominant image. The largest-magnitude term of the DFT of the reception channel is determined and the r-m-s energy of that term and its closeby surrounding terms (e.g., twelve on each side) is determined. Normalization could be done on the predominate image and all ghost images, but it is preferably from the standpoint of reducing calculations to discard low-energy ghosts before normalization, which is done as follows. The r-m-s energy of the largest-magnitude term of the DFT of the reception channel and its closeby terms, as is descriptive of the predominant image, is scaled down to provide a threshold level against which to compare the r-m-s energies of ghost images described by the other terms of the DFT of the reception channel, in order to determine whether each of those ghost images is or is not significantly large. A threshold level −30 dB down from the r-m-s energy of the predominant image has been found satisfactory. Each of the terms of the DFT of the reception channel that is descriptive of a ghost image having r-m-s energy lower than threshold level is simply replaced by a zero to generate an approximated DFT of the reception channel, to be normalized. In the normalization each of the non-zero terms in the approximated DFT is divided by the r-m-s energy of the predominant image. The normalized approximated DFT of the reception channel is temporarily stored in the internal memory of the computer 112, to be used to support the remaining portions of the calculations. The number of divisions that must be performed in this normalization procedure may be counted, or the number of terms lower than threshold level that are replaced by a zero may be counted as an aid to implementing a later decision step 188 in the FIG. 17 procedure.

Referring back to the FIG. 17 procedure, A STABLE GHOST? decision step 185 follows the CHANNEL CHARACTERIZATION step 184. This step is carried forward using a subroutine where the results of the CHANNEL CHARACTERIZATION step 184 just previous to the most recent CHANNEL CHARACTERIZATION step 184 are fetched from a register in the internal memory of the filter coefficients computer 112 and are replaced in that register by the results of the current CHANNEL CHARACTERIZATION step 184. The results of the most recent CHANNEL CHARACTERIZATION step 184 are cross-correlated with the results of the just-previous CHANNEL CHARACTERIZATION step 184 to determine whether the correlation is sufficiently good that the ghosting conditions can be considered stable, or unchanging. Only if the ghosting conditions are substantially unchanging is a Y(ES) signal generated indicating there a basis for going on further with the deghosting procedure using the most recent CHANNEL CHARACTERIZATION results. If the A STABLE GHOST? decision step 185 generates an N(O) signal indicative of changing ghost conditions, operation loops back to the ACQUIRE DATA step 183, and the adjustable filtering parameters of the IIR filter 105 and of the FIR filter 106 are left unchanged. If the STABLE GHOST? decision step 185 generates a Y(ES) signal, the procedure goes on to steps 186–188, which use the most recent CHANNEL CHARACTERIZATION step 184 results as the basis for updating the adjustable filtering parameters of the IIR filters 105 and 109 and of the FIR filters 106 and 110.

In the UPDATE IIR COEFFICIENTS Step 186 the programmable delays and the non-zero weighting coefficients of the IIR filters 105 and 109 are updated, using the most recent CHANNEL CHARACTERIZATION step 184 results as the basis for the updating. More particularly, the post-ghost portion of the most recent normalized reception channel DFT results, those later in time than the largest-magnitude term, are complemented to generate the DFT of the desired IIR filter 105 (and 109) response, from which DFT the updated IIR filter coefficients are taken. The non-zero terms of the DFT of the desired IIR filter 105 (and 109) response are used to determine weighting coefficients. The lengths of intervals containing all zero coefficients are measured to determine the adjustable delay of bulk delay devices if the IIR filters 105 and 109 are of a sparse coefficient type. The updated IIR filter parameters are applied to the IIR filters 105 and 109.

An UPDATE FIR COEFFICIENTS step 187 is performed after the UPDATE IIR COEFFICIENTS step 186. The non-zero weighting coefficients of the FIR filters 106 and 110 are updated, using the most recent CHANNEL CHARACTERIZATION step 184 results as the basis for the updating. More particularly, the pre-ghost portion of the most recent normalized reception channel DFT results, those earlier in time than the largest-magnitude term, are complemented to generate the DFT of the desired FIR filter 106 (and 110) response, from which DFT the updated FIR filter coefficients are taken. The lengths of intervals containing all zero coefficients are measured to determine the adjustable delay of bulk delay devices if the FIR filters, 106 and 110 are of a sparse coefficient type. The updated FIR filter coefficients are applied to the IIR filters 106 and 110.

FIG. 17 shows a decision step 188 of GHOSTS BELOW THRESHOLD? being reached after the UPDATE IIR COEFFICIENTS and UPDATE FIR COEFFICIENTS steps 186 and 187 are performed. The step 188 may be implemented proceeding from the count of the number of divisions performed when normalizing the reception channel DFT in the CHANNEL CHARACTERIZATION step 184, the count being zero generating a Y(ES) signal and the count being other than zero generating a N(O) signal. Alternatively, the step 188 may be implemented proceeding from the count of the number of terms lower than threshold level that are replaced by a zero when normalizing the reception channel DFT in the CHANNEL CHARACTERIZATION step 184, the count being one less than the total number of reception channel DFT terms generating a Y(ES) signal, and other counts generating a N(O) signal.

An N(O) signal resulting from the GHOSTS BELOW THRESHOLD? step 188 directs the operation to a MAXIMUM NUMBER OF ITERATIONS STEP 189. A counter in the computer counts the number of N(O) signals resulting from the GHOSTS BELOW THRESHOLD? decision step 188 and is reset to zero count by a Y(ES) signal resulting from the GHOSTS BELOW THRESHOLD? step 188. An N(O) signal resulting from the GHOSTS BELOW THRESHOLD? step 188 before maximum count is reached by this counter loops operation back to the ACQUIRE DATA step 183.

If the decision in step 188 is Y(ES), all significant ghosts have been canceled, or, if the decision in step 189 is Y(ES), indicating that sufficient iterations have been made that there is assurance that the filters 105, 106, 109 and 110 do not have the capability to be further adjusted to cancel at least one more ghost, the part of the procedure having to do with cancelling macroghosts is done and the procedure goes on to an UPDATE EQUALIZATION COEFFICIENTS step 190 in which weighting coefficients for the amplitude-equalization filters 107 and 111 are calculated.

The UPDATE EQUALIZATION COEFFICIENTS step 190 is preferably performed by using an iterative least-means-squares-error method to adjust the filter 107 weighting coefficients so that the response of the cascade connection of filters 105–107 accumulated in the temporary line store 118 best fits an ideal response to a ghost-free GCR Bessel chirp, as stored in the memory of the computer 112. The ideal channel characterization response to a ghost-free GCR Bessel chirp has a (sin x)/x envelope in the time domain, descriptive of a flat response in the frequency domain. This response provides for minimal inter-symbol interference in the PSK. The filter 111 weighting coefficients are adjusted the same as the filter 107 weighting coefficients.

Following the UPDATE EQUALIZATION COEFFICIENTS step 190, another ACQUIRE DATA step 191 follows in the FIG. 17 procedure, which step 191 is completed after the number of fields elapse that the computer 112 must wait for accumulation in the temporary line store 118 to be completed, in order to generate a separated GCR signal that is suitable input data for the computer 112. The ACQUIRE DATA step 191 includes a correlation substep not shown in FIG. 17 which substep determines whether the input the computer 112 receives from the temporary line store 118 during FIELD 000 is ETP signal, is ETR signal, or is unrelated to the ETP or ETR signal.

Another CHANNEL CHARACTERIZATION step 192 then takes place, using any ETP or ETR signal acquired in the step 191 to recalculate the DFT of the reception channel. In a GHOSTS SAME? decision step 193 the DFT of the reception channel recalculated in the CHANNEL CHARACTERIZATION step 192 is correlated with the DFT of the reception channel as previously calculated in the CHANNEL CHARACTERIZATION step 184. From the standpoint of easy implementation, the correlation is preferably done in an indirect manner by checking to see if the residual ghosts in both the CHANNEL CHARACTERIZATION step 184 and the CHANNEL CHARACTERIZATION step 193 are all below prescribed threshold level. If the correlation is good, indicating that ghosting has not changed appreciably, the decision step 193 generates a Y(ES) signal that loops operation back to the ACQUIRE DATA step 191, to continue checking to find out whether or not ghosting has changed appreciably. The filtering parameters of the filters 105–107 (and of the filters 109–111) are left unchanged.

If the correlation is poor, indicating that ghosting has changed, the decision step 193 generates a N(O) signal that loops operation back to the RESET ALL DEGHOST FILTERS step 182. This procedure disables ghost suppression when rapidly changing multipath conditions occur or when a different reception channel is selected. The filtering parameters of the filters 105–107 and 109–111 are then subject to recalculation following the steps already described.

In the FIG. 17 procedure the UPDATE IIR COEFFICIENTS step 188 and the UPDATE FIR COEFFICIENTS step 187 are performed independently during each passage through these two successive steps. The updating of the filter coefficients of the initial ones of the cascaded ghost cancelation filters, here the post-ghost filters 105 and 109, gives rise to spurious ghosts of the type that could be suppressed by updating of the filter coefficients of the final ones of these filters, here the pre-ghost filters 108 and 110. Since the UPDATE IIR COEFFICIENTS step 188 and the UPDATE FIR COEFFICIENTS step 187 do not take these spurious ghosts into account, the subsequent recalculation of the weighting coefficients of the initial one of the cascaded ghost cancelation filters during the next passage through these two successive steps will introduce compensatory ghosts that will reduce the spurious ghosts in the final filter response. Since this reduction may not be complete, recalculation of the weighting coefficients of the final one of the cascaded ghost cancelation filters should be provided for. The decision loop around steps 183–189 implements these recalculations.

The ghost-suppression circuitry in FIGS. 15 and 16 and the method diagrammed in FIG. 17 of computing the filtering parameters for filters in that circuitry are based on inventions of Chandrakant B. Patel and Jian Yang described in U.S. patent application Ser. No. 07/984,488 filed 2 Dec. 1992, entitled "GHOST CANCELATION REFERENCE SIGNAL ACQUISITION CIRCUITRY, AS FOR TV RECEIVER OR VIDEO RECORDER", and assigned to Samsung Electronics, Co., Ltd., pursuant to pre-existing obligations of the inventors to so assign their inventions at the time the inventions were made.

The digital data transmission system preferred by the inventors at the time this specification was written is described above. Preference was determined, based on the technical criteria of most error-free digital data transmission and freedom from apparent data-caused artifacts in the television picture. Several variants of this system are within the scope of the invention, however, and the claims should be construed so as to include such variants within their scope if the terms of the claim do not introduce limitations as would specifically exclude such variants from the monopoly defined by those claims.

The quadrature carrier of the same frequency as the VSB video carrier can be a single-sideband amplitude-modulated (SSB AM) carrier, rather than a vestigial-sideband amplitude-modulated (VSB AM) carrier. This procedure still permits the synchronous detection of that quadrature carrier to recover the composite video signal without substantial energy in the baseband extending up to 0.75 MHz and at lessened energy up to the 1.25 MHz. However, the SSB AM carrier does not provide for cancelling the PSK in the in-phase video detector response where the VSB AM video carrier is DSB AM in character. The SSB AM carrier, being narrower band than the VSB AM carrier it replaces, increases the likelihood of inter-symbol interference.

The linear combination of the PSK signal with the composite video signal in the VSB amplitude modulation of the in-phase video carrier has been considered by the inventors. This variant in system design completely sacrifices separability of the PSK signal and the luminance signal components in the frequency range up to 750 kHz or so that do not exhibit frame-to-frame change, which is the reason this variant in system design is not preferred from the objective of achieving most error-free digital data transmission. When this variant in system design is used, the receiver must rely on the synchronous detection of PSK carrier to suppress the luminance signal components in the frequency range up to 750 kHz or so that do not exhibit frame-to-frame change as well as those that do exhibit frame-to-frame change. Since synchronous detection of PSK carrier is quite effective in suppressing luminance signal components in the frequency range up to 750 kHz or so, and since linearly combining the PSK signal with the composite video signal in the VSB amplitude modulation of the in-phase video carrier saves the need for a separate low-power VSB AM transmitter for quadrature-phase video carrier, there may be economic considerations that will cause this system variant to be chosen over the system preferred by the inventors.

Another variant in system design considered by the inventors modifies the transmitter so the chroma is not repeated in contiguous pairs of scan lines, but the subcarrier modulated by digital data is still repeated in anti-phase in those pairs. This system variation reduces the effectiveness of the lowpass line-comb filtering used in the digital signal receiver for separating the PSK from accompanying chroma. Synchronous detection of PSK carrier in the digital signal receiver will tend to suppress the remnant chroma, however.

Another variant in system design considered by the inventors modifies the transmitter so the subcarrier modulated by digital data is repeated in anti-phase, not in contiguous pairs of scan lines but rather at times a field apart. A lowpass field-comb filter rather than a lowpass line-comb filter is used in the digital signal receiver for reducing the chroma accompanying the PSK. In this variant the digital data is repeated four times at even intervals which reduces somewhat the likelihood of a long sequence of impulse noise affecting more than a "scan line" of digital data. Other spatial dispersion methods for repeating lines of digital data in anti-phase are possible, of course.

Another variant in system design considered by the inventors modifies the transmitter so the subcarrier modulated by digital data is not repeated in anti-phase in pairs of scan lines and chroma scan lines are not repeated. The PSK cannot then be separated from accompanying chroma by lowpass line-comb filtering or lowpass field-comb filtering in the digital signal receiver. Synchronous detection of PSK subcarrier in the digital receiver can be relied on for rejecting the chroma, there being not much spectral interaction between the chrominance frequencies and the PSK frequencies if "upper" SSB BPSK of a subcarrier of frequency 6.5 $f_H$ or so is used. There is a loss in signal-to-noise ratio approaching 3 dB for the PSK recovered at the receiver, since with this system variant there is less PSK sample averaging possible during recovery.

One can also arrange to avoid the chroma being an interfering signal that may cause error in the detected PSK, by separating the PSK from chroma by lowpass filtering, or by trapping chroma out of the PSK with a band-reject filter. To permit such filtering, the symbol rate of the PSK has to be halved in order that the major lobe of its frequency spectrum extends upward to only 2.12 MHz or so. Since there is no longer the effective halving of long-term-average symbol rate caused by repetition of the subcarrier modulated by digital data in anti-phase in contiguous pairs of scan lines, the long-term-average symbol rate is the same as in the system preferred by the inventors. With this system variant, too, there is a loss in signal-to-noise ratio approaching 3 dB for the PSK recovered at the receiver, since again there is less PSK sample averaging possible during recovery.

When the PSK is limited to a band that extends upward to only 2.12 MHz or so, its highest-frequency and next-highest-frequency strong spectral components no longer straddle the chroma band, so one of the reasons for choosing "upper sideband" SSB BPSK no longer exists. If the PSK modulates a quadrature-phase video carrier, "upper sideband" SSB BPSK still has advantage over QPSK and MPSK. The spectral distribution of the frequencies of this type of BPSK is such that most of its energy is on average in its lower frequencies and, by being in the quadrature-phase sidebands of the video carrier is not interfered with by the luminance signal energy in the in-phase sidebands of the video carrier.

If the PSK modulating an in-phase video carrier is limited to a band that extends upward to only 2.12 MHz or so, "lower" SSB BPSK is the probably best choice of modulation, since the spectral distribution of the frequencies of this type of BPSK is such that most of its energy is on average in its upper frequencies closer to the PSK carrier frequency, while the spectral distribution of the luminance signal frequencies is such that most of its energy is on average in its lower frequencies. This minimizes the spectral interaction of the PSK with luma. The choice of the PSK carrier frequency to be an odd multiple of scan line frequency $f_H$ and the symbol rate to be a multiple of $f_H$, as taught herein, becomes of increased importance for making the buried digital information inapparent in the television picture viewed on screen, particularly during fading conditions.

Other variants in system design considered by the inventors modify the transmitter so that the subcarrier modulated by digital data is not repeated in anti-phase in consecutive pairs of successive frames. This modification removes one of the important mechanisms for making the buried digital information not be apparent in the television picture viewed on screen, however; and there is a loss in signal-to-noise ratio approaching 3 dB for the PSK recovered at the receiver, since with this system variant there is less PSK sample averaging possible during recovery. The choice of the PSK carrier frequency to be an odd multiple of scan line frequency $f_H$ and the symbol rate to be a multiple of $f_H$, as taught herein, becomes of increased importance for making the buried digital information inapparent in the television picture viewed on screen, particularly if the PSK is not a subcarrier of a quadrature-phase video carrier.

In television that uses the PAL standard, rather than the NTSC standard, repeating the PSK subcarrier in anti-phase in pairs of scan lines is not useful for separating it from chrominance, since different types of color-difference signal are transmitted during even lines and during odd lines. In television that uses the PAL standard, "lower" SSB BPSK of a PSK subcarrier at the same 4,433,619 Hz frequency as the color subcarrier can be used, with the phase of the PSK subcarrier being switched from line to line so the PSK subcarrier and the chroma subcarrier are at all times orthogonal to each other. In the digital signal receiver, during the alternate scan lines when red-minus-luminance (R-Y) color-difference signal modulates the swinging color subcarrier, the PSK subcarrier is synchronously detected in the blue-minus-luminance (B-Y) color-difference signal phase; and, during the alternate scan lines when (B-Y) color-difference signal modulates the swinging color subcarrier, the PSK subcarrier is synchronously detected in the (R-Y) color-difference signal phase. The same digital data are sent during four successive frame times, rather than two sufficing as in NTSC standard TV, and the bandpass frame-comb filtering is modified to suit.

In television that uses the PAL standard, it may be preferred to avoid altogether the possibility of data crosstalk into chroma and accordingly not to place the PSK subcarrier at the same 4,433,619 Hz frequency as the color subcarrier, with the phase of the PSK subcarrier being swung from line to line so the PSK subcarrier and the chroma subcarrier are at all times orthogonal to each other. A system similar to that preferred with NTSC can be used, with "upper" SSB BPSK having spectral components straddling the chrominance spectrum or entirely below the chrominance spectrum. Since differential phase error is not of such particular concern in regard to the PSK subcarrier as it is in regard to chroma, the PSK subcarrier can be at an odd multiple of half scan line frequency and the symbol rate can be a multiple of scan line frequency, better to reduce its appearance in the luminance signal. Line-pairing techniques to facilitate separating chroma and data are not used, of course.

What is claimed is:

1. A system for transmitting a video carrier the amplitude of which is modulated in accordance with a composite video signal descriptive of image frames scanned with successive scan lines occurring at a prescribed scan line frequency, said composite video signal comprising a baseband luminance signal and a color subcarrier modulated by color difference signal components, said system for transmitting being improved to further comprise:

a PSK generator generating a PSK subcarrier by phase shift keying a subcarrier of a suppressed carrier in response to digital information, said suppressed carrier having the same frequency as said video carrier and being in quadrature phasing with said video carrier; and transmitter apparatus for transmitting said PSK subcarrier together with said video carrier the amplitude of which is modulated in accordance with said composite video signal.

2. A system for transmitting a video carrier the amplitude of which is modulated in accordance with a composite video signal descriptive of image frames scanned with successive scan lines occurring at a prescribed scan line frequency, said composite video signal comprising a baseband luminance signal and a color subcarrier modulated by color difference signal components, said system for transmitting being improved to further comprise:

a PSK generator generating a PSK subcarrier by phase shift keying a subcarrier of a suppressed carrier in response to digital information, said suppressed carrier having the same frequency as said video carrier, said PSK generator in each of consecutive pairs of said frames of said composite video signal repeating in anti-phase during a final frame of that consecutive pair of said frames said PSK subcarrier in an initial frame of that consecutive pair of said frames; and transmitter apparatus for transmitting said PSK subcarrier together with said video carrier the amplitude of which is modulated in accordance with said composite video signal.

3. A system for transmitting a video carrier the amplitude of which is modulated in accordance with a composite video signal descriptive of image frames scanned with successive scan lines occurring at a prescribed scan line frequency, said composite video signal comprising a baseband luminance signal and a color subcarrier modulated by color difference signal components, said system for transmitting being improved to further comprise:

a PSK generator generating a PSK subcarrier by phase shift keying a subcarrier of a suppressed carrier in response to digital information, said suppressed carrier having the same frequency as said video carrier, said PSK subcarrier having a frequency that is an odd multiple of half said prescribed scan line frequency, said PSK subcarrier having its phase reversed between each said scan line and the next one of said scan lines, said PSK subcarrier having its phase further reversed at corresponding points in each successive one of said frames; and transmitter apparatus for transmitting said PSK subcarrier together with said video carrier the amplitude of which is modulated in accordance with said composite video signal.

4. A system for transmitting as set forth in claim 3 wherein the phase-shift keying of said PSK subcarrier is binary phase-shift keying.

5. A system for transmitting as set forth in claim 4 wherein the phase-shift keying of said PSK subcarrier is single-sideband binary phase-shift keying.

6. A system for transmitting as set forth in claim 4, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

7. A system for transmitting as set forth in claim 4, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

8. A system for transmitting as set forth in claim 3 wherein the phase-shift keying of said PSK subcarrier is done at a symbol rate that is a multiple of said prescribed scan line frequency.

9. A system for transmitting as set forth in claim 8 wherein the phase-shift keying of said PSK subcarrier is binary phase-shift keying.

10. A system for transmitting as set forth in claim 9 wherein the phase-shift keying of said PSK subcarrier is single-sideband binary phase-shift keying.

11. A system for transmitting as set forth in claim 9, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

12. A system for transmitting as set forth in claim 9, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

13. A system for transmitting as set forth in claim 3, wherein said PSK subcarrier is repeated within each of consecutive in time pairs of scan lines within each frame.

14. A system for transmitting as set forth in claim 13 wherein the phase-shift keying of said PSK subcarrier is binary phase-shift keying.

15. A system for transmitting as set forth in claim 14 wherein the phase-shift keying of said PSK subcarrier is single-sideband binary phase-shift keying.

16. A system for transmitting as set forth in claim 14, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

17. A system for transmitting as set forth in claim 14, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

18. A system for transmitting as set forth in claim 3 wherein the phase-shift keying of said PSK subcarrier is done at a symbol rate that is a multiple of said prescribed scan line frequency.

19. A system for transmitting as set forth in claim 18 wherein the phase-shift keying of said PSK subcarrier is binary phase-shift keying.

20. A system for transmitting as set forth in claim 19 wherein the phase-shift keying of said PSK subcarrier is single-sideband binary phase-shift keying.

21. A system for transmitting as set forth in claim 20, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

22. A system for transmitting as set forth in claim 20, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

23. A system for transmitting as set forth in claim 13, wherein said color difference signal components modulating said color subcarrier are repeated within each of consecutive in time pairs of scan lines within each frame.

24. A system for transmitting as set forth in claim 23 wherein the phase-shift keying of said PSK subcarrier is binary phase-shift keying.

25. A system for transmitting as set forth in claim 24 wherein the phase-shift keying of said PSK subcarrier is single-sideband binary phase-shift keying.

26. A system for transmitting as set forth in claim 24, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

27. A system for transmitting as set forth in claim 24, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

28. A system for transmitting as set forth in claim 23 wherein the phase-shift keying of said PSK subcarrier is done at a symbol rate that is a multiple of said prescribed scan line frequency.

29. A system for transmitting as set forth in claim 28 wherein the phase-shift keying of said PSK subcarrier is binary phase-shift keying.

30. A system for transmitting as set forth in claim 29 wherein the phase-shift keying of said PSK subcarrier is single-sideband binary phase-shift keying.

31. A system for transmitting as set forth in claim 29, wherein the phase-shift keying of said PSK subcarrier is upper single-sideband binary phase-shift keying, and wherein the upper single-sideband binary phase-shift-keyed subcarrier from time to time has spectral components at frequencies below a frequency range occupied by spectral components of said color subcarrier modulated by color difference signal components.

32. A system for transmitting as set forth in claim 29, wherein the phase-shift keying of said PSK subcarrier is upper single-sideband binary phase-shift keying, and wherein the upper single-sideband binary phase-shift-keyed subcarrier from time to time has spectral components at frequencies above and below a frequency range occupied by spectral components of said color subcarrier modulated by color difference signal components.

33. A system for transmitting as set forth in any one of claims 2–32, including
    means for generating said suppressed carrier in quadrature phasing with said video carrier.

34. A system for transmitting as set forth in any one of claim 3–32, wherein said corresponding points in each successive one of said frames at which the phase of said PSK subcarrier is further reversed are between the fields of each of said frames.

35. A system for transmitting as set forth in claim 34, including
    means for generating said suppressed carrier in quadrature phasing with said video carrier.

36. A system for transmitting a video carrier the amplitude of which is modulated in accordance with a composite video signal descriptive of image frames scanned with successive scan lines occurring at a prescribed scan line frequency, said composite video signal comprising a baseband luminance signal and a color subcarrier modulated by color difference signal components, said system for transmitting being improved to further comprise:
    means for transmitting, together with said video carrier the amplitude of which is modulated in accordance with said composite video signal, digital information encoded in phase-shift keying of a PSK subcarrier of a suppressed carrier having the same frequency as said video carrier,
    wherein said means for transmitting digital information encoded in phase-shift keying of a PSK subcarrier of a suppressed carrier having the same frequency as said video carrier comprises:
    means for supplying said digital information as a succession of samples of a modulating signal, each having a respective value that is of a prescribed level respective to a zero level and that has a respective polarity;
    means for supplying respective carrier waves of first and second frequencies, the difference between which is an odd multiple of half said prescribed scan line frequency;
    a balanced modulator for modulating the amplitude of said carrier wave of said first frequency in accordance with the successive samples of said modulating signal, thereby generating a double-sideband phase-shift-keyed carrier wave of said first frequency;
    a sideband selection filter connected for receiving said double-sideband phase-shift-keyed carrier wave of said first frequency, the output signal of said sideband selection filter responding to only a single sideband of said double-sideband phase-shift-keyed carrier wave of said first frequency;
    a mixer for supplying a mixer output signal, said mixer output signal including a low-frequency band component containing frequencies that correspond to differences between the frequencies of said sideband selection filter output signal and said carrier wave of said second frequency received by said mixer as respective mixer input signals, and said mixer output signal further including a high-frequency band component containing frequencies that correspond to sums of the frequencies of said sideband selection filter output signal and said carrier wave of said second frequency received by said mixer as respective mixer input signal;
    a lowpass filter connected for receiving said mixer output signal and supplying response to said low-frequency band component thereof as said subcarrier; and
    means for modulating the amplitude of said suppressed carrier having the same frequency as said video carrier, in accordance with the response of said lowpass filter to said low-frequency band component of said mixer output signal.

37. A system for transmitting as set forth in claim 36 further comprising:
    means for predicting errors in the reception of said digital information that are generated by components of said composite video signal; and
    means for modifying said modulating signal for said balanced modulator in accordance with said errors.

38. A system for transmitting a video carrier the amplitude of which is modulated in accordance with a composite video signal descriptive of image frames scanned with successive scan lines occurring at a prescribed scan line frequency, said composite video signal comprising a baseband luminance signal and a color subcarrier modulated by color difference signal components, said system for transmitting being improved to further comprise:
    means for transmitting, together with said video carrier the amplitude of which is modulated in accordance with said composite video signal, digital information encoded in phase-shift keying of a PSK subcarrier of a suppressed carrier having the same frequency as said video carrier,
    wherein said means for transmitting digital information encoded in phase-shift keying of a PSK subcarrier of a suppressed carrier having the same frequency as said video carrier comprises:
    means for supplying said digital information as a succession of samples of a modulating signal, each having a respective value that is of a prescribed level respective to a zero level and that has a respective polarity;

means for generating the Hilbert transform of said digital information;

means for supplying respective carrier waves of first and second frequencies, the difference between which is an odd multiple of half said prescribed scan line frequency, including:

means for supplying said first carrier wave of said first frequency in first and second phases that are in quadrature with each other;

a first balanced modulator for modulating the amplitude of said carrier wave of said first frequency and said first phase, in accordance with the successive samples of said modulating signal, thereby generating a first double-sideband phase-shift-keyed carrier wave of said first frequency;

a second balanced modulator for modulating the amplitude of said carrier wave of said first frequency and said second phase, in accordance with said Hilbert transform of said digital information, thereby generating a second double-sideband phase-shift-keyed carrier wave of said first frequency;

means for combining said first and second double-sideband phase-shift-keyed carrier waves of said first frequency, thereby to obtain a single-sideband phase-shift-keyed carrier wave of said first frequency;

a mixer for supplying a mixer output signal, said mixer output signal including a low-frequency band component containing frequencies that correspond to differences between the frequencies of said single-sideband phase-shift-keyed carrier wave of said first frequency and said carrier wave of said second frequency received by said mixer as respective mixer input signals, and said mixer output signal further including a high-frequency band component containing frequencies that correspond to sums of the frequencies of said single-sideband phase-shift-keyed carrier wave of said first frequency and said carrier wave of said second frequency received by said mixer as respective mixer input signal;

a lowpass filter connected for receiving said mixer output signal and supplying response to said low-frequency band component thereof as said subcarrier; and means for modulating the amplitude of said suppressed carrier having the same frequency as said video carrier, in accordance with the response of said lowpass filter to said low-frequency band component of said mixer output signal.

39. A system for transmitting as set forth in claim 36 or 38 wherein said means for supplying said digital information as a succession of samples of a modulating signal, each having a respective value that is of a prescribed level respective to a zero level and that has a respective polarity, comprises:

a digital-to-analog converter for supplying said succession of samples of a modulating signal, each having a respective value that is of a prescribed level respective to a zero level and that has a respective polarity, responsive to a stream of digital ZEROs and ONEs supplied thereto;

means for supplying said digital information in serial-bit form;

a framestore memory, arranged for reading a respective line of stored serial-bit data twice during each consecutive pair of scan lines of said composite video signal within an initial field or within a final field of each frame of said composite video signal, and arranged for writing over stored serial-bit data after a fourth reading thereof;

a rate buffer for receiving said digital information in serial-bit form from said means for supplying same and for supplying serial-bit data for writing over serial-bit data stored in said frame store after a fourth reading thereof;

means for supplying the serial-bit data read from said framestore memory in a first logic sense to said analog-to-digital converter during the first and second readings of that data from said framestore memory; and means for supplying the serial-bit data read from said framestore memory in a second logic sense to said analog-to-digital converter during the third and fourth readings of that data from said framestore memory, said first and second senses of logic being inverse to each other, so the third and fourth readings of the same data from said framestore memory are supplied to said digital-to-analog converter in bit-complementary form to that form in which the first and second readings of that same data from said framestore memory are supplied to said digital-to-analog converter.

40. A system for detecting symbols encoded in a PSK subcarrier buried in a composite video signal descriptive of image frames scanned with successive scan lines occurring at a prescribed scan line frequency and being repeated from time to time in a known pattern of repetition, said composite video signal comprising a baseband luminance signal and a color subcarrier modulated by color difference signal components, said system for detecting symbols encoded in a PSK subcarrier buried in a composite video signal comprising:

means for detecting portions of said composite video signal in which said PSK subcarrier is buried, thereby to generate a first detected signal;

a comb filter, responding to said first detected signal during a first set of time intervals in its response for enhancing said PSK subcarrier vis-`a-vis remnant portions of said composite video signal in which said PSK subcarrier is buried, and responding to said first detected signal during a second set of time intervals in its response with extraneous comb filter response arising because of said repetition of the PSK carrier in accordance with said known pattern;

rate buffering circuitry for converting response from said comb filter during said first set of time intervals to a continuous flow of rate-buffered PSK subcarrier, without said repetition in accordance with said known pattern; and means for synchronously detecting at symbol rate the phase-shift keying of said flow of rate-buffered PSK subcarrier, thereby generating a synchronous detection output signal.

41. A system for detecting symbols encoded in a PSK subcarrier buried in a composite video signal, as set forth in claim 40, wherein said comb filter comprises:

means for delaying said first detected signal by the interval of one frame scan; and means for differentially combining said first detected signal and said first detected signal as delayed by the interval of one frame scan, thereby to generate a bandpass frame-comb filter response.

42. A system for detecting symbols encoded in a PSK subcarrier buried in a composite video signal, as set forth in claim 41, wherein said comb filter further comprises:

line delay means for delaying said bandpass frame-comb filter response by the interval of one line scan for each scan line except those shared by initial and final fields of respective ones of said frames of composite video signal;

half-line delay means for delaying said bandpass frame-comb filter response by the interval of one-half line scan for each scan line shared by initial and final fields of respective ones of said frames of composite video signal;

means for differentially combining the latter half of each scan line of said bandpass frame-comb filter response shared by initial and final fields of respective ones of said frames of composite video signal with the earlier half of the same scan line of said bandpass frame-comb filter response, as supplied from said half-line delay means, thereby to generate a portion of the response of said comb filter occurring during latter halves of those scan lines shared by initial and final fields of respective ones of said frames of composite video signal; and means for differentially combining each scan line of said bandpass frame-comb filter response with bandpass frame-comb filter response to the previous scan line, as supplied from said line delay means, thereby to generate the rest of the response of said comb filter, occurring at times other than during latter halves of those scan lines shared by initial and final fields of respective ones of said frames of composite video signal.

43. A system for detecting symbols encoded in a PSK subcarrier buried in a composite video signal, as set forth in claim 40, wherein said comb filter comprises:

a selective inverter for generating an output signal that is of an amplitude in constant proportion to the amplitude of said first detected signal, that is the same in polarity as said first detected signal during a first set of intervals each of one frame duration, and that is opposite in polarity from said first detected signal during a second set of intervals each of one frame duration, said first and second sets of intervals being interleaved in time with each other, with transitions between successive intervals one in the first set and the other in the second set taking place in the middle of scan lines having an earlier half in the initial field of a frame of composite video signal and having a latter half in the final field of the frame of composite video signal;

line delay means for delaying the output signal of said selective inverter by the interval of one line scan for each scan line except those shared by initial and final fields of respective ones of said frames of composite video signal;

half-line delay means for delaying the output signal of said selective inverter by the interval of one-half line scan for each scan line shared by initial and final fields of respective ones of said frames of composite video signal;

means for differentially combining the latter half of each scan line of the output signal of said selective inverter shared by initial and final fields of respective ones of said frames of composite video signal with the earlier half of the same scan line of the output signal of said selective inverter, as supplied from said half-line delay means, thereby to generate a portion of a lowpass line-comb filter response occurring during latter halves of those scan lines shared by initial and final fields of respective ones of said frames of composite video signal;

means for differentially combining each scan line of the output signal of said selective inverter with the output signal of said selective inverter from the previous scan line, as supplied from said line delay means, thereby to generate the rest of said lowpass line-comb filter response occurring at times other than during latter halves of those scan lines shared by initial and final fields of respective ones of said frames of composite video signal.

means for delaying said lowpass line-comb filter response by the interval of one frame scan; and means for additively combining said lowpass line-comb filter response and said lowpass line-comb filter response as delayed by the interval of one frame scan, thereby to generate the response of said comb filter.

44. A system for detecting symbols encoded in a PSK subcarrier buried in a composite video signal, as set forth in claim 40, wherein said comb filter comprises:

means for delaying said first detected signal by the interval of one line scan; and means for differentially combining said first detected signal and said first detected signal as delayed by the interval of one line scan, thereby to generate a lowpass line-comb filter response.

45. A system for detecting symbols encoded in a PSK subcarrier buried in a composite video signal as set forth in any one of claims 40–44, wherein said means for detecting portions of said composite video signal in which said PSK subcarrier is buried comprises:

a quadrature-phase synchronous video detector for detecting amplitude-modulation sidebands of a suppressed carrier thereby to generate said first detected signal, said suppressed carrier being of the same frequency as the video carrier the amplitude-modulation sidebands of which describe the composite video signal and being in quadrature phasing with said video carrier.

46. A system for detecting symbols encoded in a PSK subcarrier buried in a composite video signal as set forth in any one of claims 40–44, wherein said means for synchronously detecting at symbol rate the phase-shift keying of said flow of rate-buffered PSK subcarrier comprises:

means for generating first and second frequency-translation carrier waves differing in frequency by the frequency of the rate-buffered PSK subcarrier;

a first mixer mixing said first frequency-translation carrier wave with said rate-buffered PSK subcarrier for generating a frequency translation of a sideband of said rate-buffered PSK subcarrier to higher frequency and for generating an image of the frequency-translated sideband of said rate-buffered PSK subcarrier;

a single-sideband selection filter for selecting said frequency-translated sideband of said rate-buffered PSK subcarrier as the response thereof and for rejecting said image of the frequency-translated sideband of said rate-buffered PSK subcarrier;

means for downconverting said the frequency-translated sideband of said rate-buffered PSK subcarrier to baseband, thereby to generate a downconverter output signal, said means for downconverting including:

a second mixer mixing said second frequency-translation carrier wave with the response of said single-sideband selection filter;

a symbol detector of a type for synchronously detecting said downconverter output signal at said symbol rate to generate a symbol detector output signal; and symbol decision circuitry for deciding the values of successive symbols from said symbol detector output signal.

47. A system for detecting symbols encoded in a PSK subcarrier buried in a composite video signal as set forth in claim 46, wherein said means for detecting portions of said composite video signal in which said PSK subcarrier is buried comprises:

a quadrature-phase synchronous video detector for detecting amplitude-modulation sidebands of a suppressed carrier thereby to generate said first detected signal, said suppressed carrier being of the same frequency as the video carrier the amplitude-modulation sidebands of which describe the composite video signal and being in quadrature phasing with said video carrier.

48. A system for detecting symbols encoded in a PSK subcarrier buried in a composite video signal as set forth in any one of claims 40–44, wherein said means for synchronously detecting at symbol rate the phase-shift keying of said flow of rate-buffered PSK subcarrier comprises:

means for generating first and second frequency-translation carrier waves differing in frequency by the frequency of the rate-buffered PSK subcarrier, the frequency of said second frequency-translation carrier wave being of half the symbol rate of the PSK subcarrier;

a first mixer mixing said first frequency-translation carrier wave with said rate-buffered PSK subcarrier for generating a frequency translation of a sideband of said rate-buffered PSK subcarrier to higher frequency and for generating an image of the frequency-translated sideband of said rate-buffered PSK subcarrier;

a single-sideband selection filter for selecting said frequency-translated sideband of said rate-buffered PSK subcarrier as the response thereof and for rejecting said image of the frequency-translated sideband of said rate-buffered PSK subcarrier;

means for downconverting said the frequency-translated sideband of said rate-buffered PSK subcarrier to baseband, thereby to provide synchronous detection of symbols successively encoded in said rate-buffered PSK subcarrier and to generate a symbol detector output signal, said means for downconverting including:

a second mixer mixing said second frequency-translation carrier wave in suitable phasing with the response of said single-sideband selection filter; and symbol decision circuitry for deciding the values of successive symbols from said symbol detector output signal.

49. A system for detecting symbols encoded in a PSK subcarrier buried in a composite video signal as set forth in claim 48, wherein said means for detecting portions of said composite video signal in which said PSK subcarrier is buried comprises:

a quadrature-phase synchronous video detector for detecting amplitude-modulation sidebands of a suppressed carrier thereby to generate said first detected signal, said suppressed carrier being of the same frequency as the video carrier the amplitude-modulation sidebands of which describe the composite video signal and being in quadrature phasing with said video carrier.

50. A system for detecting symbols encoded in a PSK subcarrier buried in a composite video signal as set forth in claim 40, further comprising:

means for detecting portions of said composite video signal including horizontal synchronizing pulses and vertical synchronizing pulses;

a horizontal sync separator for separating horizontal synchronizing pulses from the detected portions of said composite video signal including horizontal synchronizing pulses and vertical synchronizing pulses;

a vertical sync separator for separating vertical synchronizing pulses from the detected portions of said composite video signal including horizontal synchronizing pulses and vertical synchronizing pulses;

a line-locked oscillator, the frequency of oscillations from which oscillator is controlled responsive to the separated horizontal synchronizing pulses;

a half-symbol counter for counting the oscillations from said line-locked oscillator to generate a count of half symbols of said digital information occurring during each successive scan line of said composite video signal;

means for generating respective trigger pulses whenever the separated vertical synchronizing pulses occur during one of a group of intermediate counts of said first counter;

a data frame counter for counting said trigger pulses to generate a modulo-2 count of data frames;

a data line counter for counting said separated horizontal synchronizing pulses, thereby to generate a data line count, said data line counter being reset to predetermined initial count by each of said trigger pulses;

means for complementing the most significant bit of said count of half-symbols, responsive to said data line counter being at its said predetermined initial count, thereby to generate a modified half-symbol count;

a first framestore memory included in said comb filter addressed by at least a portion of said data line count and by at least a portion of said modified half-symbol count; and at least a second framestore memory included in said rate buffering circuitry addressed by at least a portion of said data line count and by at least a portion of said modified half-symbol count.

51. A system for detecting symbols encoded in a PSK subcarrier buried in a composite video signal, as set forth in claim 50, wherein said comb filter comprises a bandpass frame-comb filter that includes, in addition to said first framestore memory for delaying said first detected signal as written thereinto for a frame time, a subtractor, for differentially combining said first detected signal as written into said first framestore memory and as read therefrom a frame time later to generate a bandpass frame-comb filter response.

52. A system for detecting symbols encoded in a PSK subcarrier buried in a composite video signal, as set forth in claim 50, further comprising:

a first linestore memory included in said comb filter and addressed by at least a portion of said modified half-symbol count; and at least a second linestore memory included in said rate buffering circuitry addressed by at least a portion of said modified half-symbol count.

53. A system for detecting symbols encoded in a PSK subcarrier buried in a composite video signal, as set forth in claim 52, wherein said comb filter comprises a bandpass frame-comb filter, including said first framestore memory, and a lowpass line-comb filter, including said first linestore memory and following said bandpass frame-comb filter in a cascade connection therewith; wherein said bandpass frame-comb filter includes, in addition to said first framestore memory for delaying said first detected signal as written thereinto for a frame time, a subtractor for differentially combining said first detected signal as written into said first framestore memory and as read therefrom a frame time later to generate the response of said bandpass frame-comb filter; wherein said first linestore memory is arranged for delaying said bandpass frame-comb filter response as written thereinto by a line scan interval in every scan line, except those scan lines in which the earlier and latter halves of the scan line are respectively in the initial and final fields of a respective frame of said composite video signal, in which exceptional scan lines said first linestore memory is arranged for delaying said bandpass frame-comb filter response as written thereinto by half a line scan interval; and wherein said lowpass line-comb filter includes, in addition to said first linestore memory, an adder for additively combining said bandpass frame-comb filter response as written into said first linestore memory and as read therefrom a scan line interval later, said adder thereby generating said comb filter response.

54. A system for detecting symbols encoded in a PSK subcarrier buried in a composite video signal, as set forth in claim 52; wherein there is at the input of said comb filter a selective inverter for generating an output signal therefrom that is of an amplitude in constant proportion to the amplitude of said first detected signal, that is the same in polarity as said first detected signal when and only when said modulo-2 count of data frames has a prescribed value, and that is otherwise opposite in polarity from said first detected signal; wherein said comb filter comprises a lowpass line-comb filter, including said first linestore memory, and a lowpass frame-comb filter, including said first framestore memory and following said lowpass line-comb filter in a cascade connection therewith; wherein said first linestore memory is arranged for delaying said selective inverter output signal as written thereinto by a line scan interval in every scan line, except those in which the earlier and latter halves of the scan line are respectively in the initial and final fields of a respective frame of said composite video signal, in which exceptional scan lines said first linestore memory is arranged for delaying said selective inverter output signal as written thereinto by half a line scan interval; and wherein said lowpass line-comb filter includes, in addition to said first linestore memory, a first adder for additively combining said selective inverter output signal filter response as written into said first linestore memory and as read therefrom a scan line interval later, said first adder thereby generating a first adder output sum signal; and wherein said lowpass frame-comb filter includes, in addition to said first framestore memory for delaying for a frame time said first adder output sum signal as written thereinto, a second adder for additively combining said first adder output sum signal as written into said first framestore memory and as read therefrom a frame time later to generate the response of said comb filter.

55. A system for detecting symbols encoded in a PSK subcarrier buried in a composite video signal as set forth in any one of claims 50–54, wherein said means for detecting portions of said composite video signal including horizontal synchronizing pulses and vertical synchronizing pulses comprises:

an in-phase synchronous video detector for detecting amplitude-modulation sidebands of a video carrier, which amplitude-modulation sidebands describe the composite video signal; and wherein said means for detecting portions of said composite video signal in which said PSK subcarrier is buried comprises:

a quadrature-phase synchronous video detector for detecting amplitude-modulation sidebands of a suppressed carrier thereby to generate said first detected signal, said suppressed carrier being of the same frequency as said video carrier and being in quadrature phasing with said video carrier.

56. A system for transmitting a video carrier the amplitude of which is modulated in accordance with a video signal descriptive of image frames scanned with successive scan lines occurring at a prescribed scan line rate, said system being improved to further comprise:

a digital subcarrier generator generating a digital subcarrier by modulating a subcarrier of a suppressed carrier in response to digital data, said suppressed carrier having the same frequency as said video carrier and being in quadrature phasing with said video carrier; and transmitter apparatus for transmitting, over a shared transmission channel, said digital subcarrier together with said video carrier the amplitude of which is modulated in accordance with said video signal.

57. A system as set forth in claim 56, wherein said digital data have a symbol rate that is a multiple of said prescribed scan line rate.

58. A system as set forth in claim 57, wherein said digital data are arranged in consecutive data frames each of a time duration equal to the time duration of each said image frame, wherein the data in each alternate one of said consecutive data frames repeat in opposite sense the data in the previous data frame.

59. A system as set forth in claim 56, wherein said digital data are arranged in consecutive data frames each of a time duration equal to the time duration of each said image frame, wherein symbols descriptive of data in each alternate one of said consecutive data frames repeat in opposite sense symbols descriptive of data in the previous data frame.

60. A system for transmitting a video carrier the amplitude of which is modulated in accordance with a video signal descriptive of image frames scanned with successive scan lines occurring at a prescribed scan line frequency, said system being improved to further comprise:

a digital subcarrier generator generating a digital subcarrier by digitally modulating a subcarrier of a suppressed carrier in response to digital information, said suppressed carrier having the same frequency as said video carrier, said digital subcarrier generator arranging data in consecutive data frames each of a time duration equal to the time duration of as a respective portion of said video signal descriptive of a respective one of said image frames, wherein the data in each alternate one of said consecutive data frames repeat in opposite sense the data in the previous data frame; and transmitter apparatus for transmitting, over a shared transmission channel, said digital subcarrier together with said video carrier, the amplitude of which said video carrier is modulated in accordance with said video signal.

61. A system for transmitting a video carrier the amplitude of which is modulated in accordance with a video signal descriptive of image frames scanned with successive scan lines occurring at a prescribed scan line frequency, said system being improved to further comprise:

a digital subcarrier generator generating a digital subcarrier by digitally modulating a subcarrier of a suppressed carrier in response to digital information, said suppressed carrier having the same frequency as said video carrier, said digital subcarrier having a frequency that is an odd multiple of half said prescribed scan line frequency, said digital subcarrier having its phase reversed between each said scan line and the next one of said scan lines, said digital subcarrier having its phase further reversed at corresponding points in each successive one of said frames; and transmitter apparatus for transmitting, over a shared transmission channel, said digital subcarrier together with said video carrier the amplitude of which said video carrier is modulated in accordance with said video signal.

62. A system as set forth in claim 56, 60 or 61, wherein said video signal is a composite video signal comprising a baseband luminance signal and a color subcarrier modulated by color difference signal components.

63. A system as set forth in claim 56, 60 or 61 wherein said subcarrier is digitally modulated in accordance with a "constant power" modulation scheme.

64. A system for transmitting a video carrier the amplitude of which is modulated in accordance with a video signal descriptive of image frames scanned with successive scan lines occurring at a prescribed scan line frequency, said system for transmitting being improved to further comprise:

a PSK generator for generating a BPSK subcarrier by binary phase shift keying a digital subcarrier of a suppressed carrier in response to digital data, said suppressed carrier having the same frequency as said video carrier; and transmitter apparatus for transmitting said BPSK subcarrier together with said video carrier, the amplitude of which said video carrier is modulated in accordance with said video signal.

65. A system as set forth in claim 64, wherein said video signal is a composite video signal comprising a baseband luminance signal and a color subcarrier modulated by color difference signal components.

66. A system as set forth in claim 65, wherein the frequency spectrum of said BPSK subcarrier overlaps most of the frequency spectrum of said baseband luminance signal.

67. A system as set forth in claim 65, wherein said digital data have a symbol rate that is a multiple of said prescribed scan line rate.

68. A system as set forth in claim 64, 66 or 67, wherein said digital subcarrier has a frequency that is an odd multiple of half said prescribed scan line frequency, said digital subcarrier has its phase reversed between each said scan line and the next one of said scan lines, and said digital subcarrier has its phase further reversed at corresponding points in each successive one of said frames.

69. A system for transmitting a video carrier the amplitude of which is modulated in accordance with a video signal descriptive of image frames scanned with successive scan lines occurring at a prescribed scan line frequency, said system for transmitting being improved to further comprise:

a PSK generator for generating a single-sideband BPSK subcarrier by binary phase shift keying a digital subcarrier of a suppressed carrier in response to digital information and suppressing one of the sidebands resulting from the binary phase shift keying, said suppressed carrier having the same frequency as said video carrier; and transmitter apparatus for transmitting said single-sideband BPSK subcarrier together with said video carrier, the amplitude of which said video carrier is modulated in accordance with said video signal.

70. A system as set forth in claim 69, wherein said video signal is a composite video signal comprising a baseband luminance signal and a color subcarrier modulated by color difference signal components.

71. A system for transmitting a video carrier as set forth in claim 69, wherein the lower-in-frequency one of the BPSK sidebands resulting from the binary phase shift keying is suppressed for generating said single-sideband BPSK subcarrier.

72. A system for transmitting a video carrier as set forth in claim 71, wherein the subcarrier frequency of said digital subcarrier is low enough that the lower-in-frequency one of the BPSK sidebands resulting from the binary phase shift keying would, were that said lower-in-frequency BPSK sideband not suppressed, include within its frequency range the frequency of said video carrier.

73. A system for transmitting a video carrier as set forth in claim 71, wherein the frequency spectrum of said single-sideband BPSK subcarrier overlaps most of the frequency spectrum of said baseband luminance signal.

74. A system as set forth in claim 69, wherein said digital data have a symbol rate that is a multiple of said prescribed scan line rate.

75. A system for transmitting a video carrier as set forth in claim 71 or in any one of claims 71–74, wherein said digital subcarrier has a frequency that is an odd multiple of half said prescribed scan line frequency, said digital subcarrier has its phase reversed between each said scan line and the next one of said scan lines, and said digital subcarrier has its phase further reversed at corresponding points in each successive one of said frames.

76. A system for transmitting a video carrier the amplitude of which is modulated in accordance with a video signal descriptive of image frames scanned with successive scan lines occurring at a prescribed scan line rate, said system for transmitting being improved to further comprise:

a digital subcarrier generator generating a digital subcarrier by modulating a subcarrier of a suppressed carrier in response to digital data, said suppressed carrier having the same frequency as said video carrier, and said data having a symbol rate that is a multiple of said prescribed scan line rate; and transmitter apparatus for transmitting, over a shared transmission channel, said digital subcarrier together with said video carrier the amplitude of which is modulated in accordance with said video signal.

77. A system as set forth in claim 76, wherein said video signal is a composite video signal comprising a baseband luminance signal and a color subcarrier modulated by color difference signal components.

78. A system as set forth in claim 76, wherein said digital data are arranged in consecutive data frames each of a time duration equal to the time duration of each said image frame, wherein symbols descriptive of data in each alternate one of said consecutive data frames repeat in opposite sense symbols descriptive of data in the previous data frame.

79. A system for detecting symbols descriptive of digital data encoded in a digital subcarrier of a video carrier, the amplitude of said video carrier being modulated in accordance with a video signal descriptive of image frames scanned with successive scan lines occurring at a prescribed scan line rate, said digital data being encoded with a symbol rate that is a multiple of said prescribed scan line rate and occurring in consecutive data frames each of a time duration equal to the time duration of each said image frame, the symbols descriptive of data in each alternate one of said consecutive data frames repeating in opposite sense the symbols in the previous data frame, said system for detecting symbols comprising:

- a detector generating a first detected signal by detecting an amplitude of portions of a frequency spectrum containing both said video signal and said digital data encoded in said digital subcarrier of said video carrier; and
- a frame-comb filter for differentially combining during said alternate data frames said first detected signal and that signal as delayed by the duration of one frame, for recovering said symbols descriptive of data with reduction of accompanying video signal.

80. A system as set forth in claim 79, further comprising:

rate buffering circuitry for converting to a continuous flow of symbols a selected response from said frame-comb filter occurring only during said alternate data frames; and a decoder for decoding said continuous flow of symbols for regenerating the digital data which the symbols describe.

81. A system as set forth in claim 79 or 80, wherein said video signal is a composite video signal comprising a baseband luminance signal and a color subcarrier modulated by color difference signal components.

82. A system as set forth in claim 81 wherein the frequency spectrum of said symbols descriptive of digital data encoded in said digital subcarrier overlaps most of the frequency spectrum of said baseband luminance signal.

83. A system for detecting symbols descriptive of digital data encoded in a digital subcarrier of a video carrier, the amplitude of said video carrier being modulated in accordance with a composite video signal descriptive of image frames scanned with successive scan lines occurring at a prescribed scan line rate, said composite video signal comprising a baseband luminance signal and a color subcarrier modulated by color difference signal components, said digital data being encoded with a symbol rate that is a multiple of said prescribed scan line rate and occurring in consecutive data lines occurring at said prescribed scan line rate, the symbols descriptive of data in each alternate one of said consecutive data lines repeating in opposite sense the symbols in the previous data line, said system for detecting symbols comprising:

- a detector generating a first detected signal by detecting an amplitude of portions of a frequency spectrum containing at least a portion of said composite video signal including said color subcarrier as modulated by said color difference signal components, which said frequency spectrum further contains said digital data encoded in said digital subcarrier of said video carrier; and
- a line-comb filter for differentially combining during said alternate data lines said first detected signal and that signal as delayed by the duration of one scan line, for recovering said symbols descriptive of data with reduction of accompanying said color subcarrier as modulated by said color difference signal components.

84. A system as set forth in claim 83, further comprising:

rate buffering circuitry for converting to a continuous flow of symbols a selected response from said line-comb filter occurring only during said alternate data lines; and a decoder for decoding said continuous flow of symbols for regenerating the digital data which the symbols describe.

\* \* \* \* \*